US008446951B2

(12) United States Patent
Tanaka et al.

(10) Patent No.: US 8,446,951 B2
(45) Date of Patent: May 21, 2013

(54) DYNAMIC IMAGE RECEIVING APPARATUS, DYNAMIC IMAGE RECEIVING METHOD AND PROGRAM

(75) Inventors: Katsunori Tanaka, Minato-ku (JP); Atsushi Hatabu, Minato-ku (JP); Yuzo Senda, Minato-ku (JP); Katsutoshi Seki, Minato-ku (JP); Tomoyoshi Kobori, Minato-ku (JP); Kosuke Nishihara, Minato-ku (JP); Soji Mori, Minato-ku (JP)

(73) Assignee: NEC Corporation, Tokyo (JP)

( * ) Notice: Subject to any disclaimer, the term of this patent is extended or adjusted under 35 U.S.C. 154(b) by 575 days.

(21) Appl. No.: 12/680,491

(22) PCT Filed: Sep. 19, 2008

(86) PCT No.: PCT/JP2008/066993
§ 371 (c)(1),
(2), (4) Date: Mar. 26, 2010

(87) PCT Pub. No.: WO2009/041363
PCT Pub. Date: Apr. 2, 2009

(65) Prior Publication Data
US 2010/0246673 A1  Sep. 30, 2010

(30) Foreign Application Priority Data
Sep. 28, 2007  (JP) ................................. 2007-255204

(51) Int. Cl.
*H04N 7/12* (2006.01)
(52) U.S. Cl.
USPC .................................................. 375/240.12
(58) Field of Classification Search
USPC .................................................. 375/240.12
See application file for complete search history.

(56) References Cited

U.S. PATENT DOCUMENTS

| 5,959,684 A | * | 9/1999 | Tan et al. ....................... 348/515 |
| 6,337,715 B1 | * | 1/2002 | Inagaki et al. ................. 348/553 |
| 6,473,137 B1 | * | 10/2002 | Godwin et al. ............... 348/725 |

(Continued)

FOREIGN PATENT DOCUMENTS

| JP | 08-102945 A | 4/1996 |
| JP | 09-331270 A | 12/1997 |

(Continued)

OTHER PUBLICATIONS

"Digital Broadcasting Textbook, Revised Version", Impress Communications, 2004, pp. 66-73 and 120-130, vol. 1.

*Primary Examiner* — Mehrdad Dastouri
*Assistant Examiner* — Mohammed Rahaman
(74) *Attorney, Agent, or Firm* — Sughrue Mion, PLLC

(57) ABSTRACT

To provide a dynamic image receiving apparatus which receives dynamic image streams coded with inter-frame prediction such as MPEG from a plurality of channels, and collects the dynamic image streams containing intra-frame coded pictures from each channel in a short time. The dynamic image receiving apparatus includes: a time information accumulative processing device which accumulates code receiving time of the intra-frame coded picture of the dynamic image stream, and periodicity time information containing one of or both of presentation time information and decoding time information contained in the dynamic image stream for each dynamic image stream of the plurality of channels; code receiving time predicting devices which predict the code receiving time of the intra-frame coded pictures based on the periodicity time information; and a channel selection control device which controls channel selection of the dynamic image stream to be received based on the predicted code receiving time information.

16 Claims, 22 Drawing Sheets

U.S. PATENT DOCUMENTS

| | | | |
|---|---|---|---|
| 2004/0003399 A1* | 1/2004 | Cooper | 725/38 |
| 2004/0075678 A1 | 4/2004 | Kazui et al. | |
| 2004/0215708 A1* | 10/2004 | Higashi et al. | 709/201 |
| 2004/0264423 A1* | 12/2004 | Ginzburg et al. | 370/338 |
| 2005/0081244 A1* | 4/2005 | Barrett et al. | 725/97 |
| 2006/0109385 A1* | 5/2006 | Wakako et al. | 348/731 |
| 2006/0140276 A1 | 6/2006 | Boyce et al. | |
| 2007/0098079 A1 | 5/2007 | Boyce et al. | |
| 2007/0250890 A1* | 10/2007 | Joshi et al. | 725/120 |
| 2009/0209323 A1* | 8/2009 | Ansari et al. | 463/23 |

FOREIGN PATENT DOCUMENTS

| | | |
|---|---|---|
| JP | 2001-346204 A | 12/2001 |
| JP | 2002-320153 A | 10/2002 |
| JP | 2003-087668 A | 3/2003 |
| JP | 2004-140488 A | 5/2004 |
| JP | 2004-215201 A | 7/2004 |
| JP | 2005-184457 A | 7/2005 |
| JP | 2006-527975 A | 12/2006 |

* cited by examiner

FIG. 6

| CHANNEL | CODE RECEIVING TIME OF INTRA-FRAME CODED PICTURES | | | |
|---|---|---|---|---|
| | PTS OF INTRA-FRAME CODED PICTURES | | | |
| 1 | 0:00 | 0:11 | 0:31 | 0:54 |
| | 0:05 | 0:17 | 0:35 | 0:59 |
| 2 | 0:01 | 0:07 | 0:28 | 0:41 |
| | 0:03 | 0:10 | 0:31 | 0:45 |
| ... | ... | ... | ... | ... |
| m | 0:03 | 0:18 | 0:31 | 0:48 |
| | 0:07 | 0:23 | 0:35 | 0:51 |

FIG. 11

| CHANNEL | CODE RECEIVING TIME OF INTRA-FRAME CODED PICTURES | | | | PTS OF INTRA-FRAME CODED PICTURES | | | | | |
|---|---|---|---|---|---|---|---|---|---|---|
| 1 | 0:04 | 0:18 | 0:43 | 0:50 | 0:54 | 1:23 | 1:48 | 2:12 | 2:29 | 2:43 |
|   | 0:11 | 0:23 | 0:47 | 0:53 | 0:59 | 1:29 | 1:53 | 2:17 | 2:35 | 2:47 |
| 2 | 0:07 | 0:30 | 0:13 | 1:39 | 1:58 | 2:06 | 2:13 | 2:25 | 2:40 | 2:54 |
|   | 0:13 | 0:34 | 0:48 | 1:44 | 2:05 | 2:12 | 2:19 | 2:33 | 2:47 | 3:01 |
| 3 | 0:09 | 0:21 | 0:42 | 0:58 | 1:23 | 1:42 | 2:03 | 2:23 | 2:29 | 2:45 |
|   | 0:13 | 0:28 | 0:48 | 1:03 | 1:28 | 1:48 | 2:08 | 2:28 | 2:33 | 2:48 |
| ⋮ | ⋮ | ⋮ | ⋮ | ⋮ | ⋮ | ⋮ | ⋮ | ⋮ | ⋮ | ⋮ |
| m | 0:08 | 0:11 | 0:30 | 0:44 | 1:05 | 1:26 | 1:45 | 2:10 | 2:30 | 2:55 |
|   | 0:13 | 0:17 | 0:37 | 0:53 | 1:13 | 1:33 | 1:53 | 2:17 | 2:37 | 3:01 |

FIG. 18

| CHANNEL | CODE RECEIVING TIME OF INTRA-FRAME CODED PICTURES | | | |
|---|---|---|---|---|
| | DTS OF INTRA-FRAME CODED PICTURES | | | |
| 1 | 0:00 | 0:11 | 0:31 | 0:54 |
| | 0:05 | 0:17 | 0:35 | 0:59 |
| 2 | 0:01 | 0:07 | 0:28 | 0:41 |
| | 0:03 | 0:10 | 0:31 | 0:45 |
| ... | ... | ... | ... | ... |
| m | 0:03 | 0:18 | 0:31 | 0:48 |
| | 0:07 | 0:23 | 0:35 | 0:51 |

DYNAMIC IMAGE RECEIVING APPARATUS, DYNAMIC IMAGE RECEIVING METHOD AND PROGRAM

CROSS REFERENCE TO RELATED APPLICATIONS

This application is a National Stage of International Application No. PCT/JP2008/066993 filed Sep. 19, 2008, claiming priority based on Japanese Patent Application No. 2007-255204, filed Sep. 28, 2007, the contents of all of which are incorporated herein by reference in their entirety.

TECHNICAL FIELD

The present invention relates to a dynamic image receiving apparatus, a dynamic image receiving method, and a program thereof. More specifically, the present invention relates to an apparatus, a method, and a program, which can be utilized for automatically collecting representative images.

BACKGROUND ART

A television broadcast/dynamic image distribution service, which performs digital-transmission of dynamic video contents via a public radio broadcast such as a terrestrial broadcast, a satellite broadcast, or via various wired/radio communication networks, is becoming popular.

Improvements in dynamic image compression techniques such as MPEG have made it possible to increase the number of simultaneously distributable channels, so that viewer's demands of for various distributions can be satisfied. In the meantime, the increase in the number of distribution channels raises such an issue for users that it is difficult to select viewing channels. To overcome such issue, it has become popular for a receiving device to load a function of supporting the user to make judgment on selecting the channels.

Automatic collection of the representative images (thumbnail) is a typical example of such supporting function. With this function, for example, dynamic image streams being distributed in other channels that are not being viewed by a user are received/decoded on the background, and representative images showing the contents thereof are created to be stored in a memory. The collected representative images may be displayed in a form of list on a display screen when the user executes a button operation, for example, and the viewer can easily make judgment on which channel to watch next based upon the information.

A simple method for performing a cyclic stream reception is to collect streams of all the channels that are designated as collection targets while changing the target channels to be received/decoded in adequate orders. This method is effective for a dynamic image system employing conventional analog signal transmission mode, and it is possible to collect the images without deteriorating immediacy of the representative images even in a case of using a receiving device that has only a small number of receivable channels. For example, in a case of using a receiving device that is only capable of receiving one channel at a time for collecting representative images for fifteen channels where dynamic image signals of 30 frame/sec are transmitted, it is possible to complete collection of the streams of all the thirty channels in one second or less even if it requires 1/30 sec. at the worst for frame synchronization when switching the channels. Even if an image of one second earlier is presented at the time of request to display the representative image of each channel, there is no significant inconvenience for the user to select the channels.

However, when a dynamic image is transmitted by using a coding method based on inter-frame prediction, e.g., MPEG, it is not always possible to immediately decode picture streams received after switching the channels. This is because the picture that is coded based on inter-frame prediction cannot be decoded to a proper image unless a decoded image of the picture to be referred for prediction has not been obtained. In this case, decoding after the receiving stream is switched can only be started at the timing when an intra-frame coded picture is received. Therefore, it takes time to collect the streams of all the collection-target channels. Thus, when collecting the representative images, for example, the immediacy of the obtained images becomes deteriorated.

Specifically, in a non one-segmental terrestrial digital broadcasting (ISDB-T) (see Non-Patent Document 1), dynamic image data with time resolution of 30 frame/sec (interlace or progressive) is coded with a MPEG-2 system, and it is multiplexed to data of TS (Transport System) format to be transmitted. Except for a special occasion such as a change of scenes, an intra-frame coded picture (I picture) that can be individually decoded is inserted once in 0.5 sec. Others are coded as inter-frame prediction coded pictures called P pictures or B pictures. Thus, stochastically, there is waiting time of about 0.5 sec. at the maximum and 0.25 sec. on the average from the point where the receiving channel is switched to the point where the stream of I picture is received. As a result, for collecting the streams from fifteen channels, for example, there is waiting time of about 7.5 sec. at the maximum and 3.75 sec. on the average. Therefore, it is possible that there requires time of over 8 sec. at the worst together with the time for decoding the I picture.

As another example, in one-segmental broadcasting for portable equipment of the same ISDB-T, dynamic image data with time resolution of 15 frame/sec (progressive) is coded with H. 264 system and transmitted. It is allowed to have a time interval of 5 sec. at the maximum for insertion of the I-picture. Therefore, even if there are only five channels to collect the representative images, it requires 25 sec. for receiving the streams of all the channels under the worst conditions.

Such issues are generated not only in the television broadcast using public radio waves. Similar issues occur even with a system that receives distribution of dynamic images from a network of the Internet, when the distribution server does not have a special function for transmitting representative images, and there is no synchronization between the channels regarding insertion of the I pictures. Due to the characteristic of the inter-frame prediction coding, it is unavoidable that the time for collecting the streams increases in proportional to the interval of inserting the I pictures.

Regarding periodicity of inserting the I pictures mentioned above, the actual transmission time and receiving time of the stream data is not uniform. The length of the stream data that is obtained by coding each picture fluctuates within a prescribed range.

As a related technique thereof, there is Patent Document 1 described below, for example.

Patent Document 1 discloses a video displaying device which displays program videos of a plurality of channels on a single screen in a pseudo manner. This video displaying device is capable of switcheably displaying program videos including intra-frame coded images and inter-frame coded images, which includes: a detecting device for detecting appearing timings of intra-frame coded images of each program video to be processing targets; a storage device for storing appearance information showing the detected appearing timings; a referring device for referring to the appearance information of a second program video from the storage device, when switching from a first program video to the second program video; and a switching device for switching the processing target from the first program video to the second program video so that display is switched at the appearing timing of the intra-frame coded image of the second program video, based on the referred appearance information.

The referring device refers to the appearance information of a plurality of program videos as the switching candidates to compare the time at which the intra-frame coded images of each program video appear so as to select the program video that can be switched in the shortest time as the second program video. In this manner, there is executed the processing for switching the program video at the appearing timing of the I picture that is the intra-frame coded image, so as to suppress generation of a display-incapable period as much as possible.

Further, prediction of the appearing time of the I picture is conducted in a following manner, for example. First, the channel is switched by every specific time on a multi-screen to display each program video to be multi-screen display processing targets. At this time, the appearing timings of the I pictures of each program video (for example, an appearing tendency of the I pictures (picture structure of GOP) and appearing time of the I picture appeared lastly) are detected, and the appearance information showing the appearing timings is stored to the storage device. When switching of the channels of a full round is completed and it is returned to the first channel, the appearing time of the I picture thereafter is predicted by referring to the appearance information stored to the storage device.

Specifically, for switching from a program A to a program B, the appearance information of the program B is referred from the storage device. Then, integer N that satisfies Expression 1 is calculated from "last I picture appearing time Bl" and "interval Bd of I pictures" contained in the appearance information and "current time (channel switching time) C0".

$$|Bl+Bd\times N-C0|<Bd \quad \text{Expression 1}$$

Then, appearing time C1' of the I picture is calculated with Expression 2 by using the calculated integer N.

$$C1'=Bl+Bd\times N \quad \text{Expression 2}$$

In a case where the channel is switched again to the same channel with a relatively short period as in the multi-screen display, there is only a small possibility of having a scene change and the like during the time from the previous display to a next display. Therefore, it is possible to predict the appearing time of the I picture with high accuracy by referring to the appearance information of the previous display. When there is shift generated in the appearing time of the I picture because of a scene change or the like, the appearance tendency and the appearing time are corrected and stored.

Patent Document 1: Japanese Unexamined Patent publication 2005-184457

Non-Patent Document 1: "Digital Broadcasting Textbook, Vol. 1, Revised version" Impress Communications, 2004, pp. 66-73, pp. 120-130

DISCLOSURE OF THE INVENTION

Problems to be Solved by the Invention

However, there are following inconveniences with the related technique. That is, when automatic collection is performed for displaying representative images of multiple numbers of channels in broadcast distribution that performs transmission of dynamic images with the inter-frame prediction coding, it takes time for performing the processing to receive the streams of the multiple channels. This results in having such an inconvenience that the representative images with high immediacy cannot be presented.

Further, when receiving the streams of the multiple channels, there are some points to be improved. One is regarding processing capacity required for the receiving device, and the other is that an amount of communications to be generated cannot be suppressed. For example, in a case of a device that receives public radio wave broadcasting, it is necessary to increase the number of antennas for receiving the broadcasting radio waves, the receiving sensitivity, the circuit scale of a device for performing decoding processing of the bit stream from received signals, and the power consumption. Meanwhile, in a case of dynamic image distribution via a network of the Internet, it is necessary to increase the number of channels to request transmission and to increase a flow amount of data transmitted on a communication path.

In Patent Document 1, the appearing time of the I picture is predicted from "last I picture appearing time Bl" and "interval Bd of I pictures" without considering other factors, assuming that the interval of the I pictures is fixed. However, in practice, the I pictures do not appear at constant intervals. Thus, it tends to generate an error between the predicted value and the actual interval. As a result, the prediction accuracy becomes deteriorated, thereby requiring more time for the processing.

The invention has been designed to overcome the inconveniences of the above-described techniques. It is an exemplary object of the invention to provide a dynamic image receiving apparatus, a dynamic image receiving method, and a program thereof, which can receive, in a short time, decodable streams from each of multiple channels without increasing the required processing capability and the amount of communications in broadcast distribution that performs transmission of dynamic images based on inter-frame prediction coding.

Means for Solving the Problems

In order to achieve the foregoing exemplary object, a dynamic image receiving apparatus according to an exemplary aspect of the invention is an apparatus which selects and receives dynamic image streams coded by a picture unit based on intra-frame coding and inter-frame prediction from two or more channels, and collects representative images of the plurality of channels by decoding the received streams. The apparatus includes:

a coded stream receiving device which receives the dynamic image streams from the channels, and extracts time at which a code of an intra-frame coded picture within the streams is received, and decoding time stamp or presentation time stamp added to the intra-frame coded picture;

an accumulative processing device which stores receiving time of the code, the decoding time stamp or the presentation time stamp as time information by being related to the respective channel; and a time predicting/channel selecting device which predicts receiving time of codes of intra-frame coded pictures to be received from current time and thereafter for each of the plurality of channels based on a history of the receiving time of the codes of the intra-frame coded pictures and the decoding time stamp or the presentation time stamp stored in the past, and determines the channel to be received based on an obtained predicted result.

A dynamic image receiving method according to another exemplary aspect of the invention is a method for receiving a dynamic image stream coded by a picture unit according to intra-frame coding and inter-frame prediction coding by selecting a channel from two or more dynamic image transmission channels as collection targets. The method includes:

storing time at which a code of the intra-frame coded picture within the stream is received and decoding time stamp or presentation time stamp added to the intra-frame coded picture as time information by being related to the channel; and predicting receiving time of the codes of the intra-frame coded pictures to be received from current time and thereafter for the two or more channels based on a history of the receiving time of the codes of the intra-frame coded pictures and the decoding time stamp or the presentation time stamp stored in the past, and selecting the channel to be received based on an obtained predicted result.

A dynamic image receiving program according to still another exemplary aspect of the invention is a program controls to receive a dynamic image stream coded by a picture unit according to intra-frame coding and inter-frame prediction coding by selecting a channel from two or more dynamic image transmission channels as collection targets, the program enabling a computer to execute:

a function of managing time at which a code of the intra-frame coded picture within the stream is received and decoding time stamp or presentation time stamp added to the intra-frame coded picture as time information by being related to the channel; and a function of predicting receiving time of the codes of the intra-frame coded pictures to be received from current time and thereafter for each of the two or more channels based on a history of the receiving time of the codes of the intra-frame coded pictures and the decoding time stamp or the presentation time stamp stored in the past, and selecting the channel to be received based on an obtained predicted result.

Effect of the Invention

The present invention predicts the code receiving time of the intra-frame coded pictures to be received from the current time and thereafter based on the code receiving time of the intra-frame coded pictures of the past for each channel as the receiving targets of the dynamic image streams and based on the periodicity time information (for example, PTS, DTS), and selects the channel with which the time required for collecting the image of the channel becomes short, based on a result of the prediction.

As a result, when performing collection for a second round and thereafter, waiting time from a point of switching to the stream of the selected channel to a point of receiving the intra-frame coded picture becomes short. Thus, it becomes possible to provide the excellent dynamic image receiving apparatus, dynamic image receiving method, and program capable of shortening the time for collecting the stream of each channel compared to those that go around the channels in a fixed order, which cannot be achieved with the conventional techniques.

BEST MODES FOR CARRYING OUT THE INVENTION

Hereinafter, exemplary embodiments of the invention will be described in detail by referring to the accompanying drawings.

As shown in FIG. 1, as the basic principle, an exemplary embodiment of the invention selects a channel from two or more dynamic image transmission channels as collection targets to receive, at the selected channel, dynamic image streams that are coded by a picture unit based on intra-frame coding and inter-frame prediction coding. It is a feature of the exemplary embodiment of the present invention to predict the time for receiving codes of intra-frame coded pictures received after the current time based on receiving time of the intra-frame coded pictures received in the past at each channel as the receiving targets of the dynamic image streams and based on timestamps (presentation time information (PTS) or decoding time information (DTS)), and to select the channel to receive and decode the stream for creating a representative image in such a manner that the time for collecting the image of the target channel becomes short, based on a result of the prediction.

With the exemplary embodiment of the present invention, when performing collection for a second round and thereafter, waiting time from a point of switching to the stream of the selected channel to a point of receiving the intra-frame coded picture can be shortened. Thus, compared to a simple method that goes around the channels in a fixed order, it is possible to obtain such an effect of shortening the time for collecting the streams of each channel.

Further, with the exemplary embodiment of the present invention, the time for receiving the in-frame coded picture from the current time and thereafter is predicted separately in two kinds, i.e., the timestamp (DTS or PTS) of the picture, and a difference between the timestamp and the receiving time. Since prediction is conducted separately for the former that can be predicted accurately based on the periodicity of the intra-frame coded pictures and to the latter that is affected by fluctuation on an amount of picture coding, the accuracy of the prediction is improved. As a result, it is possible to achieve an effect of shortening the time for collecting the streams.

Next, a specific example of the exemplary embodiment of the present invention will be described in detail.

As shown in FIG. 1, a dynamic image receiving apparatus 1 according to the exemplary embodiment of the present invention includes, as the basic structure, a coded stream receiving device 10, a system clock 14, an accumulative processing device 12, and a time predicting/channel selecting device 20. A reference numeral 30 is a control device for comprehensively controlling the above-described structural elements (10, 12, 14, 20).

The coded stream receiving device 10 receives a dynamic image stream from outside the apparatus. When there is a code of the intra-frame coded picture in that stream, the coded stream receiving device 10 refers to the system clock 14, and extracts the time at which the code of the picture is received as well as presentation time stamp (PTS) added to the intra-frame coded picture or the decoding time stamp (DTS). The accumulative processing device 12 accumulates information on the receiving time and the PTS or the DTS received by the coded stream receiving device 10.

The system clock 14 is set to SCR time when there is SCR in the codes. It is referred by the coded stream receiving device 10 when obtaining the time for receiving the code of the intra-frame coded picture existing in the codes, and when predicting the receiving time by the time predicting/channel selecting device 20.

Based on the receiving time of the intra-frame coded pictures received in the past at each channel stored to the accumulative processing device 12 and history of the PTS or DTS, the time predicting/channel selecting device 20 predicts the time of receiving the code of the intra-frame coded pictures at each of the two or more channels from the current time and thereafter based on a history of the receiving time of the codes of the intra-frame coded pictures and the decoding time stamp or the presentation time stamp stored in the past, and determines the receiving channel based on the obtained prediction result.

Next, the overall operations of the exemplary embodiment of the present invention will be described by referring to FIG. 1 and a flowchart of FIG. 7.

First, as the outline of the operations, the flowchart of FIG. 7 can be separated roughly into two.

In a process of processing executed in steps S101-S103 shown in FIG. 7, the coded stream receiving device 10 accumulates the history of the code receiving time of the intra-frame coded pictures received at the channel that is broadcasting a dynamic image and DTS or PTS to the accumulative processing device 12.

In a process of processing executed in steps S104-S107 shown in FIG. 7, the time predicting/channel selecting device 20 predicts the receiving time of the codes of the intra-frame coded pictures for each of the channels from the current time and thereafter based on the history, and performs channel selection. The coded stream receiving device 10 selects the channel and receives a dynamic image stream at the selected channel upon receiving an instruction from the time predicting/channel selecting device 20.

Next, details of the operations will be described. First, the coded stream receiving device 10 receives a dynamic image coded stream that is transmitted to an arbitrary channel (step S101 of FIG. 7).

When there is the code of the intra-frame coded picture within the codes of the stream (Yes in step S102 of FIG. 7), the coded stream receiving device 10 refers to the system clock 14 to obtain the time of receiving the code of the intra-frame coded picture, and stores the receiving channel of step S101, the time of receiving the code of the intra-frame coded picture, and DTS or PTS to the accumulative processing device 12 (step S103 of FIG. 7).

At the point where the processing to step S103 in FIG. 7 is completed, the coded stream receiving device 10 initializes and returns the processing of step S101 in FIG. 7, and receives a next dynamic image stream that is transmitted to the same channel or a different channel.

Further, when the code of the intra-frame coded picture cannot be found in the codes of the stream at a stage of step S102 shown in FIG. 7 (No in step S102 of FIG. 7), the coded stream receiving device 10 receives a next dynamic image stream that is transmitted to the same channel or a different channel.

When the coded stream receiving device 10 finds the code of the intra-frame coded picture in the codes of the stream and the necessary information is stored to the accumulative processing device 12 (Yes in step S102 of FIG. 7), the time predicting/channel selecting device 20 predicts the time of receiving the code of the intra-frame coded picture from the current time and thereafter based on the code receiving time of the past intra-frame coded picture and DTS or PTS stored to the accumulative processing device 12 for each of the selection-target channels, and selects the channel to receive the intra-frame coded picture at the predicted time (step S104 of FIG. 7).

Specifically, the time predicting/channel selecting device 20 predicts the time of receiving the intra-frame coded picture after the current time and thereafter (step S104 of FIG. 7) based on the receiving time of the past intra-frame coded picture and DTS or PTS stored to the accumulative processing device 12 for each of the selection target channels. Then, the time predicting/channel selecting device 20 refers to the time of the system clock 14 (step S105 of FIG. 7), and compares the referred system time to the predicted receiving time.

When the result thereof indicates "the system time<the predicted receiving time" (No in step S106 of FIG. 7), the processing is returned to step S105 of FIG. 7.

When the result of a comparison of the system time and the predicted receiving time indicates "the system time the predicted receiving time" (Yes in step S106 of FIG. 7), the time predicting/channel selecting device 20 issues a channel selection instruction to the coded stream receiving device 10.

Upon receiving the channel selecting instruction from the time predicting/channel selecting device 20, the coded stream receiving device 10 receives a dynamic image stream from the channel that corresponds to the instruction (step S107 of FIG. 7).

After completing the processing described above, the time predicting/channel selecting device 20 initializes and returns the processing to step S104 of FIG. 7.

Even with a concrete structure of the exemplary embodiment of the present invention, the receiving time of the intra-frame coded pictures from the current time and thereafter is predicted based on the receiving time of the intra-frame coded pictures received in the past at each of the receiving target channels of the dynamic image streams and the timestamp (decoding time information (DTS) or presentation time information (PTS)), and the channel to receive the dynamic image stream is selected in such a manner that the time for collecting the representative image of the target channel becomes short, based on the result of the prediction. Therefore, when performing collection for a second round and thereafter, waiting time from a point of switching to the stream of the selected channel to a point of receiving the intra-frame coded picture can be shortened. Thus, compared to a simple method that goes around the channels in a fixed order, it is possible to shorten the time for collecting the stream of each channel.

Further, the time for receiving the intra-frame coded pictures from the current time and thereafter is predicted separately in two kinds, i.e., the timestamp (DTS or PTS) of the pictures, and a difference between the timestamp and the receiving time. Since prediction is conducted separately for the former that can be predicted accurately based on the periodicity of the intra-frame coded pictures and to the latter that is affected by fluctuation on an amount of picture coding, the accuracy of the prediction is improved. As a result, it is possible to shorten the time for collecting the streams.

The exemplary embodiment has been described by referring to the case where the receiving time of the intra-frame coded pictures from the current time and thereafter is predicted based on the receiving time of the intra-frame coded pictures received in the past and DTS or PTS stored to the accumulative processing device 12. However, the present invention is not limited to such case.

The exemplary embodiment of the present invention may be so structured that the time predicting/channel selecting device 20 predicts the receiving time of the intra-frame coded pictures and DTS or PTS, and the coded stream receiving device 10 aligns the channel based on the prediction result. Specifically, the time predicting/channel selecting device 20 may predict the receiving time of the intra-frame coded pictures accurately based on already-known time/time information or accurately predictable time/time information.

Further, the time predicting/channel selecting device 20 may restrict the selection range of the channels to be selected by determining the collection target channels for the representative images (thumbnails) based on the viewer's preference information and broadcast program tendency information of each channel.

Furthermore, the degrees of priority may be given to the representative image collection target channels based on the collection history of the representative images of each channel and the time information of the representative images collected in the past, so that the time predicting/channel selecting device 20 can effectively reutilize the representative images collected in the past.

Moreover, the coded stream receiving device 10 may receive two or more channels simultaneously. Also, the coded stream receiving device 10 may receive the dynamic image stream broadcast (IP broadcast) via the Internet.

Further, the accumulative processing device 12 may store various kinds of information that can be used for predicting the receiving time of the intra-frame coded picture, such as the picture number of the intra-frame coded picture if possible, in addition to the receiving time of the intra-frame coded picture received in the past and the PTS or the DTS.

Furthermore, effects of the exemplary embodiment of the present invention shown in FIG. 1 will be described.

With the exemplary embodiment of the present invention, the receiving time of the code of the intra-frame coded picture that can be decoded by itself among the codes of the dynamic image streams transmitted to each broadcasting channel and DTS or PTS are accumulated as the history, the time for receiving the code of the intra-frame coded picture from the current time and thereafter is predicted based on the history, and the channels is selected based on the predicted receiving time.

In many of the digital dynamic image broadcasts, there is periodicity in the receiving time of the codes of the intra-frame coded pictures and DTS or PTS. Thus, it is possible to predict the receiving time of the code of the intra-frame coded picture from the current time and thereafter based on the history information of the receiving time of the codes of the intra-frame coded pictures received in the past and DTS or PTS. By using the predicted receiving time, the time from a point of switching the channel to a point of receiving the intra-frame coded picture can be made the shortest. As a result, selection of the channels can be conducted rapidly.

Therefore, it is possible to shorten the time for collecting the dynamic image stream that can be instantly decoded, through performing channel selection such that the sum of the time from the point of switching the channels to the point of receiving the codes of the intra-frame coded pictures for all the broadcasting channels can be made the shortest.

With the exemplary embodiment of the present invention, the time for collecting the dynamic image streams can be shortened further by restricting the selection target channels. The reasons thereof are as follows. When a viewer collects the dynamic image streams to search for a preferable program, there may be a limit set for the genre of the programs. Further, broadcast stations may specify the broadcast programs to a specific genre. Therefore, it is possible to shorten the time for collecting the dynamic image streams without degrading the convenience for the viewer, through restricting the target channels for collecting the dynamic image streams.

Further, the exemplary embodiment of the present invention may conduct prediction of the receiving time of the code of the intra-frame coded picture from the current time and thereafter through: predicting a value of the interval between the DTS or PTS of the intra-frame coded pictures neighboring to each other on a same dynamic image stream by using the periodicity of DTS or PTS of the intra-frame coded pictures; adding a natural-number multiple of the predicted PTS interval value to the latest DTS or PTS within the history to predict DTS or PTS of the intra-frame coded picture to be received from the current time and thereafter; predicting a difference between the receiving time of the code of the intra-frame coded picture to be received from the current time and thereafter and PTS based on a difference between the receiving time of the intra-frame coded picture and DTS or PTS within the history; and subtracting the predicted difference from the predicted PTS.

For directly predicting the receiving time of the code of the intra-frame coded picture, it is necessary to consider errors caused due to environmental changes in the transmission path of the dynamic image stream. The prediction errors regarding the receiving time of the code of the intra-frame coded picture can be separated into a prediction error of the PTS interval value and a difference prediction error between the code receiving time and PTS, through separating the code receiving time prediction for the intra-frame coded picture to prediction of the PTS interval value and prediction of the difference between the code receiving time and PTS. Since there is high regularity in the period of PTS of the intra-frame coded pictures, the PTS interval value can be predicted without an error. Thus, the receiving time prediction error can be reduced only to the difference prediction error.

In a case where the error in predicting the receiving time of the intra-frame coded picture may be assumed to be small, the time difference between the predicted receiving time of the intra-frame coded picture and the actual receiving time can be made shorter. Thus, it is possible to further shorten the waiting time from the point of switching the channel to the point of receiving the intra-frame coded picture, which is added to take the error into consideration.

Next, the exemplary embodiment will be described in more detail by using a concrete example.

Exemplary Embodiment 1

As an exemplary embodiment 1, described is a case of collecting intra-frame coded pictures that are transmitted to each channel when transmitting the contents of digital television broadcast as representative images showing the broadcast contents of the corresponding channels.

FIG. 4 shows an example of a dynamic image stream of the digital television broadcast using m-numbers of channels (channel 1-channel m; m is a natural number of 3 or larger) in the digital television broadcast.

In the exemplary embodiment 1, it is assumed that the channel 1, the channel 2, and the channel m among the m-numbers of channels are designated as the target channels for collecting the representative images.

In FIG. 4, each parallelogram indicates a single picture, and the numbers within the pictures are picture numbers applied for a convenience reason. In FIG. 4, each black parallelogram with white number indicates an intra-frame coded picture, and each white parallelogram with black number indicates an inter-frame coded picture.

In FIG. 4, the relation (large/small) between the picture numbers within a same channel indicates the receiving order of the pictures in some cases. However, it is noted that the relation (large/small) between the picture numbers in different channels does not indicate the receiving order of the pictures.

In the case of FIG. 4, one picture out of six pictures in the dynamic image stream of the channel 1 is the intra-frame coded picture, one picture out of seven pictures is the intra-frame coded picture in the dynamic image stream of the channel 2, and one picture out of four pictures is the intra-frame coded picture in the dynamic image stream of the channel m. In the dynamic image receiving apparatus 1 shown in FIG. 1, it is supposed that the interval of inserting the intra-frame coded picture in each channel is uniform, and that information on the insertion interval of the intra-frame coded picture is not obtained for any of the channels.

It is assumed here that there is one coded stream receiving device 10 provided in the exemplary embodiment 1. The dynamic image stream is received by the coded stream receiving device 10 of FIG. 1. When there is a code of the intra-frame coded picture existing within the codes of the stream (Yes in step S102 of FIG. 7), the coded stream receiving device 10 refers to the system clock 14 to obtain the receiving time of the intra-frame coded picture and PTS of the picture, and stores the receiving time and the PTS of the picture to the accumulative processing device 12 (step S103 of FIG. 7).

It is so supposed in the exemplary embodiment 1 that the time is obtained in a unit of second. However, the unit of the time and expressed form thereof are not limited when applying the exemplary embodiment of the present invention.

Values shown in FIG. 6 are values obtained by going through the broadcasting channels in an adequate manner with the coded stream receiving device 10, and it is not always possible to obtain the receiving time of the codes of all the intra-frame coded pictures of each channel and their PTS. Specifically, regarding the channel 1 in FIG. 5, for example, even though the intra-frame coded picture whose code receiving time and PTS (0:00 and 0:03) are obtained first is the picture (101) of FIG. 5, the second intra-frame coded picture whose code receiving time and PTS (0:11 and 0:15) are obtained next may not be the following intra-frame coded picture (107).

From the values of FIG. 6 stored in the accumulated processing device 12, the time predicting/channel selecting device 20 shown in FIG. 1 predicts the receiving time of the intra-frame coded pictures from the current time and thereafter for each of the representative image collection target channels, and selects the channel as the receiving target of the dynamic image stream by the coded stream receiving device 10 based on the predicted receiving time (step S104 of FIG. 7).

Specifically, the time predicting/channel selecting device 20 uses increases in the values of the PTS of the intra-frame coded pictures of each channel shown in FIG. 6 to predict the PTS of the intra-frame coded pictures of the current time and thereafter, and predicts the receiving time of the intra-frame coded pictures from the predicted PTS. As an example of a prediction method of the PTS using the increases, there is a method that uses common divisors of the increases. With this method, the common divisor of the increases is predicted as the interval value of the PTS of the intra-frame coded pictures. In a table shown in FIG. 6, the upper section of each channel shows the information of the times at which the codes of the intra-frame coded pictures are received, and the lower section shows the information of the PTS of the intra-frame coded pictures.

The method utilizing the common divisor of the increases will be described. Regarding the channel 1 in the case of FIG. 6, each of the increases in the PTS of the intra-frame coded pictures is as follows.

0:17−0:05=0:12

0:35−0:17=0:18

0:59−0:35=0:24

Thus, among the common divisors of the increases, the time predicting/channel selecting device 20 predicts "0:06" as the interval value of the PTS of the intra-frame coded pictures.

Similarly, the predicted PTS interval values of the intra-frame coded pictures at the channel 2 and the channel m in the case of FIG. 6 are "0:07" and "0:04", respectively.

Next, the time predicting/channel selecting device 20 adds a natural-number multiple of the predicted PTS interval value to the PTS of the intra-frame coded picture stored most recently in the past so as to calculate a predicted value of the PTS of the intra-frame coded picture to be received from the current time and thereafter. In the case of FIG. 6, the time obtained by adding a natural-number multiple of the PTS interval predicted value "0:06" to the PTS "0:59" of the inter-frame coded picture stored most recently in the past is considered as the predicted PTS for the channel 1, the time obtained by adding a natural-number multiple of the PTS interval predicted value "0:07" to the PTS "0:45" of the inter-frame coded picture stored most recently in the past is considered as the predicted PTS for the channel 2, and the time obtained by adding a natural-number multiple of the PTS interval predicted value "0:04" to the PTS "0:51" of the inter-frame coded picture stored most recently in the past is considered as the predicted PTS for the channel m.

Provided that the current time is 1:00, the predicted PTS for the channel 1 becomes 1:05, 1:11, 1:17, - - - . The predicted PTS for the channel 2 becomes 1:06, 1:13, 1:20, - - - , and the predicted PTS for the channel m becomes 1:03, 1:07, 1:11, - - - .

Then, the time predicting/channel selecting device 20 predicts the difference between the receiving time of the code of the intra-frame coded picture to be received from the current time and thereafter and the PTS based on the receiving time of the code of the intra-frame coded picture received in the past and the PTS. As an example of the difference predicting method, there is a calculating method that takes, as the predicted difference, a value obtained by adding a prescribed margin to a mean value of the differences between the receiving time of the codes of the intra-frame coded pictures received in the past and the PTS.

The calculating method for finding the predicted difference will be described. In the case of FIG. 6, the differences between the receiving time of the codes of the intra-frame coded pictures and the PTS for the channel 1 are "0:05", "0:06", "0:04", and "0:05", and the mean value thereof is "0:05".

Similarly, in the case of FIG. 6, the mean values of the differences between the receiving time of the codes of the intra-frame coded pictures and the PTS for the channel 2 and the channel m are "0:03" and "0:04", respectively.

Further, provided that the prescribed margin added to the difference mean value in the exemplary embodiment 1 is "0:01", the predicted values of the receiving time of the codes of the intra-frame coded pictures for the channel 1 calculated from the predicted PTS are as follows.

1:05−(0:05+0:01)=0:59

1:11−(0:05+0:01)=1:05

1:17−(0:05+0:01)=1:11,

Thus, the predicted value of the receiving time of the code of the intra-frame coded picture of the current time (1:00) and thereafter is "1:05+0.06×(n−1)" (n is a natural number).

The predicted values of the receiving time of the codes of the intra-frame coded pictures for the channel 2 calculated from the predicted PTS are as follows.

1:06−(0:03+0:01)=1:02

1:13−(0:03+0:01)=1:09

1:20−(0:03+0:01)=1:16,

Thus, the predicted value of the receiving time of the code of the intra-frame coded picture of the current time and thereafter is "1:02+0.07×(n−1)" (n is a natural number).

The predicted values of the receiving time of the codes of the intra-frame coded pictures for the channel m calculated from the predicted PTS are as follows.

1:03−(0:04+0:01)=0:58

1:07−(0:04+0:01)=1:02

1:11−(0:04+0:01)=1:06,

Thus, the predicted value of the receiving time of the code of the intra-frame coded picture of the current time and thereafter is "1:02+0.04×(n−1)" (n is a natural number).

The time predicting/channel selecting device 20 conducts channel selection such that the rounding time of the target channels for collecting the representative images becomes the shortest, based on the predicted receiving time of the intra-frame coded pictures (step S104 of FIG. 7). Determining the order for going around the channels is to determine the optimization of combinations, so that it can be determined by using a combination optimizing algorithm.

The time predicting/channel selecting device 20 of the exemplary embodiment 1 obtains an approximate solution of the channel cyclic order through performing depth priority search by repeating selection of the representative image collection target channels. The time predicting/channel selecting device 20 calculates following evaluation function F1 for each unselected channel CH, when selecting a next channel in that round in the search.

$F1(CH)=T\_I(CH,T\_P)-T\_P$

"T_P" is a predicted code receiving time of the intra-frame coded picture of the channel selected just before.

When selecting the first channel in the round, the time predicting/channel selecting device 20 takes T_P as the current time. "T_I(CH, T_P)" is the predicted code receiving time of the intra-frame coded picture that is received after the time T_P at the channel CH. When selecting the next target channel, the time predicting/channel selecting device 20 selects an unselected channel whose F1 value becomes the minimum. When there are a plurality of unselected channels having the minimum F1 value, the time predicting/channel selecting device 20 calculates a next evaluation function F2.

$F2(CH)=T\_II(CH,T\_P)$

"T_II(CH, T_P)" is a predicted code receiving time of a second intra-frame coded picture received at the channel CH after the time T_P. The time predicting/channel selecting device 20 selects the channel with the maximum F2 among the unselected channels with the minimum F1.

First, the time predicting/channel selecting device 20 determines the channel that is selected first by the coded stream receiving device 10. The result of prediction by the time predicting/channel selecting device 20 is as follows.

1:05+0:06×(*n*−1) (n is a natural number) for channel 1

1:02+0:07×(*n*−1) (n is a natural number) for channel 2

1:02+0:04×(*n*−1) (n is a natural number) for channel m

Thus, the values of the evaluation function F1 are "F1(1)=0:05", "F1(2)=0:02", and "F1(*m*)=0:02".

Since "F1(2)=F1(*m*)", the time predicting/channel selecting device 20 calculates the values of the evaluation function F2 for the channel 2 and the channel m, and obtains "F2(2)=1:09" and "F2(*m*)=1:06".

Since "F2(2)>F2(*m*)", the time predicting/channel selecting device 20 determines the channel 2 as the channel to be selected by the coded stream receiving device 10.

Then, the time predicting/channel selecting device 20 selects the second channel that is selected by the coded stream receiving device 10. The time predicting/channel selecting device 20 calculates the value of the evaluation function F1 for the channel 1 and the channel m as the unselected channels, and obtains "F1(1)=0:03" and "F1(*m*)=0:04".

Since "F1(1)<F1(*m*)", the time predicting/channel selecting device 20 determines the channel 1 as the second channel to be selected by the coded stream receiving device 10.

From the result of the searches described above, the coded stream receiving device 10 goes around the channels by selecting the channel 2, the channel 1, and the channel m at the time "1:02", "1:05", and "1:06", respectively, upon receiving the information from the time predicting/channel selecting device 20.

The time predicting/channel selecting device 20 selects the channel 2 from the channels that are the targets for collecting the representative images (step S104 of FIG. 7).

The time predicting/channel selecting device 20 obtains the system time by referring to the system clock 14 (step S105 of FIG. 7). When the system time is "1:02" that is the predicted receiving time of the code of the intra-frame coded picture of the channel 2 (step S106 of FIG. 7), the time predicting/channel selecting device 20 determines the channel 2 as the channel for receiving the dynamic image coded stream, and outputs an instruction for receiving the dynamic image stream of the channel 2 to the coded stream receiving device 10 (step S107 of FIG. 7). Then, the processing is returned to step S104.

The codes of the outputted dynamic image stream include the code of the intra-frame coded picture, so that it is possible with an external device that receives the dynamic image stream received by the coded stream receiving device 10 to generate the representative image.

Then, the time predicting/channel selecting device 20 selects the channel 1 from the representative image collection target channels whose representative images are uncollected (step S104 of FIG. 7).

The time predicting/channel selecting device 20 obtains the system time by referring to the system clock 14 (step S105 of FIG. 7).

When the system time is "1:05" that is the predicted receiving time of the code of the intra-frame coded picture of the channel 1 (step S106 of FIG. 7), the time predicting/channel selecting device 20 determines the channel 1 as the channel that is to be selected by the coded stream receiving device 10, and outputs the information to the coded stream receiving device 10 (step S107 of FIG. 7). Then, the processing is returned to step S104.

Then, the time predicting/channel selecting device 20 selects the channel m from the representative image collection target channels whose representative images are uncollected (step S104 of FIG. 7).

The time predicting/channel selecting device 20 obtains the system time by referring to the system clock 14 (step S105 of FIG. 7).

When the system time is "1:06" that is the predicted receiving time of the code of the intra-frame coded picture of the channel m (step S106 of FIG. 7), the time predicting/channel selecting device 20 determines the channel m as the channel that is to be selected by the coded stream receiving device 10, and outputs the information to the coded stream receiving device 10 (step S107 of FIG. 7). Then, the processing is returned to step S104. At this stage, the dynamic image coded streams including the codes of the intra-frame coded pictures are received for all the target channels for collecting the representative images. Thus, the processing is completed.

In a case of obtaining the intra-frame coded pictures that can be decoded by themselves to be used for creating representative images in order of the channel numbers such as the channel 1, the channel 2, and the channel m without using the dynamic image receiving apparatus according to the exemplary embodiment 1 of the present invention, when the codes of the intra-frame coded pictures are received at the respective predicted time, the receiving time of the codes of the intra-frame coded pictures are "1:05", "1:09", and "1:10". Thus, there requires 10 sec. from the input of the instruction for collecting the representative images. In the meantime, when the dynamic image receiving apparatus according to the exemplary embodiment 1 of the present invention is used, collection of the representative images is completed in 6 sec. from the instruction for collecting the representative images. Therefore, it is possible with the exemplary embodiment 1 to shorten the time for collecting the representative images by 4 sec.

When the details of the broadcast contents are unknown even though the genres of the broadcast contents are known because of the specialization in the broadcast contents in each channel achieved with multiple channels, the exemplary embodiment 1 designates the channel as the target for collecting the representative image among the broadcasting channels. This makes it possible to achieve an effect of shortening the time required for collecting the representative images while reflecting the intention of the viewer who collects the representative images and an effect of suppressing the number of placed coded stream receiving devices, and to obtain an effect of suppressing required bandwidths of the transmission path of the dynamic image stream.

Since the history of the PTS of the intra-frame coded pictures received in the past and the interval value between the PTS of the neighboring intra-frame coded pictures within a same dynamic image stream are uniform, the time of receiving the codes of the intra-frame coded pictures to be received from the current time and thereafter can be predicted with high accuracy through: predicting the PTS of the intra-frame coded pictures of the current time and thereafter; predicts a difference between the time of receiving the codes of the intra-frame coded pictures to be received from the current time and thereafter and the PTS based on the history of the receiving time of the codes of the intra-frame coded pictures received in the past and the PTS; and subtracts the predicted difference from the predicted PTS to predict the time of receiving the codes of the intra-frame coded pictures to be received from the current time and thereafter.

When predicting the PTS of the intra-frame coded pictures of the current time and thereafter, the use of the common divisor of the increases in the PTS of the intra-frame coded pictures received in the past makes it possible to predict the interval value of the PTS of the intra-frame coded pictures that are neighboring to each other in terms of time within a same dynamic image stream with high accuracy.

When predicting the difference between the receiving time of the codes of the intra-frame coded pictures of the current time and thereafter and the PTS, the prediction can be conducted accurately by adding a prescribed margin to the mean value of the differences between the receiving time of the codes of the intra-frame coded pictures received in the past and the PTS. At the same time, it is possible to reduce the probability of loosing the intra-frame coded picture that the viewer tries to receive, because the code of the picture reaches the dynamic image receiving apparatus before the predicted time of receiving the code of the intra-frame coded picture to be received from the current time and thereafter.

Through having the channel selection executed by the coded stream receiving device at the predicted code receiving time, it is possible to shorten the time from the point of selecting the channel to the point of receiving the code of the intra-frame coded picture. Further, through determining the cyclic order of the channels as the targets for collecting the representative images by the combination optimizing algorithm based on the predicted receiving time for receiving the codes, the time required for going around the channels to collect the representative images can be shortened.

The exemplary embodiment 1 uses the depth priority search based on the evaluation functions that are calculated from the predicted time of receiving the codes of the intra-frame coded pictures for optimization of the combinations. However, it is also possible to use combination optimizing methods such as a simulated annealing method and a hereditary algorithm.

Exemplary Embodiment 2

Next, an exemplary embodiment 2 of the present invention will be described in detail.

It is assumed that the coded stream receiving device 10 shown in FIG. 1 has received m-numbers of dynamic image streams (m is a natural number of 4 or larger) shown in FIG. 4 and FIG. 5, and the target channels for collecting the representative images are designated as the channel 1, the channel 2, the channel 3, and the channel m shown in FIG. 5.

Further, it is assumed that the receiving time of the codes of the intra-frame coded pictures of the past and the PTS stored in the accumulative processing device 12 are obtained as in FIG. 11, as a result of performing the processing of steps S104-S107 of FIG. 7 on the received dynamic image streams.

The time at the point where the instruction for collecting the representative images is inputted is considered as "3:00", and this time is taken as the current time.

Regarding the channel 1, the channel 2, and the channel m among the channels as the targets for collecting the representative images, the intra-frame coded pictures with the receiving time and the PTS written with white letters in FIG. 11 are collected in the past as the representative images, and it is assumed that there is no representative image collected in the past regarding the channel 3.

In step S104 of FIG. 7, the time predicting/channel selecting device 20 predicts the PTS of the intra-frame coded pictures to be received from the current time and thereafter for each of the representative image collection target channels based on the PTS of the intra-frame coded pictures received in the past, and predicts the receiving time of the codes of the intra-frame coded pictures to be received from the current time and thereafter based on the predicted PTS.

Specifically, as a method for the time predicting/channel selecting device 20 to predict the PTS of the intra-frame coded pictures to be received from the current time and thereafter for each of the representative image collection target channels, there is a method which takes the minimum value of the increases in the PTS of the intra-frame coded pictures received in the past as the interval value of the PTS of the intra-frame coded pictures of that channel, and adds a natural-number multiple of the interval value of the PTS to the PTS of the intra-frame coded picture that is received most recently.

In the case of FIG. 11, the increases in the PTS of the intra-frame coded pictures for the channel 1 are calculated as follows, respectively.

0:23−0:11=0:12

0:47−0:23=0:24

0:53−0:47=0:06

0:59−0:53=0:06

1:29−0:59=0:30

1:53−1:29=0:24

2:17−1:53=0:24

2:35−2:17=0:18

2:47−2:35=0:12

Thus, the time predicting/channel selecting device 20 predicts "0:06", which is the minimum value of the increases, as the interval value of the PTS of the intra-frame coded pictures.

Similarly, the predicted PTS interval values of the intra-frame coded pictures of the channel 2, the channel 3, and the channel m of the case shown in FIG. 11 are "0:07", "0:05", and "0:04", respectively.

Then, the time predicting/channel selecting device 20 predicts the differences between the receiving time of the codes of the intra-frame coded pictures to be received from the current time and thereafter and the PTS based on the receiving time of the codes of the intra-frame coded pictures received in the past and the PTS.

As an example of a method for predicting the difference, there is a calculating method which takes, as the predicted difference, a percent point in the histogram of the differences between the receiving time of the codes of the intra-frame coded pictures received in the past and the PTS stored in the storage device 12.

In the case of FIG. 11, the differences between the receiving time of the codes of the intra-frame coded pictures and the PTS for the channel 1 are as follows.

0:11−0:04=0:07

0:23−0:18=0:05

0:47−0:43=0:04

0:53−0:50=0:03

0:59−0:54=0:05

1:29−1:23=0:06

1:53−1:48=0:05

2:17−2:12=0:05

2:35−2:29=0:06

2:47−2:43=0:04

The histogram thereof is as in FIG. 12.

The time predicting/channel selecting device 20 of the exemplary embodiment 2 takes the percent point where the lower-side accumulated probability becomes 80% or more as the predicted difference between the receiving time of the codes of the intra-frame coded pictures and the PTS. At this time, the percent point where the lower-side accumulated probability becomes 80% or more is a class between 0:05.5, inclusive, and 0:06.5, exclusive. Thus, the predicted difference value for the channel 1 is considered as "0:06" that is the measure of the central tendency of the class.

Similarly, the time predicting/channel selecting device 20 calculates the mean values of the difference between the receiving time of the codes of the intra-frame coded pictures and the PTS for the channel 2, the channel 3, and the channel m of the case of the FIG. 11 as "0:07", "0:06", and "0:08", respectively.

From the predicted PTS and the predicted differences, the time predicting/channel selecting device 20 calculates: the predicted values of the receiving time of the codes of the intra-frame coded pictures regarding the channel 1 from the current time and thereafter as "3:05+0:06×(n−1)(n is a natural number)"; the predicted values of the receiving time of the codes of the intra-frame coded pictures regarding the channel 2 from the current time and thereafter as "3:03+0:07×(n−1)(n is a natural number)"; the predicted values of the receiving time of the codes of the intra-frame coded pictures regarding the channel 3 from the current time and thereafter as "3:02+0:05×(n−1)(n is a natural number)"; and the predicted values of the receiving time of the codes of the intra-frame coded pictures regarding the channel m from the current time and thereafter as "3:01+0:04×(n−1)(n is a natural number)".

Following the processing of step S104 shown in FIG. 7, the time predicting/channel selecting device 20 selects the channels CH that are the targets for collecting the representative images in order from those with higher priority that is set by using F1 (CH) and F2(CH) defined in the exemplary embodiment 1 as well as an evaluation function F3(CH) that is defined as follows based on the differences between the current time and the predicted DTS or PTS of the intra-frame coded pictures.

When representative images are not collected in the past, the evaluation function F3(CH) in a channel (CH) is defined as "F3 (CH)=∞". When representative images are collected in the past, it is defined as "F3(CH)=T_C−T_Prv(CH)".

Note here that "T_C" is the current time, "T_PrvDP(CH)" is the DTS or PTS of the representative image that is collected in the past for the channel CH.

The priority P(CH) for the channels CH is set to become larger for the channels with the larger F3(CH). When there are a plurality of channels with the same value of F3(CH), the priority is set to be higher for the channel with the larger value of F1(CH). Further, when there are a plurality of channels with the same value of F1(CH), the priority is set to be higher for the channel with the larger value of F2(CH).

In the exemplary embodiment 2, the representative images are not collected in the past for the channel 3. Thus, the evaluation function F3 becomes "F3(3)=∞" for the channel 3, and becomes "F3(1)=2:07", "F3(2)=2:12", and "F3($m$)=2:07", respectively, for the channel 1, the channel 2, and the channel m for which the representative images are collected in the past.

Since "F3(3)>F3(2)>F3(1)=F3($m$)", the time predicting/channel selecting device 20 determines first to collect the intra-frame coded picture at the time "3:02" for the channel 3 as the representative image, and then determines to collect the intra-frame coded picture at the time "3:03" for the channel 2 as the representative image. The time predicting/channel selecting device 20 calculates the values of the evaluation function F1 for the channel 1 and the channel m based on the time predicted to receive the codes of the intra-frame coded pictures for the channel 2. The result of calculation is "F1(1)=F1($m$)=0:02".

Thus, the time predicting/channel selecting device 20 calculates the evaluation function F2, and obtains the result, "F2(1)=0:08>F1(m)=0:06". The time predicting/channel selecting device 20 gives the priority orders for selecting the channels to be "P(3)>P(2)>P(1)>P(m)", and selects the channels as the targets for collecting the representative images in order from the one with the highest priority (steps S104-S107 of FIG. 7).

With the exemplary embodiment 2, the minimum value of the increases in the PTS of the intra-frame coded pictures received in the past are used when predicting the PTS of the intra-frame coded pictures to be received from the current time and thereafter. Thus, it is possible to obtain the interval value of the PTS of the neighboring intra-frame coded pictures within a same dynamic image stream accurately with a small calculation amount, when the PTS of the neighboring in-frame pictures within the same dynamic image stream is in the history.

By using the percent point in the histogram of the differences between the predicted receiving time of the codes of the intra-frame coded pictures received in the past and the PTS when predicting the differences between the receiving time of the codes of the intra-frame coded pictures to be received from the current time and thereafter and the PTS, the prediction can be conducted accurately. At the same time, it is possible to obtain such an effect to guarantee that the probability (for the codes of the intra-frame coded pictures to reach the dynamic image receiving apparatus after the predicted receiving time of the codes of the intra-frame coded pictures of the current time and thereafter so as to be received properly) becomes a prescribed probability or higher.

Further, channel selection is carried out by giving the priority orders so as to preferentially collect the representative images for the channels whose representative images are uncollected over the channels whose representative images have already been collected, during the time where the representative image collected earlier is substituted until a new representative image is collected. Therefore, it is possible to further shorten the time from the point of receiving an instruction for collecting the representative images to the point of presenting the representative images of all the representative image target collection channels.

This makes it possible to present the representative images to the viewer in such a manner that the representative image for the channel with the low priority is updated from the image collected earlier to the image obtained anew. Therefore, immediacy of the representative image can be maintained.

Exemplary Embodiment 3

An exemplary embodiment 3 of the present invention will be described in detail.

As in the exemplary embodiment 2, it is assumed that the dynamic image receiving apparatus 1 shown in FIG. 1 has received m-numbers of dynamic image streams (m is a natural number of 4 or larger) shown in FIG. 4 and FIG. 5, and the representative image collection target channels are designated as the channel 1, the channel 2, the channel 3, and the channel m.

Further, it is assumed that the receiving times of the codes of the past intra-frame coded pictures and the PTS stored in the accumulative processing device 12 of the dynamic image receiving apparatus are obtained as in FIG. 11 as a result of applying steps S101-S107 of FIG. 7 to the dynamic image streams. The time at the point where the instruction for collecting the representative images is inputted is considered as "3:00", and this time is taken as the current time.

Regarding the channel 1, the channel 2, and the channel m among the representative image collection target channels, the intra-frame coded pictures with the receiving time and the PTS written with white letters in FIG. 5 are collected in the past as the representative images, and it is assumed that there is no representative image collected in the past regarding the channel 3.

In step S104 of FIG. 7, the time predicting/channel selecting device 20 predicts the PTS of the intra-frame coded pictures to be received from the current time and thereafter for each of the representative image collection target channels based on the PTS of the intra-frame coded pictures received in the past, and predicts the receiving time of the codes of the intra-frame coded pictures to be received from the current time and thereafter based on the predicted PTS.

First, the time predicting/channel selecting device 20 predicts the PTS of the intra-frame coded pictures to be received from the current time and thereafter for each of the channels that are the targets for collecting the representative images. As a specific method for predicting the PTS of the intra-frame coded pictures to be received from the current time and thereafter, there is a method which: adopts candidates for the predicted interval value of the PTS of the intra-frame coded pictures of the channel, e.g., increases in the PTS of the intra-frame coded pictures received in the past, the common divisors of the increases, etc; takes the value within a prescribed range obtained from known information as the PTS interval value; and adds a natural-number multiple of the PTS interval value to the PTS of the intra-frame coded picture received lastly.

Assuming that the prescribed range of the PTS interval value in the case of FIG. 11 is between 0:04, inclusive, and 0:08, exclusive, the time predicting/channel selecting device 20 according to the exemplary embodiment 3 selects the increase within that range from the increases of the PTS of the intra-frame coded pictures received in the past, and takes it as the predicted PTS interval value.

In the case of FIG. 11, the increases in the PTS of the intra-frame coded pictures for the channel 1 are as follows.

0:23−0:11=0:12

0:47−0:23=0:24

0:53−0:47=0:06

0:59−0:53=0:06

1:29−0:59=0:30

1:53−1:29=0:24

2:17−1:53=0:24

2:35−2:17=0:18

2:47−2:35=0:12

Thus, the time predicting/channel selecting device 20 predicts "0:06" as the interval value of the PTS of the intra-frame coded pictures from the increases.

Similarly, the time predicting/channel selecting device 20 predicts the predicted PTS interval values of the intra-frame coded pictures of the channel 2, the channel 3, and the channel m of the case shown in FIG. 11 as "0:07", "0:05", and "0:04", respectively.

Then, the time predicting/channel selecting device 20 predicts the differences between the receiving time of the codes of the intra-frame coded pictures to be received from the current time and thereafter and the PTS based on the receiving time of the codes of the intra-frame coded pictures received in the past and the PTS stored in the accumulative processing device 12.

As an example of a method for predicting the difference, there is a calculating method which: finds dispersion of expected values of the differences between the receiving time of the codes of the intra-frame coded pictures received in the past and the PTS stored in the accumulative processing device 12; takes the percent point where the lower-side accumulated probability in a standard normal distribution that the differences between the receiving time of the codes of the intra-frame coded pictures and the PTS follow as a coefficient becomes a prescribed probability; and takes estimate value of the difference between the receiving time of the code of the intra-frame coded picture to be received from the current time and thereafter and the PTS as the sum of the expected value and the value obtained by multiplying the coefficient by a square root of the dispersion.

In the case of FIG. 11, the expected value of the difference between the receiving time of the codes of the intra-frame coded pictures and the PTS for the channel 1 is "0:05", and the square root of the dispersion is "0:01.15". When the prescribed probability is 80 percent, the percent point of the probability in the normal distribution is about 0.87. Thus, the time predicting/channel selecting device 20 predicts the difference between the receiving time of the code of the intra-frame coded picture and the PTS for the channel 1 as "0:05+ 0.87×0:01.15 0:06".

Similarly, the time predicting/channel selecting device 20 predicts the differences between the receiving times of the codes of the intra-frame coded pictures and the PTS for the channel 2, the channel 3, and the channel m as "0:07", "0:06", and "0:08", respectively.

From the predicted PTS and the predicted differences, the time predicting/channel selecting device 20 calculates: the predicted values of the receiving time of the codes of the intra-frame coded pictures regarding the channel 1 from the current time and thereafter as "3:05+0:06×(n−1) (n is a natural number)"; the predicted values of the receiving time of the codes of the intra-frame coded pictures regarding the channel 2 from the current time and thereafter as "3:03+0:07×(n−1) (n is a natural number)"; the predicted values of the receiving time of the codes of the intra-frame coded pictures regarding the channel 3 from the current time and thereafter as "3:02+ 0:05×(n−1) (n is a natural number)"; and the predicted values of the receiving time of the codes of the intra-frame coded pictures regarding the channel m from the current time and thereafter as "3:01+0:04×(n−1) (n is a natural number)".

Following the processing of step S104 shown in FIG. 7, the time predicting/channel selecting device 20 selects the channels in order from those with higher priority that is set as follows.

First, the time predicting/channel selecting device 20 arbitrarily sets a threshold value T_TH for the time from the receiving time of the representative images collected in the past to the current time.

Then, the time predicting/channel selecting device 20 calculates the differences between the receiving time of the representative images collected in the past and the current time for each of the representative image collection target channels, and divides the representative image collection target channels into a set S_H with the time difference of T_TH or more and to a set S_L with the time difference of less than T_TH. Here, the channel whose representative image is uncollected is included in the set S_H.

At last, the time predicting/channel selecting device 20 applies the priority orders to each of the channel sets S_H and S_L in the same manner as that of the exemplary embodiment 2. At this time, the priority orders are so set that the relation regarding the priority P, "P(CH_H)>P(CH_L)", applies to any combinations of the channels CH_H included in the channel set S_H and the channels CH_L included in the channel set S_L.

It is assumed in the exemplary embodiment 3 that the threshold value is designated as "T_TH=2:15". Here, the channels as the targets for collecting the representative images are divided into the channel sets S_H and S_L as follows.

$$S\_H=\{2, 3, m\}, S\_L=\{1\}$$

The time predicting/channel selecting device 20 applies the priority orders to each of the channel sets S_H and S_L in the same manner as that of the exemplary embodiment 2 in such a manner that the relation, "P(3)>P(2)>P(m)", applies to the channels included in the channel set S_H.

At last, the time predicting/channel selecting device 20 determines the priority orders on all the target channels for collecting the representative images to be "P(3)>P(2)>P(m)> P(1)" so that the priority of the channels included in the channel set S_H becomes higher than that of the channel included in the channel set S_L.

One of the increases in the PTS of the intra-frame coded pictures within the history is within the known range. However, there are cases where all the increases in the PTS of the intra-frame coded pictures within the history are out of the range. In such cases, it can be estimated that the increases in the PTS of the intra-frame coded pictures in the history are natural-number multiples of the actual PTS interval value. Thus, with the exemplary embodiment 3, divisors are calculated for one of the increases, and a divisor within the known range is selected from the divisors to predict the PTS interval value of the intra-frame coded pictures.

Further, it is also possible to predict the PTS interval value of the intra-frame coded pictures by calculating the common divisors for a plurality of increases of the PTS of the intra-frame coded pictures in the history, and by selecting the common divisor that falls within the known range.

Further, the normal distribution is used in this exemplary embodiment as the probability distribution model. However, if there is another preferable probability distribution model, it is also possible to use that model. Furthermore, any kinds of statistics may be used for the differences between the receiving time of the codes of the intra-frame coded pictures and the PTS in the history, depending on the probability distribution model to be used.

With the exemplary embodiment 3, the known range is used for the PTS interval value of the intra-frame coded pictures when predicting the PTS of the intra-frame coded pictures to be received from the current time and thereafter. Thereby, it is possible to obtain an effect of improving the accuracy for predicting the PTS of the intra-frame coded pictures to be received from the current time and thereafter.

When predicting the differences between the receiving time of the codes of the intra-frame coded pictures to be received from the current time and thereafter and the PTS, the probability dispersion model of the differences between the receiving time of the codes of the intra-frame coded pictures and the PTS is taken as the normal distribution. With this, the coefficient at the percent point where the lower-side accumulated probability becomes the prescribed probability or higher is multiplied to the square root of the dispersion values of the differences between the receiving time of the codes of the intra-frame coded pictures received in the past and the PTS, and a result obtained by adding the expected value of the difference to the product is taken as the predicted value of the differences between the receiving time of the codes of the intra-frame coded pictures to be received from the current time and thereafter and the PTS. With this, when the differences are random within a specific range, it becomes possible to obtain the effects of enabling accurate prediction and suppressing the probability for the codes of the pictures to reach the dynamic image receiving apparatus before the predicted code receiving time of the intra-frame coded pictures to be received from the current time and thereafter to be the prescribed probability or lower.

Further, through carrying out channel selections by applying the priority orders, it becomes possible to collect a new representative image preferentially by judging that the collected representative image is too old when the difference between the current time and the receiving time of the collected representative image of the channels whose representative images have been collected is equal to or more than the threshold value, and to omit or to postpone collection of a new representative image by reutilizing the collected representative image when the difference is less than the threshold value.

This makes it possible to shorten the time until when it becomes possible to utilize the representative image with immediacy of more than a prescribed level, when omitting collection of a new representative image by the reutilization. Further, when collection of a new representative image is to be postponed by the reutilization, it is possible to achieve more improvements while maintaining the immediacy of the representative image to be reutilized to be more than a prescribed level.

Next, details of other exemplary embodiments of the present invention will be described.

Exemplary Embodiment 4-1

(Overall Structure of Dynamic Image Receiving Apparatus)

FIG. 1 is a block diagram showing an example of the overall schematic structure of an apparatus according to an exemplary embodiment 4-1 of the present invention.

In FIG. 1, the dynamic image receiving apparatus 1 according to this exemplary embodiment collects intra-frame coded pictures of each channel of digital television broadcast as representative images for showing the broadcast contents of the corresponding channels. The dynamic image receiving apparatus 1 is configured with: a dynamic image coded stream receiving device (will be referred to as a coded stream receiving device for short hereinafter) 10 for receiving dynamic image coded streams; an accumulative processing device 12 which performs accumulation processing of code receiving time, presentation time information (PTS), decoding time information (DTS) for each channel; a system clock 14; an intra-frame coded picture receiving time predicting/channel selecting device (referred to as time predicting/channel selecting device for short hereinafter) 20 which predicts the code receiving time and carries out channel selection; and a control device 30 for controlling each of those parts.

The coded stream receiving device 10 receives codes of dynamic image coded stream from the outside the dynamic image receiving apparatus 1. When there is a code of an intra-frame coded picture within the codes, the coded stream receiving device 10 refers to the system clock 14 to obtain the receiving time of the picture, and transfers the receiving time of the code of the intra-frame coded picture and decoding time information (DTS) or presentation time information (PTS) as an example of periodicity time information to the accumulative processing device 12.

The accumulative processing device 12 performs accumulative processing of the code receiving time of the intra-frame coded picture of the dynamic image stream and the periodicity time information including one of or both of the presentation time information and the decoding time information contained in the dynamic image stream for each of the dynamic image streams of a plurality of channels. The accumulative processing device 12 can be configured with a storage part such as a memory, a hard disk, or the like.

The system clock 14 is set to SCR time when there is SCR in the code. It is referred by the coded stream receiving device 10 when obtaining the receiving time of the code of the intra-frame coded picture existing in the codes, and referred when aligning the channel of the coded stream receiving device 10 at the predicted receiving time by the time predicting/channel selecting device 20.

Based on the receiving time of the codes of the intra-frame coded pictures received in the past at each channel and the presentation time information (PTS) or the decoding time information (DTS) as an example of the periodicity time information stored to the accumulative processing device 12, the time predicting/channel selecting device 20 predicts the receiving time of the codes of the intra-frame coded pictures to be received from the current time and thereafter, and aligns the channel of the coded stream receiving device 10 at the predicted code receiving time.

The time predicting/channel selecting device 20 includes: a code receiving time predicting function (code receiving time predicting device) which predicts code receiving time of the intra-frame coded picture; and a channel selecting control function (channel selecting control device) which controls round of channels by determining the cyclic order of the channels to conduct selection of the channels based on the result of the prediction conducted by the code receiving time predicting function.

The dynamic image receiving apparatus 1 is operated by controls of a program, and it may be a computer of any kinds such as information equipment (information processor/communication device) having radio/wired communication function or a computer similar to that, as long as it has a network-related function. Further, it may be of mobile type or fixed type.

In that case, the hardware structure of the dynamic image receiving apparatus 1 may have: a display device (screen) for displaying various kinds of information and the like; an operating/inputting device (for example, keys and the like) for operating/inputting data on the display screen (various input sections and the like) of the display device; transmitting/receiving device (communication device) for transmitting/receiving various signals/data; a storage device or an accumulative processing device (for example, a memory or the like) for storing various programs/data; and a control device (for example, a CPU or the like) for controlling those.

Further, in a non one-segmental terrestrial digital broadcast (ISDB-T), for example, two kinds of time information called decoding time stamp (DTS) as the decoding time information and presentation time stamp (PTS) as the presentation time information are added to picture data that is coded with MPEG-2 or H.264 system, and stream data multiplexed to MPEG-2TS mode is transmitted from a transmitter side to a receiver side. DTS shows the time for the receiver side to decode the picture data obtained by separating MPEG-2TS, and PTS shows the time for displaying the picture data obtained by performing decoding processing.

Numerical values of the DTS and the PTS are applied based on a reference clock of the transmitter side, so that the receiver side needs to synchronize a reference clock for decoding and display controlling with that of the transmitter side. This adjustment is conducted based on information called PCR (Program Clock Reference) stored in MPEG-2TS.

Regarding the periodicity of inserting the frame coded pictures (I pictures), the time information shown by the DTS and the PTS added to the frame coded pictures (I pictures) is a constant interval. However, the intervals of the code transmission time at which the stream data is actually transmitted and the code receiving time are not constant. The length of the stream data where each picture is coded fluctuates within a prescribed range.

Thus, with the exemplary embodiment, the code receiving time is predicted by the time predicting/channel selecting device 20. Moreover, the time predicting/channel selecting device 20 obtains predicted PTS and predicted DTS based on the PTS or the DTS as an example of the periodicity time information, and predicts the code receiving time based thereupon.

The operations of the dynamic image receiving apparatus 1 of FIG. 1 according to this exemplary embodiment configured as above are performed roughly as follows.

First, the coded stream receiving device 10 receives the codes of the dynamic image coded stream from the outside the apparatus. When there is a code of the intra-frame coded picture in the codes, the coded stream receiving device 10 refers to the system clock 14 to obtain the receiving time of the picture, and transfers the receiving time of the intra-frame coded picture and the DTS or the PTS to the accumulative processing device 12.

The system clock 14 is set to SCR time when there is SCR in the code. It is referred by the coded stream receiving device 10 when obtaining the receiving time of the code of the intra-frame coded picture existing in the codes, and referred when aligning the channel of the coded stream receiving device 10 at the predicted receiving time by the time predicting/channel selecting device 20.

Based on the receiving time of the codes of the intra-frame coded pictures in the past received at each channel and the PTS or the DTS stored to the accumulative processing device 12, the time predicting/channel selecting device 20 predicts the receiving time of the codes of the intra-frame coded pictures to be received from the current time and thereafter, and aligns the channel of the coded stream receiving device 10 at the predicted code receiving time.

(Regarding Processing Procedures)

(Overall Processing)

Next, various processing procedures regarding dynamic image reception with above-described structure will be described by referring to FIG. 7.

A dynamic image receiving method according to the exemplary embodiment includes, as a basic structure: a time information accumulative processing step (step S103 shown in FIG. 7, for example) which performs accumulative processing of the code receiving time of the intra-frame coded pictures of the dynamic image stream and periodicity time information including one of or both of the presentation time information and the decoding time information contained in the dynamic image stream for each of the dynamic image streams of a plurality of channels; a code receiving time predicting step (step S104 shown in FIG. 7, for example) which predicts the code receiving time of the intra-frame coded picture, based on the periodicity time information of the time information accumulative processing step; a channel selection control step (step S104 shown in FIG. 7, for example) which controls channel selection of the dynamic image stream to be received, based on the predicted code receiving time information predicted in the code receiving time predicting step.

First, roughly speaking about the procedures of the dynamic image receiving method, each of the steps shown in a flowchart of FIG. 7 can be separated into two in a broad sense.

In step S101-step S103, the dynamic image receiving apparatus 1 accumulates the history of the receiving time of the codes of the intra-frame coded pictures at the channel that is broadcasting a dynamic image and the DTS or PTS to the accumulative processing device 12.

In step S104-step S107, the dynamic image receiving apparatus 1 predicts the receiving time of the codes of the intra-frame coded pictures to be received from the current time and thereafter for each of the channels from the history and carries out channel selection by the time predicting/channel selecting device 20, and receives the dynamic image stream of the selected channel by the coded stream receiving device 10.

(Details of Processing)

Next, details of the processing will be described.

First, the dynamic image receiving apparatus 1 receives the dynamic image coded stream by the coded stream receiving device 10 (step S101 of FIG. 7).

When there is a code of the intra-frame coded picture within the codes of the stream (Yes in step S102), the dynamic image receiving apparatus 1 refers to the system clock 14 to obtain the receiving time of the code of the in-frame picture, and stores the receiving channel of step S101, the receiving time of the code of the intra-frame coded picture, and the DTS or the PTS to the accumulative processing device 12 (step S103).

After step S103, the processing is returned to step S101 where the coded stream receiving device 10 receives a next dynamic image stream of the same channel or a different channel.

When it is "No" is step S102, the processing is returned to step S101 where the coded stream receiving device 10 receives a next dynamic image stream of the same channel or a different channel.

The dynamic image receiving apparatus 1 predicts the receiving time of the codes of the intra-frame coded pictures to be received from the current time and thereafter based on the receiving time of the codes of the intra-frame coded pictures received in the past at each channel to be selected and the PTS or the DTS stored to the accumulative processing device 12, and selects the channel to receive the intra-frame coded picture at the predicted time by the time predicting/channel selecting device 20 (step S104).

The dynamic image receiving apparatus 1 refers to the time of the system clock 14 (step S105), and compares the system time and the predicted receiving time. As a result of the comparison, when the value of the system time is less than the value of the predicted receiving time (No in step S106), the dynamic image receiving apparatus 1 returns the processing to step S105. When the value of the system time is equal to or more than the value of the predicted receiving time (Yes in step S106), the dynamic image receiving apparatus 1 aligns the coded stream receiving device 10 to the selected channel to receive and output the dynamic image stream of that channel (step S107), and returns to step S104.

(Effects)

Next, effects of the exemplary embodiment will be described.

In the exemplary embodiment, the receiving time of the codes of the intra-frame coded pictures from the current time and thereafter is predicted based on the receiving time of the codes of the intra-frame coded pictures received in the past at each channel as the receiving targets of the dynamic image streams and the timestamps (DTS or PTS), and selects the channel based on the prediction result to receive and decode the stream for creating the representative image in such a manner that the time required for collecting the image of the target channel becomes the shortest. As a result, waiting time from the point of switching to the stream of the selected channel to the point of receiving the intra-frame coded picture in the collection of a second round and thereafter can be made shorter. Thus, it is possible to obtain an effect of shortening the time for collecting the streams of each channel, compared to a simple method which goes round the channels in a fixed order.

Further, with the exemplary embodiment of the present invention, the receiving time of the intra-frame coded picture from the current time and thereafter is predicted separately in two kinds, i.e., the timestamp (DTS or PTS as an example of the periodicity time information) of the picture, and a difference between the timestamp and the receiving time. Since prediction is conducted separately for the former that can be predicted accurately based on the periodicity of the intra-frame coded picture and to the latter that is affected by fluctuation on an amount of picture coding, the accuracy of the prediction is improved. As a result, it is possible to achieve an effect of shortening the time for collecting the streams.

In the exemplary embodiment, the dynamic image receiving apparatus is configured to be capable of: accumulating the receiving time of the codes of the intra-frame coded pictures that can be decoded by themselves within the codes of the dynamic image streams of each of the broadcasting channels and the DTS or the PTS as the history; predicting the receiving time of the codes of the intra-frame coded pictures from the current time and thereafter based on the history; and selecting the channel based on the predicted code receiving time.

In many of the digital dynamic image broadcasts, there is periodicity in the receiving time of the code of the intra-frame coded picture and DTS or PTS. Thus, it is possible to predict the time for receiving the code of the intra-frame coded picture to be received from the current time and thereafter based on the history information of the receiving time of the code of the intra-frame coded picture received in the past and the DTS or PTS.

By using the predicted receiving time, the time from a point of switching the channel to a point of receiving the codes of the intra-frame coded picture can be made the shortest. As a result, selection of the channels can be conducted rapidly.

Through performing channel selection such that the sum of the time from the point of switching to the point of receiving the codes of the intra-frame coded pictures for all the broadcasting channels can be made the shortest, it is possible to shorten the time for collecting the dynamic image stream that can be instantly decoded.

Meanwhile, when the dynamic image streams are collected by simply going around the channels, for example, without using the time predicting/channel selecting device provided to the dynamic image receiving apparatus according to the present invention, there is a possibility of selecting the channel where the time from the point of switching the selected channel of the coded stream receiving device to the point of receiving the intra-frame coded picture becomes the longest. Thus, the intra-frame coded picture code receiving time predicting/channel selecting device provided to the dynamic image receiving apparatus according to the exemplary embodiment is required for obtaining the above-described effects.

With the exemplary embodiment, it is possible to obtain an effect of shortening the time for collecting the dynamic image stream further through restricting the selection target channels.

When a viewer collects the dynamic image streams to search for a preferable program, there may be a limit set for the genre of the program.

Further, broadcast stations may specify the broadcast programs to a specific genre. Therefore, it is possible to shorten the time for collecting the dynamic image stream without degrading the convenience for the viewer, through restricting the target channels for collecting the dynamic image streams.

Further, the exemplary embodiment of the present invention conducts prediction of the time for receiving the code of the intra-frame coded picture from the current time and thereafter through: predicting a value of the interval between the DTS or PTS of the intra-frame coded pictures neighboring to each other on a same dynamic image stream by using the periodicity of the DTS or PTS of the intra-frame coded pictures; adding a natural-number multiple of the predicted PTS interval value to the latest DTS or PTS within the history to predict DTS or PTS of the intra-frame coded picture from the current time and thereafter; predicting a difference between the receiving time of the code of the intra-frame coded picture from the current time and thereafter and PTS from a difference between the receiving time of the intra-frame coded picture and DTS or PTS within the history; and subtracts the predicted difference from the predicted PTS.

For directly predicting the receiving time of the code of the intra-frame coded picture, it is necessary to consider errors caused due to environmental changes in the transmission path of the dynamic image stream.

The prediction errors regarding the receiving time of the code of the intra-frame coded picture can be separated into a prediction error of the PTS interval value and a difference prediction error between the code receiving time and PTS through separating the code receiving time prediction for the intra-frame coded picture to prediction of the PTS interval value and prediction of the difference between the code receiving time and PTS.

Since there is high regularity in the period of PTS of the intra-frame coded pictures, the PTS interval value can be predicted without an error. Thus, the receiving time prediction error can be reduced only to the difference prediction error.

In a case where the error in predicting the receiving time of the intra-frame coded picture may be assumed to be small, the time between the predicted receiving time of the intra-frame coded picture and the actual receiving time can be made shorter. Thus, it is possible to further shorten the waiting time from the point of switching the channel to the point of receiving the intra-frame coded picture, which is added to take the error into consideration.

Further, the operation contents of each step and the structural elements of each part described above may be put into a program to be executed by a computer.

Exemplary Embodiment 4-2

Next, an exemplary embodiment 4-2 of the present invention will be described by referring to FIG. 2-FIG. 9. In the followings, explanations for substantially the same structures as those of the exemplary embodiment 4-1 will be omitted, and only the different points will be explained. FIG. 2 is a block diagram showing a dynamic image receiving apparatus according to the exemplary embodiment 4-2 of the present invention.

The dynamic image receiving apparatus according to the exemplary embodiment discloses an example of concrete configuration regarding prediction and channel selection performed by the time predicting/channel selecting device 20.

The dynamic image receiving apparatus is targeted to collect the intra-frame coded pictures of each channel of the digital television broadcast as representative images for showing the broadcast contents of the corresponding channels.

FIG. 4 shows an example of a dynamic image stream of the digital television broadcast with m-numbers of channels (channel 1-channel m; m is a natural number of 3 or more), which is used in the exemplary embodiment.

In the exemplary embodiment, it is assumed that the channel 1, the channel 2, and the channel m among the m-numbers of channels are designated as the target channels for collecting the representative images.

In FIG. 4, each parallelogram indicates a single picture, and the numbers within the pictures are picture numbers applied for a convenience reason. In FIG. 4, each black parallelogram with white number indicates an intra-frame coded picture, and each white parallelogram with black number indicates an inter-frame coded picture.

In FIG. 4, the relation (large/small) between the picture numbers within a same channel indicates the receiving order of the pictures in some cases. However, it is noted that the relation (large/small) between the picture numbers in different channels does not indicate the receiving order of the pictures.

In the case of FIG. 4, one picture out of six pictures in the dynamic image stream of the channel 1 is the intra-frame coded picture, one picture out of seven pictures is the intra-frame coded picture in the dynamic image stream of the channel 2, and one picture out of four pictures is the intra-frame coded picture in the dynamic image stream of the channel m. In the dynamic image receiving apparatus 1 shown in FIG. 1, it is supposed that the interval of inserting the intra-frame coded picture in each channel is constant, and that information on the insertion interval of the intra-frame coded picture is not obtained for any of the channels.

It is assumed here that there is one coded stream receiving device 10 provided to the dynamic image receiving apparatus 1 of FIG. 1 in this exemplary embodiment.

(Regarding Structure)

Next, details of the structure of the dynamic image receiving apparatus 1 will be described by referring to FIG. 2. FIG. 2 is a block diagram showing an example of a detailed structure of the time predicting/channel selecting device of the dynamic image receiving apparatus according to the exemplary embodiment. First, the structure of an intra-frame coded picture receiving time predicting/channel selecting device (referred to as a time predicting/channel selecting device for short hereinafter) will be described, and the structure of a control device will be described thereafter.

The dynamic image receiving apparatus according to the exemplary embodiment discloses an example of a case where the time predicting/channel selecting device 20 shown in FIG. 1 is structured as the time predicting/channel selecting device 20 shown in FIG. 2. Structures of each of other parts are the same as those of the exemplary embodiment 1.

(Time Predicting/Channel Selecting Device)

As shown in FIG. 2, the time predicting/channel selecting device 20 of the dynamic image receiving apparatus according to the exemplary embodiment is configured, including: a first predicting unit 22 which predicts presentation time information of the intra-frame coded pictures from the current time and thereafter based on the presentation time information of the past; a second predicting unit 24 which predicts code receiving time based on the predicted presentation time predicted by the first predicting unit 22; a prediction calculating module control part 25 which controls the calculation procedures to execute such prediction for each of the channels; and a channel selection part 26 which controls channel selection based on the predicted code time information.

Note here that it is possible to configure a predicting device (a code receiving time predicting device) with the first predicting unit 22, the second predicting unit 24, and the prediction calculating module control part 25.

The first predicting unit 22 takes the common divisor of the increases in the values of each presentation time information as an interval value of the presentation time information, and predicts the presentation time information of the intra-frame coded pictures from the current time and thereafter based on the predicted presentation information interval value and the presentation time information of the past. This first predicting unit 22 can be considered also as a first predicting device.

More specifically, the first predicting unit 22 is configured, including: a PTS interval value predicting part 22a which utilizes the increases in the values of the PTS of the intra-frame coded pictures of each channel to predict the common divisor of the increases as the interval value of the PTS of the intra-frame coded pictures; and a PTS value predicting part 22b which calculates predicted values of the PTS of the intra-frame coded pictures from the current time and thereafter by adding natural-number multiple of the interval value of the PTS obtained by the PTS interval value predicting part 22a to the PTS of the intra-frame coded picture stored most recently in the past.

The PTS interval value predicting part 22a is configured, including: a PTS increase calculating part 22a-1 which calculates the increases in the values of the PTS of the intra-frame coded pictures of each channel; and a common divisor calculating part 22a-2 which calculates numerical values (predicted PTS interval values) that are to be the common divisors among each of the increases calculated by the PTS increase calculating part 22a-1.

The PTS value predicting part 22b is configured, including: a natural-number multiple determining part 22b-1 which determines a natural-number multiple for determining which of natural-number multiples the predicted values are to be calculated with; and a past PTS adding part 22b-2 which multiplies the natural-number multiple determined by the natural-number determining part 22b-1 to the numerical value (predicted PTS interval value) of the common divisor calculated by the common divisor calculating part 22a, and adds the PTS value of the intra-frame coded picture stored in the past to the obtained value.

The second predicting unit 24 predicts difference between the code receiving time of the intra-frame coded pictures to be received from the current time and thereafter and the presentation time information based on the code receiving time of the intra-frame coded pictures received in the past and the presentation time information, and predicts the code receiving time of the intra-frame coded pictures received from the current time and thereafter based on the predicted differences and the predicted presentation time information predicted by the first predicting unit 22.

Further, the second predicting unit 24 predicts the value obtained by adding a specific margin to the mean value of the differences between the code receiving time of the past and the presentation time information as the differences between the code receiving time of the intra-frame coded pictures received from the current time and thereafter and the presentation time information. The second predicting unit 24 is also considered as a second predicting device.

The second predicting unit 24 is configured, including: a receiving time-PTS difference predicting part 24a (may be referred to as a PTS difference predicting part for short hereinafter) which predicts differences between the receiving time of the codes of the intra-frame coded pictures to be received from the current time and thereafter and the PTS based on the code receiving time of the codes of the intra-frame coded pictures received in the past and the PTS; and a receiving time predicted value calculating part 24b which calculates predicted values of the code receiving time of the intra-frame coded pictures based on the differences between the value obtained by adding a prescribed margin to the mean value of the difference calculated by the PTS difference predicting part 24a and the predicted PTS calculated by the PTS value predicting part 22b of the first predicting unit 22.

The PTS difference predicting part 24a is configured, including: a difference mean value calculating part 24a-1 which calculates the mean value of the differences between the code receiving time of the codes of the intra-frame coded pictures received in the past and the PTS; and a margin setting processing part 24a-2 which performs setting of the margin and arithmetic processing so as to predict the value that is obtained by adding a prescribed margin to the difference mean value calculated by the difference mean value calculating part 24a-1 as the predicted difference.

The prediction calculating module control part 25 has a function of controlling the execution procedures of each part. For example, there is assumed a function which conducts a control in such a manner that arithmetic operation of the first predicting unit among the process for calculating the predicted values of the code receiving time of the intra-frame coded pictures is executed for a given channel, while executing an arithmetic operation of the second predicting unit for another channel, for example, among the process for calculating the predicted values of the code receiving time of the intra-frame coded pictures.

The channel selecting unit 26 determines the channel cyclic orders in such a manner that the round time of the target channels for collecting the representative images becomes the shortest, and carries out channel selection based on the predicted code receiving time predicted by the second predicting unit 24 included in the code receiving time predicting device. This channel selecting unit 26 may also be considered as a channel selection control device.

Further, the channel selecting unit 26 can obtain an approximate solution of the channel cyclic orders by performing the depth priority search through repeating selection of the representative image collection target channels. The channel selecting unit 26 calculates evaluation values for the channel selection orders based on the predicted code receiving time, and selects the channels in order from the one with the highest evaluation value, so that it is possible to determine the selecting orders of the channels through calculating the evaluation values based on the immediacy of the representative images to be collected or based on the collecting time. At that time, the channel selecting unit 26 can calculate the evaluation values as the round required time for going around the channels.

The channel selecting unit 26 is configured, including: a channel cyclic order determining processing part 26a (may be referred to as a channel order determining processing part for short hereinafter) which determines the channel cyclic orders of the representative image collection target channels based on the predicted code receiving time; and a channel selection processing part 26b which performs processing necessary for going around the channels, based on the channel cyclic orders determined by the channel cyclic order determining processing part 26a.

The channel order determining processing part 26a is configured, including: a first evaluation function calculating part 26a-1 which calculates a first evaluation function F1 for determining the cyclic orders of the unselected channels; and a first unselected channel selecting part 26a-2 which determines the cyclic orders of the unselected channels and conducts selection based on the first evaluation function calculation results calculated by the first evaluation function calculating part 26a-1.

Further, the channel order determining processing part 26a is configured, including: a second evaluation function calculating part 26a-3 which calculates a second evaluation function F2 for determining the cyclic orders, when there are a plurality of unselected channels that have the same calculation result of the first evaluation function F1; and a second unselected channel selecting part 26a-4 which determines the cyclic orders of the unselected channels and conducts selection based on the second evaluation function calculation results calculated by the second evaluation function calculating part 26a-3.

Further, the channel order determining processing part 26a is configured, including a channel determining processing control part 26a-5 which determines the final cyclic orders by taking the calculation results of the first evaluation function F1 and the second evaluation function F2 into consideration, and controls the execution procedures of each of the parts.

When selecting the next channel in that round in the search, the first evaluation function calculating part 26a-1 calculates the first evaluation function F1 for each of the unselected channels (CH) as follows, provided that the predicted code receiving time of the intra-frame coded picture of the channel selected just before is "T_P", and the predicted code receiving time of the intra-frame coded pictures received after the time T_P at the channel (CH) is "T_I(CH, T_P).

$$F1(CH)=T\_I(CH,T\_P)-T\_P$$

The first unselected channel selecting part 26a-2 selects the unselected channel whose calculation result of the first evaluation function F1 becomes the minimum as the channel to be aligned first.

When there are a plurality of unselected channels whose calculation results of the first evaluation function F1 are the minimum, the second evaluation function calculating part 26a-3 calculates the second evaluation function F2 for each of the unselected channels (CH) as follows, provided that the predicted code receiving time of the second intra-frame coded picture received after the time T_P at the channel (CH) is "T_II (CH, T_P)".

$$F2(CH)=T\_II(CH,T\_P)$$

The second unselected channel selecting part 26a-4 selects the unselected channel whose calculation result of the second evaluation function F2 becomes the maximum as the channel to be aligned first.

The channel determining processing control part 26a-5 can determine the final cyclic orders by considering the channels whose cyclic orders are determined by the first unselected channel selecting part 26*a*-2 and the channels whose cyclic orders are determined by the second unselected channel selecting part 26*a*-4.

The channel selection processing part 26*b* can perform control processing that is necessary for going around the channels, based on the channel cyclic orders determined by the channel cyclic order determining processing part 26*a*.

The time predicting/channel selecting device 20 of the dynamic image receiving apparatus 1 having the above-described structure operates roughly as follows. That is, the prediction calculating module control part 25 of the time predicting/channel selecting device 20 executes the first predicting unit 22 and the second predicting unit 24 for a single channel to calculate the predicted code receiving time of the intra-frame coded pictures and the predicted PTS. Similarly, the prediction calculating module control part 25 executes the first predicting unit 22 and the second predicting unit 24 for another channel to calculate the predicted code receiving times of the intra-frame coded pictures and the predicted PTS.

Specifically, the first predicting unit 22 executes the PTS interval value predicting part 22*a*, and utilizes the increases in the values of the PTS of the intra-frame coded pictures to predict a common divisor of the increases as the interval value of the PTS of the intra-frame coded pictures.

Subsequently, the first predicting unit 22 executes the PTS value predicting part 22*b* to calculate the predicted values of the PTS of the intra-frame coded pictures to be received from the current time and thereafter by adding the natural-number multiple of the interval value of the PTS obtained by the PTS interval value predicting part 22*a* to the PTS of the intra-frame coded picture stored most recently in the past.

Further, the second predicting unit 24 executes the receiving time-PTS difference predicting part 24*a* to predict the differences between the code receiving time of the codes of the intra-frame coded pictures to be received from the current time and thereafter and the PTS based on the code receiving time of the codes of the intra-frame coded pictures received in the past and the PTS.

Then, the second predicting unit 24 executes the receiving time predicted value calculating part 24*b* to calculate the predicted value of the code receiving time of the intra-frame coded picture based on the difference between the value obtained by adding the prescribed margin to the mean value of the differences calculated by the receiving time-PTS difference predicting part 24*a* and the predicted PTS calculated by the PTS value predicting part 22*b* of the first predicting unit 22.

When the predicted code receiving time and the predicted PTS of the intra-frame coded picture for each channel are calculated in this manner, the time predicting/channel selecting device 20 executes the channel selecting unit 26 to determine the channel cyclic orders.

Specifically, the channel selecting unit 26 executes the channel cyclic order determining processing part 26*a* to first calculate the first evaluation function F1 for each channel by the first evaluation function calculating part 26*a*-1, and determines the channel with the minimum first evaluation function to be the channel to be selected first by the first unselected channel selecting part 26*a*-2.

At this time, when there are a plurality of channels having the equal first evaluation function F1, the second evaluation function calculating part 26*a*-3 calculates the second evaluation function F2, and the second unselected channel selecting part 26*a*-4 determines the channel with the maximum second evaluation function F2 as the channel that is preferentially selected among the channels with the equal first evaluation function F1.

In this manner, it is possible with the channel determining processing control part 26*a*-5 to determine the final cyclic orders by taking the calculation results of the first evaluation function F1 and the second evaluation function F2 into consideration.

(Control Device)

The control device 30 of the dynamic image receiving apparatus according to the exemplary embodiment executes controls over each of the above-described parts, and it is configured, including a time information acquirement control unit 32 and a channel round control unit 34, as shown in FIG. 3.

The time information acquirement control unit 32 controls to receive the codes of the dynamic image coded stream by the coded stream receiving device 10, and judges whether or not there is a code of the intra-frame coded picture within the dynamic image coded stream. When there is a code, the time information acquirement control unit 32 controls to refer to the system clock 14 so as to obtain the code receiving time of the intra-frame coded picture and to store the code receiving time to the accumulative processing device 12, while controlling to store PTS information and DTS information added to the intra-frame coded picture contained in the dynamic image coded stream to the accumulative processing device 12.

Further, when there is no code found in the judgment, the time information acquirement control unit 32 controls to receive a next dynamic image stream of the same channel or a different channel by the coded stream receiving device 10 when the storing control processing to the accumulative processing device 12 is completed.

Specifically, the time information acquirement control unit 32 is configured, including: a dynamic image coded stream reception processing part 32*a* which controls to receive the codes of the dynamic image coded stream by the coded stream receiving device 10; a coded picture code judgment processing part 32*b* which controls to judge whether or not there is a code of the intra-frame coded picture within the dynamic image stream received by the coded stream receiving device 10; and a receiving time/PTS(DTS) acquirement processing part 32*c* which, when it is judged by the coded picture code judgment processing part 32*b* that there is a code of the intra-frame coded picture, controls to refer to the system clock 14 so as to obtain the code receiving time of the intra-frame coded picture and to store the code receiving time to the accumulative processing device 12, while controlling to store PTS information or DTS information added to the intra-frame coded picture contained in the dynamic image coded stream to the accumulative processing device 12.

The channel round control processing part 34 performs channel round control to align the coded stream receiving device 10 to the respective channels at each time, based on the channel cyclic orders (result of the search) determined by the time predicting/channel selecting device 20.

The channel round control processing unit 34 is configured, including: a time prediction/channel selection processing part 34*a* which controls to select a specific channel by the time predicting/channel selecting device 20 from the representative image collection target channels; a system time acquirement processing part 34*b* which obtains the system time by referring to the system clock 14; a time judgment processing part 34*c* which controls to judge whether or not the system time obtained by the system time acquirement processing part 34*b* is the predicted receiving time of the code of the intra-frame coded picture of the specific channel; a stream reception processing part 34*d* which, when it is judged by the time judgment processing part 34*c* that the system time is the predicted receiving time of the code of the intra-frame coded picture of the specific channel, aligns the coded stream receiving device 10 to the specific channel to receive and output the dynamic image stream of that specific channel; and a module control part 34e which controls each of those parts and controls the executing procedures.

In the stream reception processing part 34d, the codes of the outputted dynamic image stream include the code of the intra-frame coded picture. Thus, it is possible to create a representative image by an external device that has received the outputted dynamic image stream.

When the stream reception processing part 34d outputs the dynamic image stream of the specific channel, the module control part 34e executes the time prediction/channel selection processing part 34a again to control the time predicting/channel selecting device 20 to select another channel from the representative image collection target channels whose representative images are uncollected.

That is, the module control part 34e controls to generate the representative images of another channel by executing the time prediction/channel selection processing part 34a, the system time acquirement processing part 34b, the time judgment processing part 34c, and the stream reception processing part 34d, respectively.

After controlling to perform reception of the dynamic image coded stream containing the code of the intra-frame coded picture for all the representative image collection target channels and create the representative images of all the channels in this manner, the module control part 34e ends the processing.

Note here that a part of each block in the block diagrams shown in FIG. 1, FIG. 2, and FIG. 3 can be considered as a software module structure, which is functionalized with various programs that are stored in an appropriate memory and executed by a computer. That is, it is a single CPU or a plurality of CPUs (or a single or CPU(s) and a single or of a plurality of memory (memories)) in terms of the physical structure. However, the software structure with each part (device) expresses a plurality of functions enabled by the CPU with controls of the programs as structural elements of each of the plurality of parts (devices).

When the kinetic state where the CPU is executed by the program (state where each procedure configuring the program is being executed) is to be expressed functionally, it can be considered that each part (device) is structured inside the CPU. In a static state where the program is not being executed, the entire programs for enabling structures of each device (or each program part included in the structure of each device) are stored in a storage area such as a memory.

It is naturally understood that the explanations of each part (device) provided above describe the computer functionalized with the programs along with the functions of the programs or described an apparatus configured with a plurality of electronic circuit blocks that are functionalized permanently with specific hardware. Therefore, those functional blocks can be achieved in various kinds of forms such as only with hardware, only with software, or a combination of those, and there is no limit set to be one of those.

The control device 30 of the dynamic image receiving apparatus 1 having the structure as described above roughly operates as follows. That is, the time information acquirement control unit 32 of the control device 30 controls to execute the coded stream reception processing part 32a to receive the codes of the dynamic image coded stream by the coded stream receiving device 10.

Subsequently, the time information acquirement control unit 32 of the control device 30 executes the coded picture code judgment processing part 32b to judge whether or not there is a code of the intra-frame coded picture within the dynamic image coded stream that is received by the coded stream receiving device 10.

Then, when it is judged by the coded picture code judgment processing part 32b that there is a code of the intra-frame coded picture, the time information acquirement control unit 32 of the control device 30 executes the receiving time/PTS (DTS) acquirement processing part 32c to refer to the system clock 14 so as to obtain the code receiving time of the intra-frame coded picture and to store the code receiving time to the accumulative processing device 12, while controlling to store PTS information or DTS information added to the intra-frame coded picture contained in the dynamic image coded stream to the accumulative processing device 12.

Further, when there is no code found in the judgment, the time information acquirement control unit 32 of the control device 30 controls to execute the coded picture code judgment processing part 32b to receive a next dynamic image stream of the same channel or a different channel by the coded stream receiving device 10 when the storing control processing to the accumulative processing device 12 is completed.

Next, the channel round control unit 34 of the control device 30 controls to execute the time prediction/channel selection processing part 34a by the module control part 34e to select a specific channel from the representative image collection target channels by the time predicting/channel selecting device 20.

Further, the channel round control unit 34 of the control device 30 controls to execute the system time acquirement processing part 34b by the module control part 34e to obtain the system time by referring to the system clock 14.

Furthermore, the channel round control unit 34 of the control device 30 controls to execute the time judgment processing part 34c by the module control part 34e, and controls to judge whether or not the system time obtained by the system time acquirement processing part 34b is the predicted receiving time of the code of the intra-frame coded picture of the specific channel.

Then, the channel round control unit 34 of the control device 30 controls to execute the stream reception processing part 34d by the module control part 34e, and controls to receive and output the dynamic image stream of the specific channel by aligning the coded stream receiving device 10 to the specific channel, when it is judged by the time judgment processing part 34c that the system time is the predicted receiving time of the code of the intra-frame coded picture of the specific channel. Since the codes of the outputted dynamic image stream include the code of the intra-frame coded picture, it is possible to create the representative image by an external device that has received the outputted dynamic image stream.

(Regarding Processing Procedures)

Next, various processing procedures executed in the dynamic image receiving apparatus 1 having the above-described structure will be described by referring to FIG. 7 and FIG. 8. FIG. 7 is a flowchart showing an example of the whole processing procedures executed in the dynamic image receiving apparatus according to the exemplary embodiment. FIG. 8 is a flowchart showing an example of detailed processing procedures executed in the dynamic image receiving apparatus according to the exemplary embodiment.

First, the overall processing will be described, and details of each processing (a code receiving time predicting step, a channel selection control step, a round control step) will be described thereafter.

(Overall Processing)

The dynamic image stream is received by the dynamic image receiving apparatus 1 at the coded stream receiving device 10 shown in FIG. 1 (step S101 shown in FIG. 7). Then, when there is a code of the intra-frame coded picture within the codes of the stream (step S102 shown in FIG. 7), the receiving time of the code of the intra-frame coded picture is obtained by referring to the system clock 14, and the receiving time and the PTS of the picture are stored in the accumulative processing device 12 (step S103 shown in FIG. 7).

Then, the time predicting/channel selecting device 20 of FIG. 1 predicts the receiving time of the intra-frame coded pictures from the current time and thereafter for each of the representative image collection target channels based on the values of FIG. 6 stored in the accumulative processing device 12, and selects the channel for aligning the coded stream receiving device 10 based on the predicted receiving time (step S104 shown in FIG. 7).

It is so supposed in the exemplary embodiment 1 that the time is obtained in a unit of second. However, the unit of the time and expressed form thereof are not limited for applying the exemplary embodiment of the present invention.

Values shown in FIG. 6 are values obtained by going through the broadcasting channels in a cyclic manner with the coded stream receiving device 10, and it is not always possible to obtain the receiving time of the codes of all the intra-frame coded pictures of each channel and the PTS. Specifically, regarding the channel 1 in FIG. 6, for example, even though the intra-frame coded picture whose code receiving time and PTS (0:00 and 0:05) are obtained first is the picture "101" of FIG. 5, the second intra-frame coded picture whose code receiving time and PTS (0:11 and 0:17) are obtained next may not necessarily be the following intra-frame coded picture "107".

(Code Receiving Time Predicting Step)

More details of the processing procedure of step S104 will be described by referring to FIG. 8.

First, the interval value (PTS interval value) of the presentation time information as the increases in each presentation time information (PTS) is predicted. Then, there is executed the first predicting step (for example, a step including step S210 and S211 shown in FIG. 8) for predicting the presentation time information (PTS) of the intra-frame coded pictures to be received from the current time and thereafter based on the predicted presentation time information interval value and the presentation time information of the past.

As an example of a predicting method of the PTS interval that utilizes the increases in the values of the PTS of the intra-frame coded pictures of each channel shown in FIG. 6, there is a method which utilizes the common divisors of the increases.

That is, the common divisor of the increases is predicted as the PTS interval value of the intra-frame coded pictures by utilizing the increases in the values of the PTS of the intra-frame coded pictures of each frame (step S210) <PTS interval prediction processing step or PTS interval value predicting function>.

More specifically, in the case of FIG. 6, the increases in the PTS of the intra-frame coded pictures for the channel 1 can be calculated as follows, respectively (step s210a) <PTS increase calculation processing or PTS increase calculating function>.

0:17−0:05=0:12

0:35−0:17=0:18

0:59−0:35=0:24

Thus, the common divisor of the increases can be calculated as "0:06" (step S210b) <common divisor calculation processing step or common divisor calculating function>. Therefore, the common divisor "0:06" is predicted as the PTS interval value of the intra-frame coded pictures, and "0:06" becomes the predicted PTS interval value.

In a case where the PTS interval value prediction processing in this step S210 is executed on another channel after the processing is completed on a given channel, the PTS interval value prediction processing may be executed by returning to step S210 after completing step S213 performed thereafter, or may be executed in that step S210 repeatedly on another channel.

In any case, as in the case of channel 1, the increases in the PTS of the intra-frame coded pictures for the channel 2 in the case of FIG. 6 can be calculated as follows, respectively, by executing the PTS increase calculation processing step of step S210a.

0:10−0:03=0:07

0:31−0:10=0:21

0:45−0:31=0:14

Thus, the common divisor of the increases for the channel 2 can be calculated as "0:07" through executing the common divisor calculation processing step of step S210b. Therefore, "0:07" is the predicted PTS interval value of the intra-frame coded pictures for the channel 2.

Similarly, the increases in the PTS of the intra-frame coded pictures for the channel m in the case of FIG. 6 can be calculated as follows, respectively, by executing the PTS increase calculation processing step of step S210a.

0:23−0:07=0:16

0:35−0:23=0:12

0:51−0:35=0:16

Thus, the common divisor of the increases for the channel m can be calculated as "0:04" through executing the common divisor calculation processing step of step S210b. Therefore, "0:04" is the predicted PTS interval value of the intra-frame coded pictures for the channel m.

Then, the predicted value of the PTS (predicted PTS) of the intra-frame coded picture to be received from the current time and thereafter is calculated by adding natural-number multiple of the predicted PTS interval value obtained by the PTS interval value predicting part 22a to the PTS of the intra-frame coded picture stored most recently in the past (step S211) <PTS value prediction processing step or PTS value predicting function>.

More specifically, in the case of FIG. 6, the PTS of the inter-frame picture stored in the past most recently (most-recent past PTS) for the channel 1 is "0:59" provided that the current time is "1:00". Thus, the predicted PTS for the channel 1 can be calculated as follows by adding the natural-number multiple (n=1) of the PTS interval predicted value "0:06" to the most-recent past PTS "0:59" (step S211a) <past PTS adding processing step or past PTS adding function>.

0:59+0:06×1=1:05

This added value, "1:05", is taken as the predicted PTS.

Further, the past PTS adding processing of step S211a is also executed with a natural-number multiple (n=2) as follows.

0:59+0:06×2=1:11

This added value, "1:11", is taken as the predicted PTS.

Furthermore, the past PTS adding processing of step S211a is also executed with a natural-number multiple (n=3) as follows.

0:59+0:06×3=1:17

This added value, "1:17", is taken as the predicted PTS.

The past PTS adding processing step of step S211a is executed thereafter in the same manner until reaching the natural-number multiple (n=k). For example, with the natural-number multiple (n=k), it is judged whether or not the predicted PTS is calculated until a preset natural-number multiple (step S211b) <set natural-number multiple judgment processing step or set natural-number multiple judging function>.

When it is judged in the judgment processing that the predicted PTS is not calculated with the natural-number multiple (n=k), the past PTS adding processing of step S211a is executed. Then, when judged in the judgment processing that the predicted PTS is calculated with the natural-number multiple (n=k), the processing is advanced to a next step.

Similarly, in the case of FIG. 6, the PTS of the inter-frame picture stored most recently in the past (most-recent past PTS) for the channel 2 is "0:45" provided that the current time is "1:00". Thus, the predicted PTS for the channel 2 can be calculated as follows by adding the natural-number multiple (n=3) of the PTS interval predicted value "0:07" to the most-recent past PTS "0:45".

0:45+0:07×3=1:06

This added value, "1:06", is taken as the predicted PTS.

Further, the past PTS adding processing of step S211a is also executed with a natural-number multiple (n=4) as follows.

0:45+0:07×4=1:13

This added value, "1:13", is taken as the predicted PTS.

Furthermore, the past PTS adding processing of step S211a is also executed with a natural-number multiple (n=5) as follows.

0:45+0:07×5=1:20

This added value, "1:20", is taken as the predicted PTS. The same step is executed to calculate the values thereafter in the same manner.

Similarly, in the case of FIG. 6, the PTS of the inter-frame picture stored most recently in the past (most-recent past PTS) for the channel m is "0:51" provided that the current time is "1:00". Thus, the predicted PTS for the channel m can be calculated as follows by adding the natural-number multiple (n=3) of the PTS interval predicted value "0:04" to the most-recent past PTS "0:51".

0:51+0:04×3=1:03

This added value, "1:03", is taken as the predicted PTS.

Further, the past PTS adding processing of step S211a is also executed with a natural-number multiple (n=4) as follows.

0:51+0:04×4=1:07

This added value, "1:07", is taken as the predicted PTS.

Furthermore, the past PTS adding processing of step S211a is also executed with a natural-number multiple (n=5) as follows.

0:51+0:04×5=1:11

This added value, "1:11", is taken as the predicted PTS. The predicted PTS is calculated thereafter in the same manner.

In summary, the predicted PTS for the channel 1 becomes "1:05", "1:11", "1:17", - - - , provided that the current time is "1:00". The predicted PTS for the channel 2 becomes "1:06", "1:13", "1:20", - - - , and the predicted PTS for the channel m becomes "1:03", "1:07", "1:11", - - - .

Next, there is executed the second predicting step (for example, the step including step S212 and step S213 shown in FIG. 8) which predicts a predicted difference value that is a difference between the code receiving time and the PTS based on the predicted PTS interval value, and predicts the predicted code receiving time from the predicted difference value.

First, the differences between the receiving time of the codes of the intra-frame coded pictures to be received from the current time and thereafter and the PTS are predicted based on the receiving time of the codes of the in-frame pictures received in the past (step S212) <receiving time-PTS difference prediction processing step or receiving time-PTS difference predicting function>.

As an example of the difference predicting method, there is a calculating method that calculates the predicted value of the code receiving time of the intra-frame coded picture based on a value obtained by adding a prescribed margin to a mean value of the differences between the PTS and the receiving time of the codes of the intra-frame coded pictures received in the past and the predicted PTS calculated in step S211 described above.

In this case, it can be also considered that the second predicting step predicts the value obtained by adding the prescribed margin to the mean value of the differences between the code receiving time of the past and the presentation time information as the difference between the code receiving time of the intra-frame coded picture to be received from the current time and thereafter and the presentation time information.

More specifically, in the case of FIG. 6, the differences between the code receiving times of the intra-frame coded pictures and the PTS for the channel 1 can be calculated as follows, respectively <difference calculating step or difference calculating function>.

0:05−0:00=0:05

0:17−0:11=0:06

0:35−0:31=0:04

0:59−0:54=0:05

The mean value of those differences can be calculates as follows (step S211a) <difference mean value calculation processing step or difference mean value calculating function>.

(0:05+0:06+0:04+0:05)/4=0:05

Further, the specific margin added to the difference mean value in this exemplary embodiment is set as "0:01" (step S211b) <margin setting processing or margin setting processing function>.

Thus, the predicted values of the code receiving time of the intra-frame coded pictures can be calculated as follows for the channel 1 based on the predicted PTS, the difference mean value obtained in step S212a, and the specific margin of step S211b mentioned above (step S213) <receiving time predicted value calculation processing step or receiving time predicted value calculating function>.

1:05−(0:05+0:01)=0:59

1:11−(0:05+0:01)=1:05

1:17−(0:05+0:01)=1.11

Thus, the predicted values of the code receiving time of the intra-frame coded pictures after the current time (1:00) can be calculated as "1.05+0.06×(n−1)" (n is a natural number).

Similarly, the difference mean value calculation processing step of step S211a is performed for the channel 2 of the case shown in FIG. 6. First, the differences between the code receiving time of the intra-frame coded pictures and the PTS can be calculated as follows.

0:03−0:01=0:02

0:10−0:07=0:03

0:31−0:28=0:03

0:45−0:41=0:04

The mean value of those differences can be calculated as follows.

(0:02+0:03+0:03+0:04)/4=0:03

The specific margin added to the difference mean value in this exemplary embodiment is set as "0:01".

Thus, the predicted values of the code receiving time of the intra-frame coded pictures can be calculated as follows for the channel 2 by executing the receiving time predicted value calculation processing step of step S213, which calculates the predicted values of the code receiving time of the intra-frame coded pictures based on the predicted PTS, the difference mean value obtained in step S212a, and the specific margin of step S211b mentioned above.

1:06−(0:03+0:01)=1:02

1:13−(0:03+0:01)=1:09

1:20−(0:03+0:01)=1:16

Thus, the predicted values of the code receiving time of the intra-frame coded pictures to be received from the current time and thereafter can be calculated as "1.02+0.07×(n−1)" (n is a natural number).

Similarly, the difference mean value calculation processing step of step S211a is performed for the channel m of the case shown in FIG. 6. First, the differences between the code receiving time of the intra-frame coded pictures and the PTS can be calculated as follows.

0:07−0:03=0:04

0:23−0:18=0:05

0:35−0:31=0:04

0:51−0:48=0:03

The mean value of those differences can be calculated as follows.

(0:04+0:05+0:04+0:03)/4=0:04

The specific margin added to the difference mean value in this exemplary embodiment is set as "0:01".

Thus, the predicted values of the code receiving time of the intra-frame coded pictures can be calculated as follows for the channel m by executing the receiving time predicted value calculation processing step of step S213, which calculates the predicted values of the code receiving times of the intra-frame coded pictures based on the predicted PTS, the difference mean value obtained in step S212a, and the specific margin of step S211b mentioned above.

1:03−(0:04+0:01)=0.58

1:07−(0:04+0:01)=1:02

1:11−(0:04+0:01)=1.06

Thus, the predicted values of the code receiving times of the intra-frame coded pictures to be received from the current time and thereafter can be calculated as "1.02+0.04×(n−1)" (n is a natural number).

The predicted code receiving time is calculated for each channel in this manner. Then, it is judged whether or not there is any other channel whose predicted value is not calculated, for example (step S214) <predicted code receiving time calculation state judgment processing step or predicted code receiving time calculation state judging function>.

When it is found in this judgment processing that there is another channel whose predicted code receiving time is not calculated, the procedure is returned to step S210 to execute each step. In the meantime, when it is found in this judgment processing that the predicted code receiving time for all the channels is calculated, the procedure is advanced to a next step.

Note here that it is merely an example to execute such judgment processing (judges whether or not the processing has been done for other channels) in a latter stage of step S213, and that there are various other methods as well. For example, such judgment processing may be executed, respectively, in a latter stage of step S210, a latter stage of step S211, a latter stage of step S212, and a latter stage of step S213. Further, such judgment processing may be executed, respectively, in a latter stage of step S210a, a latter stage of step S210b, a latter stage of step S211a, a latter stage of step S211b, a latter stage of step S212a, a latter stage of step S212b, and a latter stage of step S213.

(Channel Selection Control Step)

Next, there are described details of the processing of the selection control step for selecting and determining the channel cyclic orders based on the predicted code receiving time of each channel.

In the channel selection control step, channel selection is conducted by determining the channel cyclic orders in such a manner that the round time of the representative image collection target channels becomes the shortest, based on the predicted code receiving time predicted in the code receiving time predicting step (step including step S215 and step S216).

First, the time predicting/channel selecting device 20 determines the channel cyclic orders in such a manner that round time of the representative image collection target channels becomes the shortest based on the predicted code receiving time of the intra-frame coded pictures, and conducts channel selection based on the cyclic orders (step S215) <channel cyclic order determining processing step or channel cyclic order determining processing function>.

As a method for determining the channel cyclic orders, it is possible to use a combination optimizing algorithm, for example.

In this exemplary embodiment, selection of the representative image collection target channels is repeated to conduct the depth priority search to obtain an approximate solution of the channel cyclic orders.

Further, in the channel selection control step, the evaluation values for the channel selection orders are calculated based on the predicted code receiving time, and selects the channels in order from the one with the highest evaluation value. The selection orders of the channels are determined by calculating the evaluation values based on the immediacy of the representative images to be collected or the collecting time. Further, in the channel selection control step, the evaluation values are calculated as the round required time that is required for going around the channels.

When selecting a next channel in that depth priority search, following evaluation function F1 (first evaluation function) is calculated for each unselected channel CH (step S215a) <first evaluation function calculation processing step or first evaluation function calculating function>.

$$F1(CH)=T\_I(CH,T\_P)-T\_P \quad \text{(First evaluation function)}$$

Note here that "T_P" is a predicted code receiving time of the intra-frame coded picture of the channel selected just before. Further, when selecting a first channel in that round, "T_P" is taken as the current time. Furthermore, "T_I(CH, T_P)" is the predicted receiving time of the intra-frame coded picture that is received after the time T_P at the channel CH.

For selecting the next target channel of that round, the unselected channels having the minimum values of F1(1), F1(2), - - -, F1(m) are selected based on the calculation results of the first evaluation functions F1(1), F1(2), - - -, F1(m) of each channel obtained in the first evaluation function calculation processing of step S215 described above (step S215b) <first channel selection processing step or first channel selecting function>.

It is judged then whether or not there are a plurality of unselected channels with the minimum values of the first evaluation functions F1(1), F1(2), - - -, F1(m) (step S215c) <minimum-value channel number judgment processing step or minimum-number channel number judging function>.

When it is judged in step S215c that there is only a single unselected channel whose first evaluation function F1 is the minimum, the procedure is advanced to step S215f. In the meantime, when it is judged in step S215c that there are a plurality of unselected channels with the minimum first evaluation function F1, a following second evaluation function F2 (second evaluation function) is calculated (step S215c) <second evaluation function calculation processing step or second evaluation function calculating function>.

$$F2(CH)=T\_II(CH,T\_P) \quad \text{(Second evaluation function)}$$

"T_II(CH, T_P)" is a predicted code receiving time of a second intra-frame coded picture received at the channel CH after the time T_P.

Among the unselected channels with the minimum F1, the channel with the maximum value of the second evaluation function F2 is selected (step S215d) <second channel selection processing step or second channel selecting function>.

In this manner, the processing for determining the final channel cyclic orders is executed based on the calculation results of the first evaluation function F1 and the second evaluation function F2 (step S215f) <order determining processing step or order determining function>.

More specifically, the channel to be aligned first the coded stream receiving device 10 is determined. That is, the result of step S213 obtained by the time predicting/channel selecting device 20 are as follows.

Channel 1: 1:05+0:06×(n−1) (n is a natural number)

Channel 2: 1:02+0:07×(n−1) (n is a natural number)

Channel m: 1:02+0:04×(n−1) (n is a natural number)

Therefore, the values of the first evaluation function F1 calculated in step S215a described above are as follows.

$F1(1)=0:05$ $F1(2)=0:02$ $F1(m)=0:02$

Since "F1(2)=F1(m)", the values of the second evaluation function F2 for the channel 2 and the channel m are calculated in step S215d as follows.

$F2(2)=1:09$ $F2(m)=1:06$

At this time, the channel to be aligned first is determined as "channel 2", since F2(2)>F2(m).

Then, the channel for the coded stream receiving device 10 to be aligned next is selected.

The values of the first evaluation function F1 for the unselected channels 1 and m are calculated as follows in step S215a.

$F1(1)=0:03$ $F1(m)=0:04$

At this time, the channel to be aligned next is determined as "channel 1", since F2(1)<F2(m).

Therefore, the final cyclic orders are determined as the channel 2, the channel 1, the channel m in step S215f.

(Round Control Step)

From the results of the search described above, the coded stream receiving device 10 is aligned to the channel 2, the channel 1, and the channel m at the time "1:02", "1:05", and "1:06", respectively, to select the channels in order in a cyclic manner (step S216) <channel selection processing step or channel selection processing function>.

In this step, when a given channel is selected for that round, steps S104, S105, S106, S107 shown in FIG. 7 are repeatedly executed and, for another channel to be selected next, steps S104, S105, S106, S107 shown in FIG. 7 are repeatedly executed. Thereafter, the same processing is repeated for each channel in the same manner.

First, the time predicting/channel selecting device 20 selects the channel 2 from the representative image collection target channels (step S104 of FIG. 7).

The dynamic image receiving apparatus 1 as the representative image receiving device obtains the system time by referring to the system clock 14 (step S105 of FIG. 7).

When the system time is "1:02" that is the predicted receiving time of the code of the intra-frame coded picture of the channel 2 (step S106 of FIG. 7), the time predicting/channel selecting device 20 receives and outputs the dynamic image stream of the channel 2 by aligning the coded stream receiving device 10 to the channel 2 (step S107 of FIG. 7). The procedure is then returned to step S104.

Since the codes of the outputted dynamic image include the code of the intra-frame coded picture, it is possible to create the representative image by an external device that has received the outputted dynamic image stream.

Then, the channel 1 is selected from the representative image collection target channels whose representative images are uncollected (step S104 of FIG. 7).

The dynamic image receiving apparatus 1 as the representative image receiving device obtains the system time by referring to the system clock 14 (step S105 of FIG. 7).

When the system time is "1:05" that is the predicted receiving time of the code of the intra-frame coded picture of the channel 1 (step S106 of FIG. 7), the time predicting/channel selecting device 20 receives and outputs the dynamic image stream of the channel 1 by aligning the coded stream receiving device 10 to the channel 1 (step S107 of FIG. 7). The procedure is then returned to step S104.

Then, the channel m is selected from the representative image collection target channels whose representative images are uncollected (step S104 of FIG. 7). The dynamic image receiving apparatus 1 as the representative image receiving device obtains the system time by referring to the system clock 14 (step S105 of FIG. 7).

When the system time is "1:06" that is the predicted receiving time of the code of the intra-frame coded picture of the channel m (step S106 of FIG. 7), the time predicting/channel selecting device 20 receives and outputs the dynamic image stream of the channel m by aligning the coded stream receiving device 10 to the channel m (step S107 of FIG. 7). The procedure is returned to step S104. Since the dynamic image coded streams including the codes of the intra-frame coded pictures for all the representative image collection target channels are completed, the processing is ended.

(Regarding Effects)

As described above, it is possible with this exemplary embodiment to achieve the same operational effects as those of the exemplary embodiment 1.

In a case of obtaining intra-frame coded pictures that can be decoded by themselves to be used for creating representative images in order of the channel numbers such as the channel 1, the channel 2, and the channel m without using the dynamic image receiving apparatus according to the exemplary embodiment 1 of the present invention, when the codes of the intra-frame coded pictures are received at the predicted time, the receiving time of the codes of the intra-frame coded pictures are "1:05", "1:09", and "1:10". Thus, there requires 10 sec. from the input of the instruction for collecting the representative images.

In the meantime, when the dynamic image receiving apparatus according to this exemplary embodiment is used, collection of the representative images is completed in 6 sec. from the instruction for collecting the representative images. Therefore, it is possible with this exemplary embodiment to shorten the time for collecting the representative images by 4 sec.

When the details of the broadcast contents are unknown even though the genres of the broadcast contents are known because of the specialization of the broadcast contents in each channel achieved with multiple channels, this exemplary embodiment designates the representative image collection target channel among the broadcasting channels. This makes it possible to obtain an effect of shortening the time required for collecting the representative images while reflecting the intention of the viewer that collects the representative images and an effect of suppressing the number of placed coded stream receiving devices, and to obtain an effect of suppressing necessary bandwidths of the transmission path of the dynamic image stream.

Since the history of the PTS of the intra-frame coded pictures received in the past and the interval value between the PTS of the neighboring intra-frame coded pictures within a same dynamic image stream are uniform, the time of receiving the codes of the intra-frame coded pictures from the current time and thereafter can be predicted with high accuracy through: predicting the PTS of the intra-frame coded pictures of the current time and thereafter; predicts a difference between the time of receiving the codes of the intra-frame coded pictures from the current time and thereafter and the PTS based on the history of the receiving time of the codes of the intra-frame coded pictures received in the past and the PTS; and subtracts the predicted difference from the predicted PTS to predict the time of receiving the codes of the intra-frame coded pictures to be received from the current time and thereafter.

When predicting the PTS of the intra-frame coded pictures of the current time and thereafter, the use of the common divisor of the increases in the PTS of the intra-frame coded pictures received in the past makes it possible to predict the interval value of the PTS of the intra-frame coded pictures that are neighboring to each other in terms of time within a same dynamic image stream with high accuracy even if the PTS of the intra-frame coded pictures that are neighboring to each other within a same dynamic image stream is not obtained in the history.

When predicting the difference between the receiving time of the codes of the intra-frame coded pictures of the current time and thereafter and the PTS, the prediction can be conducted accurately by adding a prescribed margin to the mean value of the differences between the receiving time of the codes of the intra-frame coded pictures received in the past and the PTS. At the same time, it is possible to reduce the probability of loosing the intra-frame coded picture that the viewer tries to receive, because the code of the picture reaches the dynamic image receiving apparatus before the predicted time of receiving the code of the intra-frame coded picture to be received from the current time and thereafter.

Through having the channel selection executed by the coded stream receiving device at the predicted code receiving time, it is possible to achieve the effect of shortening the time from the point of selecting the channel to the point of receiving the code of the intra-frame coded picture.

Further, through determining the cyclic order of the channels as the targets for collecting the representative images by the combination optimizing algorithm based on the predicted receiving times for receiving the codes, the time required for rounding the channels to collect the representative images can be shortened.

This exemplary embodiment uses the depth priority search based on the evaluation functions that are calculated from the predicted time of receiving the codes of the intra-frame coded pictures for optimization of the combinations. However, it is also possible to use combination optimizing methods such as a simulated annealing method and a hereditary algorithm.

Further, when dynamic image streams transmitted via a plurality of channels are received fragmentarily by switching the channels (particularly when inter-frame predicted/coded dynamic images are transmitted), it is possible as the dynamic image receiving apparatus to receive the streams of each channel in a short time without increasing the processing capacity and the communicable amount required for the receiving device.

Since the code receiving time of the intra-frame coded pictures is predicted by considering the PTS or DTS which has the periodicity in the time interval, it is possible to improve the prediction accuracy compared to a case where prediction is conducted only with the code receiving time of the intra-frame coded pictures.

Other structures, other steps, and the operational effects thereof are the same as those of the case of the exemplary embodiment 1 described above. Further, the operation contents of each step and the structural elements of each part described above may be put into a program to be executed by a computer.

Exemplary Embodiment 4-3

Next, an exemplary embodiment 4-3 of the present invention will be described by referring to FIG. 9. In the followings, explanations of substantially the same structures as those of the exemplary embodiment 4-1 will be omitted, and only the different points will be explained. FIG. 9 is a block diagram showing a dynamic image receiving apparatus according to the exemplary embodiment 4-3 of the present invention.

This exemplary embodiment is structured to conduct prediction by a second predicting unit 124 by utilizing a histogram, and to perform channel selection by a channel selecting unit 126 by using a third evaluation function in addition to using the first and the second evaluation functions. This structure will be described in detail hereinafter.

(Regarding Structure)

First, details of the structure of the dynamic image receiving apparatus 1 will be described by referring to FIG. 9. FIG. 9 is a block diagram showing an example of a detailed structure of a time predicting/channel selecting device of the dynamic image receiving apparatus according to this exemplary embodiment.

The dynamic image receiving apparatus according to the exemplary embodiment discloses an example of a case where the time predicting/channel selecting device 20 shown in FIG. 1 is structured as the time predicting/channel selecting device 120 shown in FIG. 9. Structures of each of other parts are the same as those of the exemplary embodiment 1.

(Time Predicting/Channel Selecting Device)

In FIG. 9, the time predicting/channel selecting device 120 is configured, including: a first predicting unit 122, the second predicting unit 124; a prediction calculating module control part 125; and the channel selecting unit 126.

The first predicting unit 122 predicts the presentation time of the intra-frame coded pictures from the current time and thereafter based on the presentation time of the past.

Further, the first predicting unit 122 takes the minimum value of the increases in the values of each presentation time information as an interval value of the presentation time information, and predicts the presentation time information of the intra-frame coded pictures from the current time and thereafter based on the predicted presentation information interval value and the presentation time information of the intra-frame coded picture received most recently. This first predicting unit 122 can also be considered as a first predicting device.

More specifically, the first predicting unit 122 is configured, including: a PTS interval value predicting part 122a which utilizes the increases in the values of the PTS of the intra-frame coded pictures received in the past in a specific channel to predict the minimum value of the increases as the interval value of the PTS of the intra-frame coded pictures; and a PTS value predicting part 122b which calculates predicted values of the PTS of the intra-frame coded pictures from the current time and thereafter by adding a natural-number multiple of the interval value of the PTS obtained by the PTS interval value predicting part 122a to the PTS of the intra-frame coded picture stored most recently in the past (received lastly).

The PTS interval predicting part 122a is configured, including: a PTS increase calculating part 122a-1 which calculates the increases in the values of the PTS of the intra-frame coded pictures of each channel; and a minimum value calculating part 122a-2 which calculates the numerical value (predicted PTS interval values) that is to be the minimum value among each of the increases calculated by the PTS increase calculating part 122a-1.

The PTS value predicting part 122b is configured, including: a natural-number multiple determining part which determines natural-number multiples for determining until which of natural-number multiples the predicted values are to be calculated with; and a past PTS adding part which multiplies the natural-number multiple determined by the natural-number determining part to the minimum value (predicted PTS interval value) calculated by the minimum value calculating part 122a, and adds the PTS value of the intra-frame coded picture stored in the past to the obtained value.

The second predicting unit 124 predicts the code receiving times based on the presentation times predicted by the first predicting unit 122.

Further, the second predicting unit 124 predicts the differences between the code receiving time of the intra-frame coded pictures to be received from the current time and thereafter and the presentation time information based on the code receiving time of the intra-frame coded pictures received in the past and the presentation time information, and predicts the code receiving time of the intra-frame coded pictures to be received from the current time and thereafter based on the predicted differences and the presentation time information predicted by the first predicting unit 122.

Furthermore, the second predicting unit 124 generates a histogram of differences between the code receiving time of the past and the presentation time information, selects a class with the percent point of the histogram where the accumulated probability becomes more than a prescribed percentage, and predicts the measure of central tendency of that class as the difference between the code receiving time of the inter-frame coded picture to be received from the current time and thereafter and the presentation time information. The second predicting unit 124 can also be considered as a second predicting device.

The second predicting unit 124 is configured, including: a receiving time-PTS difference predicting part 124a which predicts differences between the receiving time of the codes of the intra-frame coded pictures to be received from the current time and thereafter and the PTS based on the code receiving time of the codes of the intra-frame coded pictures received in the past and the PTS; and a receiving time predicted value calculating part 124b which calculates predicted values of the code receiving time of the intra-frame coded pictures based on the predicted difference values calculated by the receiving time-PTS difference predicting part 124a and the predicted values of the PTS of the intra-frame coded pictures to be received from the current time and thereafter.

The receiving time-PTS difference predicting part 124a is configured, including: a difference histogram calculating part 124a-1 which calculates and generates a histogram of the differences between the code receiving time of the intra-frame coded pictures received in the past and the PTS; and a percent point calculating part 124a-2 which performs calculation for selecting the class of the percent point where the accumulated probability becomes more than a prescribed percentage in the histogram that is calculated and generated by the difference histogram calculating part 124a-1; and a predicted difference value determining part 124a-3 which calculates the measure of central tendency of the class with that percent point calculated by the percent point calculating part 124a-2, and predicts the measure of central tendency as the difference between the code receiving time of the inter-frame coded picture to be received from the current time and thereafter and the presentation time information.

The prediction calculating module control part 125 has a function of controlling the execution procedures of each part. For example, there is assumed a function which conducts a control in such a manner that arithmetic operation of the first predicting unit among the process for calculating the predicted values of the code receiving time of the intra-frame coded pictures is executed for a given channel, while executing an arithmetic operation of the second predicting unit for another channel, for example, among the process for calculating the predicted values of the code receiving time of the intra-frame coded pictures.

The channel selecting unit 126 determines the channel cyclic orders in such a manner that the round time of the target channels for collecting the representative images becomes the shortest, and carries out channel selection based on the predicted code receiving time predicted by the second predicting unit 124 included in the code receiving time predicting device. This channel selecting unit 126 may also be considered as a channel selection control device.

Further, the channel selecting unit 126 can obtain an approximate solution of the channel cyclic orders by performing the depth priority search through repeating selection of the representative image collection target channels. The channel selecting unit 126 calculates evaluation values for the channel selection orders based on the predicted code receiving time, and selects the channels in order from the one with the highest evaluation value, so that it is possible to determine the selecting orders of the channels through calculating the evaluation values based on the immediacy of the representative images to be collected or based on the collecting time. At that time, the channel selecting unit 126 can calculate the evaluation values as the round required time for going around the channels.

The channel selecting unit 126 is configured, including: a channel cyclic order determining processing part 126a which determines the channel cyclic orders of the target channels for collecting the representative images based on the predicted code receiving time; and a channel selection processing part 126b which performs processing necessary for going around the channels, based on the channel cyclic orders determined by the channel cyclic order determining processing part 126a.

The channel cyclic order determining processing part 126a is configured, including: a third evaluation function calculating part 126a-5 which calculates a third evaluation function F3 for determining the cyclic orders of the unselected channels; a first evaluation function calculating part 126a-1 which calculates a first evaluation function F1 for determining the cyclic orders of the unselected channels with the same value when there are a plurality of unselected channels that have the same calculation result of the third evaluation function F3; and a first unselected channel selecting part 126a-2 which performs selection control to determine the priority of the cyclic orders of the channels having the same calculation result value of the third evaluation function F3, based on the calculation result of the first evaluation function F1 calculated by the first evaluation function calculating part 126a-1.

Further, the channel cyclic order determining processing part 126a is configured, including: a second evaluation function calculating part 126a-3 which calculates a second evaluation function F2 for determining the priority of the cyclic orders in the channels with the same value, when there are a plurality of unselected channels that have the same calculation result of the first evaluation function F1; and a second unselected channel selecting part 126a-4 which performs selection control to determine the cyclic orders of the unselected channels that have the same calculation result of the third evaluation function F3 and the same calculated value of the first evaluation function F1, based on the second evaluation function calculation results calculated by the second evaluation function calculating part 126a-3.

Further, the channel cyclic order determining processing part 126a is configured, including: a channel priority determining part 126a-6 which allots the channel cyclic order priority to each of the unselected channels based on the calculation results of the third evaluation function F3 calculated by the third evaluation function calculating part 126a-5, and determines the final cyclic order priority by synthetically considering the priority determined based on the third evaluation function F3, the priority determined by the first unselected channel selecting part 126a-2, and the priority determined by the second unselected channel selecting part 126a-4; and a channel determining processing control part 126a-7 which controls execution orders of each of those part.

The third evaluation function calculating part 126a-5 calculates, for the representative image collection target channels CH, the third evaluation function F3(CH) that is defined as follows based on the differences between the current time and the predicted PTS (or DTS) of the intra-frame coded pictures.

That is, when representative images are not collected in the past, the third evaluation function F3(CH) in a channel (CH) is defined as "F3(CH)=$\infty$". When representative images are collected in the past, it is defined as "F3(CH)=T_C-T_Prv (CH)".

Note here that "T_C" is the current time, "T_Prv(CH)" is the PTS (or DTS) of the representative image that is collected in the past for the channel CH.

The channel priority determining part 126a-6 selects the channels in order from the one with the highest priority that is set by using the third evaluation function F3(CH), the first evaluation function F1(CH), and the second evaluation function F2(CH). More specifically, the priority P(CH) of the channels CH is set to be higher for the channel with a larger value of F3(CH). When there are a plurality of channels having the same value of F3(CH), the priority is set to be higher for the channel with a larger value of F1(CH). Further, when there are a plurality of channels having the same value of F1(CH), the priority is set to be higher for the channel with a larger value of F2(CH).

As described, the channel selecting unit 126 can also be considered as a channel selection control device. Based on the difference between the current time and the predicted presentation time information of the intra-frame coded pictures or the decoding time information, this channel selection control device calculates the third evaluation function F3 as "F3 (CH)= T_C-T_Prv(CH)" when the representative image is collected in the past, and calculates it as "F3(CH)=$\infty$" when no representative image is collected in the past for the representative image collection target channel (CH), provided that the current time is "T_C", the predicted presentation time information or the decoding time information of the intra-frame coded pictures of the representative images collected in the past for the channel CH is "T_Prv(CH)". The selection control unit 126 sets the channel with the largest value of the calculation result of the third evaluation function F3 as the channel to be selected preferentially, and performs control to select the channel in order from the one with the highest priority.

Further, when there are a plurality of channels with the same calculation result of the third evaluation function F3, the channel selection control device sets the priority to be higher for the channel with a larger evaluation result of the first evaluation function F1.

Further, if there are also a plurality of channels with the same calculation result of the first evaluation function F1 when setting the priority by using the third evaluation function F3, the channel selection control device sets the priority to be higher for the channel with a larger evaluation result of the second evaluation function F2.

The time predicting/channel selecting device 120 of the dynamic image receiving apparatus 1 having the above-described structure operates roughly as follows. That is, the prediction calculating module control part 125 of the time predicting/channel selecting device 120 executes the first predicting unit 122 and the second predicting unit 124 for a single channel to calculate the predicted code receiving time of the intra-frame coded pictures and the predicted PTS. Similarly, the prediction calculating module control part 125 executes the first predicting unit 122 and the second predicting unit 124 for another channel to calculate the predicted code receiving time of the intra-frame coded pictures and the predicted PTS.

Specifically, the first predicting unit 122 executes the PTS interval value predicting part 122*a*, and utilizes the increases in the values of the PTS of the intra-frame coded pictures to predict the minimum value of the increases as the interval value of the PTS of the intra-frame coded pictures.

Subsequently, the first predicting unit 122 executes the PTS value predicting part 122*b* to calculate the predicted values of the PTS of the intra-frame coded pictures to be received from the current time and thereafter by adding the natural-number multiple of the interval value of the PTS obtained by the PTS interval value predicting part 122*a* to the PTS of the intra-frame coded picture stored most recently in the past.

Further, the second predicting unit 124 executes the receiving time-PTS difference predicting part 124*a* to predict the differences between the code receiving time of the codes of the intra-frame coded pictures to be received from the current time and thereafter and the PTS based on the code receiving times of the codes of the intra-frame coded pictures received in the past and the PTS.

Specifically, the receiving time-PTS difference predicting part 124*a* of the second predicting unit 124: creates a histogram of the differences between the code receiving time of the intra-frame coded pictures received in the past and the presentation time information; selects the class of the percent point where the accumulated probability becomes more than a prescribed percentage in the histogram; and predicts the measure of central tendency of that class as the difference between the code receiving time of the inter-frame coded picture to be received from the current time and thereafter and the presentation time information.

The receiving time predicted value calculating part 124*b* of the second predicting unit 124 calculates predicted values of the code receiving time of the intra-frame coded pictures by adding natural-number multiples of the predicted difference values calculated by the receiving time-PTS difference predicting part 124*a* to the predicted values of the PTS of the intra-frame coded pictures to be received from the current time and thereafter.

When the predicted code receiving time of the intra-frame coded picture and the predicted PTS for each channel are calculated in this manner, the time predicting/channel selecting device 120 executes the channel selecting unit 126 to determine the channel cyclic orders.

Specifically, the channel cyclic order determining processing part 126*a* of the channel selecting unit 126 executes the first channel determining processing control part 126*a*-7 to first calculate the third evaluation function F3 for each channel by the third evaluation function calculating part 126*a*-5, and has the channel priority determining part 126*a*-6 allot the channel with the higher value of the third evaluation function to be the channel with the higher priority.

When it is found at this point by the channel priority determining part 126*a*-6 that there are a plurality of channels having the same value of the third evaluation function F3, the channel determining processing control part 126*a*-7 executes the first evaluation function calculating part 126*a*-1 to calculate the first evaluation function F1 for the plurality of channels having the same F3 value.

Then, the channel determining processing control part 126*a*-7 executes the first unselected channel selecting part 126*a*-2 to determine the channel having the minimum value of the first evaluation function F1 to be the channel to be selected first.

When it is found at this point by the first unselected channel selecting part 126*a*-2 that there are a plurality of channels having the same value of the first evaluation function F1, the channel determining processing control part 126*a*-7 executes the second evaluation function calculating part 126*a*-3 to calculate the second evaluation function F2 for the plurality of channels having the same F1 value.

Then, the channel determining processing control part 126*a*-7 executes the second unselected channel selecting part 126*a*-4 to determine the channel having the maximum value of the second evaluation function F2 to be the channel to be selected first.

In this manner, the channel determining processing control part 126*a*-7 executes the channel priority determining part 126*a*-6 to allot the final priority for the cyclic orders of the channels (determine the cyclic orders) by considering the priority determined by the first unselected channel selecting part 126*a*-2 and the priority of the second unselected channel selecting part 126*a*-4 along with the priority based on the calculation results of the third evaluation function F3.

(Regarding Processing Procedures)

Next, various processing procedures executed in the dynamic image receiving apparatus 1 having the above-described structure will be described by referring to FIG. 10-FIG. 13. FIG. 13 is a flowchart showing an example of the whole processing procedures executed in the dynamic image receiving apparatus according to the exemplary embodiment.

The overall processing of the processing procedures of this exemplary embodiment are common to those of the exemplary embodiment 1, so that explanation thereof will be omitted, and details of each processing (a predicting step, a selection control step, a round control step) will only be described.

Now, the prerequisites of this exemplary embodiment will be described. It is supposed that the dynamic image receiving apparatus 1 of FIG. 1 receives m-numbers of dynamic image streams (m is a natural number of 4 or more) shown in FIG. 4 and FIG. 5, and the representative image collection target channels are designated as the channel 1, the channel 2, the channel 3, and the channel m.

Further, it is assumed that the receiving time of the codes of the intra-frame coded pictures received in the past and the PTS stored in the accumulative processing device 12 of the dynamic image receiving apparatus are obtained as in FIG. 10, as a result of applying steps S101-S103 of FIG. 7 to the dynamic image stream.

It is supposed here that the time at the point of the input of the instruction for collecting the representative images is "3:00", and this time is taken as the current time.

Further, regarding the channel 1, the channel 2, and the channel 3 among the representative image collection target channels, the intra-frame coded pictures with the receiving time and the PTS written with white letters in FIG. 10 are collected in the past as the representative images, and it is assumed that there is no representative image collected in the past regarding the channel 3.

(Code Receiving Time Predicting Step)

Details of the intra-frame coded picture receiving time predicting/channel selection processing executed in step S104 shown in FIG. 7 will be described by referring to FIG. 13.

In this code receiving time predicting step, executed is a first predicting step (step including step S310 and step S311 shown in FIG. 13) which predicts the minimum value of the increases in each value of the presentation time information as the interval value of the presentation time information, and predicts the presentation time information of the intra-frame coded pictures to be received from the current time and thereafter based on the predicted presentation time information interval and the presentation time information of the intra-frame coded picture received lastly.

First, for each of the representative image collection target channels, the time predicting/channel selecting device 120 predicts the PTS of the intra-frame coded pictures to be received from the current time and thereafter based on the PTS of the intra-frame coded pictures received in the past, and predicts the receiving time of the codes of the intra-frame coded pictures to be received from the current time and thereafter based on the PTS.

More specifically, as a method for predicting the PTS of the intra-frame coded pictures to be received from the current time and thereafter for each of the representative image collection target channels, there is a following method. For example, the minimum value of the increases in the PTS of the intra-frame coded pictures received in the past is predicted as the interval value of the PTS of the intra-frame coded pictures of that channel, and a natural-number multiple of the interval value of the PTS is added to the PTS of the intra-frame coded picture received most recently.

Here, the increases in the PTS values of the intra-frame coded pictures of each channel are utilized, and the minimum value of the increases is predicted as the interval value of the PTS of the intra-frame coded pictures (step S310) <PTS interval value prediction processing step or PTS interval value predicting function>.

More specifically, in the case of FIG. 11, the increases in the PTS of the intra-frame coded pictures for the channel 1 are calculated as follows, respectively (step S310$a$) <PTS increase calculating processing step or PTS increase calculating function>.

0:23−0:11=0:12

0:47−0:23=0:24

0:53−0:47=0:06

0:59−0:53=0:06

1:29−0:59=0:30

1:53−1:29=0:24

2:17−1:53=0:24

2:35−2:17=0:18

2:47−2:35=0:12

Therefore, the minimum value of the increases can be calculated as "0:06" (step S310$b$) <minimum value calculation processing step or minimum value calculating function>. Here, the minimum value "0:06" is predicted as the interval value of the PTS of the intra-frame coded pictures, and "0:06" is taken as the predicted PTS interval value.

Similarly, in the case of FIG. 11, the increases in the PTS of the intra-frame coded pictures for the channel 2 can be calculated as follows, respectively, by executing the PTS increase calculation processing step of step S310$a$.

0:34−0:13=0:21

0:48−0:34=0:14

1:44−0:48=0:58

2:05−1:44=0:21

2:12−2:05=0:07

2:19−2:12=0:07

2:33−2:19=0:14

2:47−2:33=0:14

3:01−2:47=0:14

Thus, the minimum value of the increases can be calculated as "0:07" by executing the minimum value calculation processing step of step S310$b$ for the channel 2. Therefore, "0:07" is the predicted PTS interval value of the intra-frame coded pictures for the channel 2.

Similarly, in the case of FIG. 11, the increases in the PTS of the intra-frame coded pictures for the channel 3 can be calculated as follows, respectively, by executing the PTS increase calculation processing step of step S310$a$.

0:28−0:13=0:15

0:48−0:28=0:20

1:03−0:48=0:15

1:28−1:03=0:25

1:48−1:28=0:20

2:08−1:48=0:20

2:28−2:08=0:20

2:33−2:28=0:05

2:48−2:33=0:15

Thus, the minimum value of the increases can be calculated as "0:05" by executing the minimum value calculation processing step of step S310$b$ for the channel 3. Therefore, "0:05" is the predicted PTS interval value of the intra-frame coded pictures for the channel 3.

Similarly, in the case of FIG. 11, the increases in the PTS of the intra-frame coded pictures for the channel m can be calculated as follows, respectively, by executing the PTS increase calculation processing step of step S310$a$.

0:17−0:13=0:04

0:37−0:17=0:20

0:53−0:37=0:16

1:13−0:53=0:20

1:33−1:13=0:20

1:53−1:33=0:20

2:17−1:53=0:24

2:37−2:17=0:20

3:01−2:37=0:24

Thus, the minimum value of the increases can be calculated as "0:04" by executing the minimum value calculation processing step of step S310b for the channel m. Therefore, "0:04" is the predicted PTS interval value of the intra-frame coded pictures for the channel m.

As described, the predicted PTS interval values of the intra-frame coded pictures of the channel 1, the channel 2, the channel 3, and the channel m in the case of FIG. 11 are "0:06", "0:07", "0:05", and "0:04", respectively.

Then, the natural-number multiple of the predicted PTS interval value obtained by the PTS interval value predicting part 122a is added to the PTS of the intra-frame coded picture received most recently in the past to calculate the predicted value of the PTS (predicted PTS) of the intra-frame coded pictures to be received from the current time and thereafter (step S311) <PTS value prediction processing step or PTS value predicting function>.

More specifically, regarding the channel 1 in the case of FIG. 11, the PTS of the inter-frame coded picture stored most recently in the past (most-recent PTS) is "2:47" provided that the current time is "3:00". Thus, the following is obtained by adding the natural-number multiple (n=3) of the PTS interval predicted value "0:06" to the most-recent PTS "2:47" <past PTS adding processing step or past PTS adding function>.

2:47+0:06×3=3:05

This added value, "3:05", is taken as the predicted PTS.
Further, the past PTS adding processing step is also executed with the natural-number multiple (n=4) as follows.

2:47+0:06×4=3:11

Thus, the added value, "3:11", is taken as the predicted PTS.
Furthermore, the past PTS adding processing step is also executed with the natural-number multiple (n=5) as follows.

2:47+0:06×5=3:17

Thus, the added value, "3:17", is taken as the predicted PTS.
The past PTS adding processing step is executed thereafter in the same manner until reaching the natural-number multiple (n=k). For example, with the natural-number multiple (n=k), it is judged whether or not the predicted PTS is calculated until a preset natural-number multiple <set natural-number multiple judgment processing step or set natural-number multiple judging function>.

When it is judged in the judgment processing that the predicted PTS is not calculated with the natural-number multiple (n=k), the past PTS adding processing of step S211a is executed. Then, when judged in the judgment processing that the predicted PTS is calculated with the natural-number multiple (n=k), the processing is advanced to a next step.

Similarly, in the case of FIG. 11, the PTS of the inter-frame picture stored most recently in the past (most-recent past PTS) for the channel 2 is "2:47" provided that the current time is "3:00". Thus, the predicted PTS can be calculated as follows by adding the natural-number multiple (n=2) of the PTS interval predicted value "0:07" to the most-recent past PTS "2:47".

2:47+0:07×2=3:01

This added value, "3:01", is taken as the predicted PTS.
Further, the past PTS adding processing step is also executed with a natural-number multiple (n=3) as follows.

2:47+0:07×3=3:08

This added value, "3:08", is taken as the predicted PTS.
Furthermore, the past PTS adding processing step is also executed with a natural-number multiple (n=4) as follows.

2:47+0:07×4=3:15

This added value, "3:15", is taken as the predicted PTS. The same step is executed to calculate the values thereafter in the same manner.

Similarly, in the case of FIG. 11, the PTS of the inter-frame picture stored most recently in the past (most-recent past PTS) for the channel 3 is "2:48" provided that the current time is "3:00". Thus, the predicted PTS can be calculated as follows by adding the natural-number multiple (n=3) of the PTS interval predicted value "0:05" to the most-recent past PTS "2:48".

2:48+0:05×3=3:03

This added value, "3:03", is taken as the predicted PTS.
Further, the past PTS adding processing step is also executed with a natural-number multiple (n=4) as follows.

2:48+0:05×4=3:08

This added value, "3:08", is taken as the predicted PTS.
Furthermore, the past PTS adding processing step is also executed with a natural-number multiple (n=5) as follows.

2:48+0:05×5=3:13

This added value, "3:13", is taken as the predicted PTS. The same step is executed to calculate the values thereafter in the same manner.

Similarly, in the case of FIG. 11, the PTS of the inter-frame picture stored most recently in the past (most-recent past PTS) for the channel m is "2:37" provided that the current time is "3:00". Thus, the predicted PTS can be calculated as follows by adding the natural-number multiple (n=6) of the PTS interval predicted value "0:04" to the most-recent past PTS "2:37".

2:37+0:04×6=3:01

This added value, "3:01", is taken as the predicted PTS.
Further, the past PTS adding processing step is also executed with a natural-number multiple (n=7) as follows.

2:37+0:04×7=3:05

This added value, "3:05", is taken as the predicted PTS.
Furthermore, the past PTS adding processing step is also executed with a natural-number multiple (n=8) as follows.

2:37+0:04×8=3:09

This added value, "3:09", is taken as the predicted PTS. The same step is executed to calculate the values thereafter in the same manner.

In summary, the predicted PTS for the channel 1 becomes "3:05", "3:11", "3:17", - - - , provided that the current time is "3:00". The predicted PTS for the channel 2 becomes "3:01", "3:08", "3:15", - - - , the predicted PTS for the channel 3 becomes "3:03", "3:08", "3:13", - - - , and the predicted PTS for the channel m becomes "3:01", "3:05", "3:09" - - - .

Then, there is executed a second predicting step (step including step S312 and S313 shown in FIG. 13) which: creates a histogram of the differences between the code receiving time of the past and the presentation time information; selects the class of the percent point where the accumulated probability becomes more than a prescribed percentage in the histogram; and predicts the measure of central tendency of that class as the difference between the code receiving time of the inter-frame coded picture to be received from the current time and thereafter and the presentation time information.

First, the differences between the receiving time of the codes of the intra-frame coded pictures to be received from the current time and thereafter and the PTS are predicted based on the receiving time of the codes of the in-frame pictures received in the past and the PTS (step S312) <receiving time-PTS difference prediction processing step or receiving time-PTS difference predicting function>.

As an example of the difference predicting method, there is a calculating method that takes a percent point in the histogram of the differences between the code receiving time of the intra-frame coded pictures received in the past and the PTS stored to the accumulative processing device 12 as the predicted differences.

More specifically, in the case of FIG. 11, the differences between the code receiving time of the intra-frame coded pictures and the PTS for the channel 1 can be calculated as follows, respectively <difference calculating step or difference calculating function>.

0:11−0:04=0:07

0:23−0:18=0:05

0:47−0:43=0:04

0:53−0:50=0:03

0:59−0:54=0:05

1:29−1:23=0:06

1:53−1:48=0:05

2:17−2:12=0:05

2:35−2:29=0:06

2:47−2:43=0:04

Based on this difference information, the histogram as in FIG. 12, for example, is calculated (step S312a) <difference histogram calculation processing step or difference histogram calculation processing function>.

Then, in this exemplary embodiment, the percent point where the lower-side accumulated probability is 80 percent or more is taken as the predicted difference between the code receiving time of the intra-frame coded picture and the PTS. Specifically, the percent point where the lower-side accumulated probability is 80 percent or more is calculated and determined (step S312b) <percent-point calculation processing step or percent-point calculating function>.

In the case of FIG. 12, the percent point is in a range between the class of 0:05.5, inclusive, and 0:06.5, exclusive.

When the class of the percent point is determined, the measure of the central tendency of that class is determined as the predicted difference value (step S312c) <predicted difference value determining processing step or predicted difference value determining processing function>. In the case of FIG. 12, the predicted difference value for the channel 1 is "0:06" which is the measure of the central tendency of that class.

Similarly, the differences between the code receiving time of the in-frame pictures and the PTS for the channel 2 in the case of FIG. 11 can be calculated as follows.

0:13−0:07=0:06

0:34−0:30=0:04

0:48−0:43=0:05

1:44−1:39=0:05

2:05−1:58=0:07

2:12−2:06=0:06

2:19−2:13=0:06

2:33−2:25=0:08

2:47−2:40=0:07

3:01−2:54=0:07

Based on this difference information, the histogram is calculated. Then, in this exemplary embodiment, the percent point where the lower-side accumulated probability is 80 percent or more is taken as the predicted difference between the code receiving time of the intra-frame coded picture and the PTS.

Specifically, the percent point where the lower-side accumulated probability is 80 percent or more is calculated and determined in the percent-point calculation processing step of step S312b described above. For the channels 2, it is found as follows.

One "0:04" that is in the class between 0:03.5, inclusive, and 0:04.5, exclusive Two "0:05" that is in the class between 0:04.5, inclusive, and 0:05.5, exclusive Three "0:06" that is in the class between 0:05.5, inclusive, and 0:06.5, exclusive Three "0:07" that is in the class between 0:06.5, inclusive, and 0:07.5, exclusive One "0:08" that is in the class between 0:07.5, inclusive, and 0:08.5, exclusive Therefore, the percent point where the lower-side accumulated probability becomes 80 percent or more is in a range between the class of 0:06.5, inclusive, and 0:07.5, exclusive.

When the class of the percent point is determined, the measure of the central tendency of that class is determined as the predicted difference value in the predicted difference value determining processing step of step S312c described above. In this case, the predicted difference value for the channel 2 is "0:07" which is the measure of the central tendency of that class.

Similarly, the differences between the code receiving time of the in-frame pictures and the PTS for the channel 3 in the case of FIG. 11 can be calculated as follows.

0:13−0:09=0:04

0:28−0:21=0:07

0:48−0:42=0:06

1:03−0:58=0:05

1:28−1:23=0:05

1:48−1:42=0:06

2:08−2:03=0:05

2:28−2:23=0:05

2:33−2:29=0:04

2:48−2:45=0:03

Based on this difference information, the histogram is calculated. Then, in this exemplary embodiment, the percent point where the lower-side accumulated probability is 80 percent or more is taken as the predicted difference between the code receiving time of the intra-frame coded picture and the PTS.

Specifically, the percent point where the lower-side accumulated probability is 80 percent or more is calculated and determined in the percent-point calculation processing step of step S312b described above. For the channels 3, it is found as follows.

One "0:03" that is in the class between 0:02.5, inclusive, and 0:03.5, exclusive Two "0:04" that is in the class between 0:03.5, inclusive, and 0:04.5, exclusive Four "0:05" that is in the class between 0:04.5, inclusive, and 0:05.5, exclusive Two "0:06" that is in the class between 0:05.5, inclusive, and 0:06.5, exclusive One "0:07" that is in the class between 0:06.5, inclusive, and 0:07.5, exclusive Therefore, the percent point where the lower-side accumulated probability becomes 80 percent or more is in a range between the class of 0:05.5, inclusive, and 0:06.5, exclusive.

When the class of the percent point is determined, the measure of the central tendency of that class is determined as the predicted difference value in the predicted difference value determining processing step of step S312c described above. In this case, the predicted difference value for the channel 3 is "0:06" which is the measure of the central tendency of that class.

Similarly, the differences between the code receiving time of the in-frame pictures and the PTS for the channel m in the case of FIG. 11 can be calculated as follows.

0:13−0:07=0:06

0:17−0:11=0:06

0:37−0:30=0:07

0:53−0:44=0:09

1:13−1:05=0:08

1:33−1:26=0:07

1:53−1:45=0:08

2:17−2:10=0:07

2:37−2:30=0:07

3:01−2:55=0:06

Based on this difference information, the histogram is calculated. Then, in this exemplary embodiment, the percent point where the lower-side accumulated probability is 80 percent or more is taken as the predicted difference between the code receiving time of the intra-frame coded picture and the PTS.

Specifically, the percent point where the lower-side accumulated probability is 80 percent or more is calculated and determined in the percent-point calculation processing step of step S312b described above. For the channels m, it is found as follows.

Three "0:06" that is in the class between 0:05.5, inclusive, and 0:06.5, exclusive Four "0:07" that is in the class between 0:06.5, inclusive, and 0:07.5, exclusive Two "0:08" that is in the class between 0:07.5, inclusive, and 0:08.5, exclusive One "0:09" that is in the class between 0:08.5, inclusive, and 0:09.5, exclusive Therefore, the percent point where the lower-side accumulated probability becomes 80 percent or more is in a range between the class of 0:07.5, inclusive, and 0:08.5, exclusive.

When the class of the percent point is determined, the measure of the central tendency of that class is determined as the predicted difference value in the predicted difference value determining processing step of step S312c described above. In this case, the predicted difference value for the channel m is "0:08" which is the measure of the central tendency of that class.

As described, the predicted difference values that is the values between the code receiving time of the intra-frame coded pictures and the PTS for the channel 1, the channel 2, the channel 3, and the channel m in the case of FIG. 11 are "0:06", "0:07", "0:06", and "0:08", respectively.

In this exemplary embodiment, the predicted difference values are calculated based on the percent point where the lower-side accumulated probability becomes 80 percent or more. However, the predicted difference values may also be calculated based on the percent point where the lower-side accumulated probability becomes 90 percent or more, or the percent point where the lower-side accumulated probability becomes 70 percent or more.

Then, the predicted values of the code receiving time of the intra-frame coded pictures are calculated based on the predicted PTS and the predicted difference values (step S313) <receiving time predicted value calculation processing step or receiving time predicted value calculation processing function>.

Specifically, the predicted value of the code receiving time of the intra-frame coded picture to be received from the current time and thereafter for the channel 1 can be calculated as follows based on the predicted PTS and the predicted difference.

3:05+0:06×(n−1) (n is a natural number)

Similarly, the predicted value of the code receiving time of the intra-frame coded picture to be received from the current time and thereafter for the channel 2 can be calculated as follows.

3:01+0:07×(n−1) (n is a natural number)

Similarly, the predicted value of the code receiving time of the intra-frame coded picture to be received from the current time and thereafter for the channel 3 can be calculated as follows.

3:03+0:06×(n−1) (n is a natural number)

Similarly, the predicted value of the code receiving time of the intra-frame coded picture to be received from the current time and thereafter for the channel m can be calculated as follows.

3:01+0:08×(n−1) (n is a natural number)

The predicted code receiving time is calculated for each channel in this manner. Then, it is judged whether or not there is any other channel whose predicted values are not calculated, for example (step S314) <predicted code receiving time calculation state judgment processing step or predicted code receiving time calculation state judging function>.

When it is found in this judgment processing that there is another channel whose predicted code receiving time are not calculated, the procedure is returned to step S310 to execute each step. In the meantime, when it is found in this judgment processing that predicted code receiving time are calculated for all the channels, the procedure is advanced to a next step.

Note here that it is merely an example to execute such judgment processing (judges whether or not the processing has been done for other channels) in a latter stage of step S313, and that there are various other methods as well. For example, such judgment processing may be executed, respectively, in a latter stage of step S310, a latter stage of step S311, a latter stage of step S312, and a latter stage of step S313. Further, such judgment processing may be executed, respectively, in a latter stage of step S310a, a latter stage of step S310b, a latter stage of step S312a, a latter stage of step S312b, and a latter stage of step S312c.

(Channel Selection Control Step)

Next, there are described details of the processing of the selection control step for selecting and determining the channel cyclic orders based on the predicted code receiving time of each channel.

First, the time predicting/channel selecting device 120 determines the channel cyclic orders in such a manner that round time of the representative image collection target channels becomes the shortest based on the predicted receiving time of the intra-frame coded pictures, and conducts channel selection based on the cyclic orders (step S315) <channel cyclic order determining processing step or channel cyclic order determining processing function>.

Specifically, in the channel cyclic order determining processing step, the representative image collection target channels CH are selected in order from the one with the highest priority that is set by using the third evaluation function F3(CH) that is defined as follows based on the evaluation functions F1(CH) and F2(CH) defined in the above-described exemplary embodiment and the differences between the current time and the predicted DTS or PTS of the intra-frame coded pictures.

When representative images are not collected in the past, the evaluation function F3(CH) in a channel (CH) is defined as "F3 (CH)=∞". When representative images are collected in the past, it is defined as "F3(CH)=T_C-T_Prv(CH)".

Note here that "T_C" is the current time, "T_Prv(CH)" is the PTS (or DTS) of the representative image that is collected in the past for the channel CH.

The priority P(CH) for the channels CH is set to become larger for the channels with the larger F3(CH) based on the calculation result of the third evaluation function. When there are a plurality of channels with the same value of F3(CH), the priority is set to be higher for the channel with the larger value of the first evaluation function F1(CH). Further, when there are a plurality of channels with the same value of F1(CH), the priority is set to be higher for the channel with the larger value of F2(CH).

That is, first, the calculation processing of the third evaluation function F3 for each channel is executed (step S315a) <third evaluation function calculation processing step or third evaluation function calculating function>.

Subsequently, there is executed the processing for comparing the calculation results of the third evaluation function F3 for each channel (step S315b) <third evaluation function comparison processing step or third evaluation function comparison processing function>.

Then, there is executed the processing for judging whether or not there are a plurality of channels that have the same calculation results regarding the third evaluation function F3 (step S315c) <third evaluation function calculation result analysis judging step or third evaluation function calculation result analysis judging function>.

When it is judged in step S315c mentioned above that there is only a single channel that has the same calculation result regarding the third evaluation function F3, the procedure is advanced to step S315i.

In the meantime, when it is judged in step S315c mentioned above that there are a plurality of channels that have the same calculation result regarding the third evaluation function F3, the processing for calculating the first evaluation function F1 is executed on the plurality of channels with the same F3 value (step S315d) <first evaluation function calculation processing step or first evaluation function calculation processing function>.

Subsequently, there is executed the processing for comparing the calculation results of the first evaluation function F1 for each channel (step S315e) <first evaluation function comparison processing step or first evaluation function comparison processing function>.

Then, there is executed the processing for judging whether or not there are a plurality of channels that have the same calculation results regarding the first evaluation function F1 (step S315f) <first evaluation function calculation result analysis judging step or first evaluation function calculation result analysis judging function>.

When it is judged in step S315f mentioned above that there is only a single channel that has the same calculation result regarding the first evaluation function F1, the procedure is advanced to step S315i.

In the meantime, when it is judged in step S315f mentioned above that there are a plurality of channels that have the same calculation result regarding the first evaluation function F1, the processing for calculating the second evaluation function F2 is executed on the plurality of channels with the same F1 value (step S315g) <second evaluation function calculation processing step or second evaluation function calculation processing function>.

Subsequently, there is executed the processing for comparing the calculation results of the second evaluation function F2 for each channel (step S315h) <second evaluation function comparison processing step or second evaluation function comparison processing function>.

Based on those results, the control processing for determining the priority regarding the final channel cyclic orders is executed by considering the priority determined based on the calculation results of the third evaluation function F3, the priority determined based on the calculation results of the second evaluation function F2, and the priority determined based on the calculation results of the first evaluation function F1 (step S315i) <channel priority determining processing step or channel priority determining processing function>.

Steps S315a-S315i described above will be described by applying specific numerical values. No representative image of the channel 3 is collected in the past, so that "F3(3)=∞" applies. For the channel 1, the channel 2, and the channel m whose representative images are collected in the past, the values of F3 can be expressed as "F3(1)=2:07", F3(2)=2:12", and "F3(m)=2:07".

Therefore, it is found that "F3(3)>F3(2)>F3(1)=F3(m)". As a result, the intra-frame coded pictures are collected as the representative images of the channel 3 first, and the intra-frame coded pictures are collected as the representative images of the channel 2 thereafter.

Based on the predicted code receiving time of the intra-frame coded pictured of the channel 2, the values of the first evaluation function F1 for the channel 1 and the channel m can be calculated as "F1(1)=F1(m)=0:02".

The second evaluation value can be calculated as "F2(1)= 0:08>F1(m)=0:06".

Thus, the dynamic image receiving apparatus determines the priority to be in order of "P(3)>P(2)>P(1)>P(m).

Then, the dynamic image receiving apparatus operates to select the representative image collection target channels in order from the one with the highest priority (steps S104-S107 of FIG. 2).

(Round Control Step)

When such channel priority is determined, the coded stream receiving device 10 performs the processing to control selection of the channels based upon the priority (step S316) <channel selection processing step or channel selecting processing function>.

More specifically, the coded stream receiving device 10 is aligned to the channel 3, the channel 2, the channel 1, and the channel m according to the determined priority by selecting the channels in order in a cyclic manner.

In this step, when a given channel is selected for that round, steps S104, S105, S106, S107 shown in FIG. 7 are repeatedly executed and, for another channel to be selected next, steps S104, S105, S106, S107 shown in FIG. 7 are repeatedly executed. Thereafter, the same processing is repeated for each channel in the same manner.

First, the time predicting/channel selecting device 120 selects the channel 3 from the representative image collection target channels (step S104 of FIG. 7).

The dynamic image receiving apparatus 1 as the representative image receiving device obtains the system time by referring to the system clock 14 (step S105 of FIG. 7).

When the system time is the predicted receiving time of the code of the intra-frame coded picture of the channel 3 (step S106 of FIG. 7), the time predicting/channel selecting device 120 receives and outputs the dynamic image stream of the channel 3 by aligning the coded stream receiving device 10 to the channel 3 (step S107 of FIG. 7). The procedure is then returned to step S104.

Since the codes of the outputted dynamic image include the code of the intra-frame coded picture, it is possible to create the representative image by an external device that has received the outputted dynamic image stream.

Then, the channel 2 is selected from the representative image collection target channels whose representative images are uncollected (step S104 of FIG. 7).

The dynamic image receiving apparatus 1 as the representative image receiving device obtains the system time by referring to the system clock 14 (step S105 of FIG. 7).

When the system time is the predicted receiving time of the code of the intra-frame coded picture of the channel 2 (step S106 of FIG. 7), the time predicting/channel selecting device 120 receives and outputs the dynamic image stream of the channel 2 by aligning the coded stream receiving device 10 to the channel 2 (step S107 of FIG. 7). The procedure is then returned to step S104.

Then, the channel 1 is selected from the representative image collection target channels whose representative images are uncollected (step S104 of FIG. 7).

The dynamic image receiving apparatus 1 as the representative image receiving device obtains the system time by referring to the system clock 14 (step S105 of FIG. 7).

When the system time is the predicted receiving time of the code of the intra-frame coded picture of the channel 1 (step S106 of FIG. 7), the time predicting/channel selecting device 120 receives and outputs the dynamic image stream of the channel 1 by aligning the coded stream receiving device 10 to the channel 1 (step S107 of FIG. 7). The procedure is then returned to step S104.

Then, the channel m is selected from the representative image collection target channels whose representative images are uncollected (step S104 of FIG. 7). The dynamic image receiving apparatus 1 as the representative image receiving device obtains the system time by referring to the system clock 14 (step S105 of FIG. 7).

When the system time is the predicted receiving time of the code of the intra-frame coded picture of the channel m (step S106 of FIG. 7), the time predicting/channel selecting device 120 receives and outputs the dynamic image stream of the channel m by aligning the coded stream receiving device 10 to the channel m (step S107 of FIG. 7). The procedure is returned to step S104. Since the dynamic image coded streams including the codes of the intra-frame coded pictures for all the representative image collection target channels are completed, the processing is ended.

(Regarding Effects)

With this exemplary embodiment described above, the minimum value of the increases in the PTS of the intra-frame coded pictures received in the past are used when predicting the PTS of the intra-frame coded pictures to be received from the current time and thereafter. Thus, it is possible to obtain the interval value of the PTS of the neighboring intra-frame coded pictures within a same dynamic image stream accurately with a small calculation amount, when the PTS of the neighboring intra-frame coded pictures within the same dynamic image stream is obtained in the history, while enabling the same effects as those of the exemplary embodiment 1.

By using the percent point in the histogram of the differences between the code receiving time of the codes of the intra-frame coded pictures received in the past and the PTS when predicting the differences between the receiving time of the codes of the intra-frame coded pictures to be received from the current time and thereafter and the PTS, the prediction can be conducted accurately. At the same time, it is possible to obtain an effect to guarantee that the probability (for the codes of the intra-frame coded pictures to reach the dynamic image receiving apparatus after the predicted receiving time of the codes of the intra-frame coded pictures of the current time and thereafter so as to be received properly) becomes a prescribed probability or higher.

Further, channel selection is carried out by giving the priority orders so as to preferentially collect the representative images for the channels whose representative images are uncollected over the channels whose representative images have been collected already, during the time where the representative image collected earlier is substituted until a new representative image is collected. Therefore, it is possible to further shorten the time from the point of receiving an instruction for collecting the representative images to the point of presenting the representative images of all the representative image collection target channels.

This makes it possible to present the representative images to the viewer in such a manner that the representative image for the channel with the low priority is updated from the image collected earlier to the image obtained anew. Therefore, immediacy of the representative image can be maintained.

Other structures, other steps, and the operational effects thereof are the same as those of the case of the exemplary embodiment 1 described above. Further, the operation contents of each step and the structural elements of each part described above may be put into a program to be executed by a computer.

Exemplary Embodiment 4-4

Next, an exemplary embodiment 4-4 of the present invention will be described by referring to FIG. 14 and FIG. 15.

FIG. 14 is a block diagram showing an example of a dynamic image receiving apparatus according to the exemplary embodiment 4-4 of the present invention.

This exemplary embodiment is peculiar in respect that it is structured to conduct prediction by a second predicting unit 224 by utilizing probability distribution, and to perform channel selection with a channel selecting unit 226 by considering the priority that is set for channel sets.

(Regarding Structure)

First, details of the structure of the dynamic image receiving apparatus 1 will be described by referring to FIG. 14. FIG. 14 is a block diagram showing an example of a detailed structure of a time predicting/channel selecting device of the dynamic image receiving apparatus according to this exemplary embodiment.

The dynamic image receiving apparatus 1 according to the exemplary embodiment discloses an example of a case where the time predicting/channel selecting device 20 shown in FIG. 1 is structured as a time predicting/channel selecting device 220 shown in FIG. 14. Structures of each of other parts are the same as those of the exemplary embodiment 1.

As in the exemplary embodiment 3, it is assumed in this exemplary embodiment that the dynamic image receiving apparatus 1 shown in FIG. 1 has received m-numbers of dynamic image streams (m is a natural number of 4 or larger) shown in FIG. 4 and FIG. 6, and the representative image collecting target channels are designated as the channel 1, the channel 2, the channels 3, and the channel m.

Further, it is assumed that the receiving time of the codes of the past intra-frame coded pictures and the PTS stored in the accumulative processing device 12 of the dynamic image receiving apparatus are obtained as in FIG. 11 as a result of applying steps S101-S107 of FIG. 7 to the dynamic image streams. The time at the point where the instruction for collecting the representative images is inputted is considered as "3:00", and this time is taken as the current time.

Regarding the channel 1, the channel 2, and the channel 3 among the representative image collection target channels, the intra-frame coded pictures with the receiving time and the PTS written with white letters in FIG. 11 are collected in the past as the representative images, and it is assumed that there is no representative image collected in the past regarding the channel 3.

(Time Predicting/Channel Selecting Device)

As shown in FIG. 14, the time predicting/channel selecting device 220 of the dynamic image receiving apparatus according to the exemplary embodiment is configured, including a first predicting unit 222, a second predicting unit 224, a prediction calculating module control part 225, and a channel selecting unit 226.

The first predicting unit 222 predicts the presentation time of the intra-frame coded pictures of the current time and thereafter based on the presentation time of the past.

The first predicting unit 222 selects, from the increases in each value of the presentation time information, the increase falling within a range that specifies a prescribed range presentation time information interval value obtained from known information so as to predict the interval value of the presentation time information, and predicts the presentation time information of the intra-frame coded pictures of the current time and thereafter based on the predicted presentation information interval value and the presentation time information of the intra-frame coded picture received lastly. This first predicting unit 222 can also be considered as a first predicting device.

More specifically, the first predicting unit 222 is configured, including: a PTS interval value predicting part 222a which utilizes the increases in the values of the PTS of the intra-frame coded pictures received in the past in a specific channel to predict the interval value of the PTS of the intra-frame coded pictures; and a PTS value predicting part 222b which calculates predicted values of the PTS of the intra-frame coded pictures from the current time and thereafter by adding natural-number multiples of the interval values of the PTS obtained by the PTS interval value predicting part 222a to the PTS of the intra-frame coded picture stored most recently in the past (received lastly).

The PTS interval predicting part 222a is configured, including: a PTS increase calculating part 222a-1 which calculates the increases in the values of the PTS of the intra-frame coded pictures of each channel; and a PTS interval value range selecting part 222a-2 which performs processing for selecting the increase within a specific range from each increase calculated by the PTS increase calculating part 222a-1.

The PTS value predicting part 222b is configured, including: a natural-number multiple determining part which determines the natural-number multiple for determining until which of natural-number multiples the predicted values are to be calculated with; and a past PTS adding part which multiplies the natural-number multiple determined by the natural-number determining part to numerical value (predicted PTS interval value) selected by the PTS interval value range selecting part 222a-2, and adds the PTS value of the intra-frame coded picture stored in the past to the obtained value.

The second predicting unit 224 predicts the code receiving time based on the presentation time predicted by the first predicting unit 222.

Further, the second predicting unit 224 predicts differences between the code receiving time of the intra-frame coded pictures to be received from the current time and thereafter and the presentation time information based on the code receiving time of the intra-frame coded pictures received in the past and the presentation time information, and predicts the code receiving time of the intra-frame coded pictures to be received from the current time and thereafter based on the predicted differences and the predicted presentation time information predicted by the first predicting unit 222.

Furthermore, the second predicting unit 224: respectively calculates an expected value and dispersion of differences between the code receiving time of the past and the presentation time information; calculates the value of the percent point where the accumulated probability in a probability distribution model the differences follow becomes a specific probability; takes the percent point as a coefficient; and calculates the sum of the expected value and the value obtained by multiplying the coefficient by the square root of the dispersion so as to predict the difference between the code receiving time of the inter-frame coded picture to be received from the current time and thereafter and the presentation time information. The second predicting unit 224 can also be considered as a second predicting device.

The second predicting unit 224 is configured, including: a receiving time-PTS difference predicting part 224a which predicts differences between the receiving time of the codes of the intra-frame coded pictures to be received from the current time and thereafter and the PTS based on the code receiving time of the codes of the intra-frame coded pictures received in the past and the PTS; and a receiving time predicted value calculating part 224b which calculates predicted values of the code receiving time of the intra-frame coded pictures based on the predicted difference values calculated by the receiving time-PTS difference predicting part 224a and the predicted values of the PTS of the intra-frame coded pictures of the current time and thereafter.

The receiving time-PTS difference predicting part 224a is configured, including: a difference expected value calculating part 224a-1 which calculates the expected value of the difference between the receiving time of the codes of the intra-frame coded pictures of the past and the PTS; a difference dispersion value calculating part 224a-2 which calculates dispersion of the differences; a probability distribution information acquirement calculating part 224a-3 which performs calculation for obtaining the information regarding the probability distribution model that the differences follow; a percent point calculating part 224a-4 which calculates the value of the percent point where the accumulated probability in the probability distribution model calculated by the probability distribution information acquirement calculating part 224a-3 becomes a specific probability; and a predicted difference value calculating part 224a-5 which predicts the difference between the code receiving time of the inter-frame coded picture of the current time and thereafter and the presentation time information by taking the percent point calculated by the percent point calculating part 224a-4 as a coefficient and calculating the sum of the expected value and the value obtained by multiplying the coefficient by the square root of the dispersion.

The prediction calculating module control part 225 has a function of controlling the execution procedures of each part. For example, there is assumed a function which conducts a control in such a manner that arithmetic operation of the first predicting unit among the process for calculating the predicted values of the code receiving time of the intra-frame coded pictures is executed for a given channel, while executing an arithmetic operation of the second predicting unit for another channel, for example, among the process for calculating the predicted values of the code receiving time of the intra-frame coded pictures.

The channel selecting unit 226 determines the channel cyclic orders in such a manner that the round time of the target channels for collecting the representative images becomes the shortest, and carries out channel selection based on the predicted code receiving time predicted by the second predicting unit 224 included in the code receiving time predicting device. This channel selecting unit 226 may also be considered as a channel selection control device.

Further, the channel selecting unit 226 can obtain an approximate solution of the channel cyclic orders by performing the depth priority search through repeating selection of the target channels for collecting the representative images. The channel selecting unit 226 calculates evaluation values for the channel selection orders based on the predicted code receiving time, and selects the channels in order from the one with the highest evaluation value, so that it is possible to determine the selecting orders of the channels through calculating the evaluation values based on the immediacy of the representative images to be collected or based on the collecting time. At that time, the channel selecting unit 226 can calculate the evaluation values as the round required time for going around the channels.

The channel selecting unit 226 is configured, including: a channel cyclic order determining processing part 226a which determines the channel cyclic orders of the target channels for collecting the representative images based on the predicted code receiving time; and a channel selection processing part 226b which performs processing necessary for going around the channels, based on the channel cyclic orders determined by the channel cyclic order determining processing part 226a.

The channel cyclic order determining processing part 226a is configured, including: a threshold value information acquirement processing part 226a-1 which obtains information regarding a threshold value T_TH (specific threshold value) that is set arbitrarily in advance for the time interval from the receiving time of the representative images collected in the past to the current time; a receiving time-current time difference calculating part 226a-2 which calculates differences (time difference) between the receiving time of the representative images collected in the past and the current time for each of the representative image collection target channels; a channel-set dividing processing part 226a-3 which divides the representative image collection target channels into a set S_H (first channel set) that is a set of the channels whose time difference is equal to the threshold value T_TH or more and to a set S_L (second channel set) that is a set of the channels whose time difference is less than the threshold value T_TH; and a priority determining processing part 226a-4 which performs processing to decide the priority order (priority for the channel cyclic orders) in the same manner as that of the exemplary embodiment 3 for each of the channels in the channels set S_H (the first channels set) and the channel set S_L (the second channel set) divided by the channel-set dividing processing part 226a-3.

The channel-set dividing processing part 226a-3 performs the processing to include the channel whose representative image is uncollected in the set S_H (the first channel set).

The priority determining processing part 226a-4 is configured, including: a channel set priority giving processing part 226a-5 which performs processing regarding the priority to be given to the channel sets; a channel priority giving processing part 226a-6 which performs processing regarding the priority to be given to the channels included in the channel sets; and a final channel priority determining part 226a-7 which performs processing to determine the final channel priority by considering the set priority given by the channel set priority giving processing part 226a-5 and the channel priority given by the channel priority giving processing part 226a-6.

The channel set priority giving part 226a-5 of the priority determining processing part 226a-4 sets the priority orders in such a manner that the priority P satisfies the relation "P(CH_H)>P(CH_L) (=the channel in the first channel set is given a higher priority)" applies for any of the combinations of the channels CH_H included in the channel set S_H (the first channel set) and the channels CH_L included in the channel set S_L (the second channel set).

For example, assuming that the threshold value T_TH is designated as "T_TH=2:15", the channel set dividing processing part 226a-3 divides the representative image collection channels into the channel set S_H (the first channel set) and the channel set S_L (the second channel set) as follows.

Channel Set S_H={2, 3, m}
Channel Set S_L={1}

The channel priority giving part 226a-5 of the priority determining processing part 226a-4 gives the priority order to each of the channels included in the channels set S_H (the first channels set) and the channel set S_L (the second channel set) in the same manner as that of the exemplary embodiment 3.

For example, the priority is given to the channels included in the channel set S_H (the first channels set) in such a manner that the relation "P(3)>P(2)>P(m)" applies.

The channel set priority giving processing part 226a-5 determines the priority orders in such a manner that the priority of the channel included in the channel set S_H (the first channel set) becomes higher than the priority of the channel included in the channel set S_L (the second channel set).

The final channel priority determining part 226a-7 determines the priority of all the representative image collection target channels to be in a relation of "P(3)>P(2)>P(m)>P(1)", by considering the set priority given by the channel set priority giving processing part 226a-5 and the channel priority given by the channel priority giving processing part 226a-6.

As described, the channel selecting unit 226 can also be considered as a channel selection control device. This channel selection control device: calculates the difference between the current time and the code receiving time of each of the representative image collection target channels whose representative images are collected in the past; divides each of the representative image collection target channels to the plurality of channel sets based on the time difference; sets the set priority for each channel set that is given a higher priority than the channel priority that is set for each channel; and determines the final priority for selecting the channel.

Further, the channel selection control device: calculates the differences between the current time and the code receiving time of the each of the representative image collection target channels whose representative images are collected; takes the representative image collection target channel having the time difference that is equal to or more than the specific threshold value and the channel whose representative image is uncollected as the first channel set; takes the representative image collection target channel having the time difference that is less than the specific threshold value as the second channel set; and sets the channel priority of each channel in each of the channel sets under such a set-priority condition that the priority for the first channel set is higher than that of the second channel set.

The time predicting/channel selecting device 220 of the dynamic image receiving apparatus 1 having the above-described structure operates roughly as follows. That is, the prediction calculating module control part 225 of the time predicting/channel selecting device 220 executes the first predicting unit 222 and the second predicting unit 224 for a single channel to calculate the predicted code receiving time of the intra-frame coded pictures and the predicted PTS. Similarly, the prediction calculating module control part 225 executes the first predicting unit 222 and the second predicting unit 224 for another channel to calculate the predicted code receiving time of the intra-frame coded pictures and the predicted PTS.

Specifically, the first predicting unit 222 executes the PTS interval value predicting part 222a, and utilizes the increases in the values of the PTS of the intra-frame coded pictures to predict the increase within the specific range as the interval value of the PTS of the intra-frame coded pictures.

Subsequently, the first predicting unit 222 executes the PTS value predicting part 222b to calculate the predicted values of the PTS of the intra-frame coded pictures of the current time and thereafter by adding the natural-number multiple of the interval value of the PTS obtained by the PTS interval value predicting part 222a to the PTS of the intra-frame coded picture stored most recently in the past.

Further, the second predicting unit 224 executes the receiving time-PTS difference predicting part 224a to predict the differences between the code receiving time of the codes of the intra-frame coded pictures to be received from the current time and thereafter and the PTS based on the code receiving time of the codes of the intra-frame coded pictures received in the past and the PTS.

Specifically, the receiving time-PTS difference predicting part 224a of the second predicting unit 224: respectively calculates an expected value and dispersion of differences between the code receiving time of the past and the presentation time information; calculates the value of the percent point where the accumulated probability in a probability distribution model the differences follow becomes a specific probability; takes the percent point as a coefficient; and calculates the sum of the expected value and the value obtained by multiplying the coefficient by the square root of the dispersion so as to predict the difference between the code receiving time of the inter-frame coded picture of the current time and thereafter and the presentation time information.

That is, the difference expected value calculating part 224a-1 calculates the expected values of the differences between the receiving time of the codes of the intra-frame coded pictures received in the past and the PTS. Further, the difference dispersion value calculating part 224a-2 calculates the dispersion of the differences or the square root of the dispersion. Then, the probability distribution information acquirement calculating part 224a-3 performs calculation for obtaining the information regarding the probability distribution model that the differences follow. Further, the percent point calculating part 224a-4 calculates the value of the percent point where the accumulated probability in the probability distribution model calculated by the probability distribution information acquirement calculating part 224a-3 becomes the specific probability. With this, there is predicted the difference between the code receiving time of the inter-frame coded picture to be received from the current time and thereafter and the presentation time information by taking the percent point calculated by the percent point calculating part 224a-4 as a coefficient and calculating the sum of the expected value and the value obtained by multiplying the coefficient by the square root of the dispersion by the predicted difference value calculating part 224a-5.

The receiving time predicted value calculating part 224b of the second predicting unit 224 calculates predicted values of the code receiving time of the intra-frame coded pictures by adding the natural-number multiples of the predicted difference values calculated by the receiving time-PTS difference predicting part 224a to the predicted values of the PTS of the intra-frame coded pictures of the current time and thereafter.

When the predicted code receiving time of the intra-frame coded pictures and the predicted PTS for each channel are calculated in this manner, the time predicting/channel selecting device 220 executes the channel selecting unit 226 to determine the channel cyclic orders.

Specifically, the channel cyclic order determining processing part 226a of the channel selecting unit 226 executes the threshold value information acquirement processing part 226a-1 to obtain the information regarding the threshold value T_TH (specific threshold value) that is set arbitrarily in advance for the time interval from the receiving time of the representative images collected in the past to the current time.

Further, the channel cyclic order determining processing part 226a executes the receiving time-current time difference calculating part 226a-2 to calculate the differences (time difference) between the code receiving time of the representative images collected in the past and the current time for each of the representative image collection target channels.

Then, the channel cyclic order determining processing part 226a executes the channel-set dividing processing part 226a-3 to divide the representative image collection target channels into the set S_H (the first channel set) that is a set of the channels whose time difference is equal to the threshold value T_TH or more and to the set S_L (the second channel set) that is a set of the channels whose time difference is less than the threshold value T_TH.

For example, assuming that the threshold value T_TH is designated as "T_TH=2:15", the channel cyclic order determining processing part 226*a* executes the channel-set dividing processing part 226*a*-3 to divide the representative image collection target channels into the channel set S_H (the first channel set) and the channel set S_L (the second channel set) as follows.

Channel Set S_H={2, 3, m}

Channel Set S_L={1}

Then, the channel cyclic order determining processing part 226*a* executes the priority determining processing part 226*a*-4 to set the priority orders in such a manner that the priority P satisfies the relation "P(CH_H)>P(CH_L) (=the channel in the first channel set is given a higher priority)" applies for any of the combinations of the channels CH_H included in the channel set S_H (the first channel set) and the channels CH_L included in the channel set S_L (the second channel set).

Specifically, the channel cyclic order determining processing part 226*a* executes the priority determining processing part 226*a*-4 to give the priority order to each of the channels included in the channels set S_H (the first channels set) and the channel set S_L (the second channel set) in the same manner as that of the exemplary embodiment 3.

For example, the priority is given to the channels included in the channel set S_H (the first channels set) in such a manner that the relation "P(3)>P(2)>P(m)" applies.

The channel cyclic order determining processing part 226*a* executes the priority determining processing part 226*a*-4 to determine the priority orders in such a manner that the priority of the channel included in the channel set S_H (the first channel set) becomes higher than the priority of the channel included in the channel set S_L (the second channel set).

Further, the channel cyclic order determining processing part 226*a* executes the priority determining processing part 226*a*-4 to determine the priority of all the representative image collection target channels to be in a relation of "P(3)>P(2)>P(m)>P(1)", by considering the set priority given by the channel set priority giving part 226*a*-5 and the channel priority given by the channel priority giving part 226*a*-6.

In this manner described above, the priority determining processing part 226*a*-4 allots the final priority regarding the channel cyclic orders (determines the cyclic orders).

(Regarding Processing Procedures)

Next, various processing procedures executed in the dynamic image receiving apparatus 1 having the above-described structure will be described by referring to FIG. 10-FIG. 13. FIG. 13 is a flowchart showing an example of the whole processing procedures executed in the dynamic image receiving apparatus according to the exemplary embodiment.

The overall processing of the processing procedures of this exemplary embodiment are common to those of the exemplary embodiment 1, so that explanation thereof will be omitted, and details of each processing (a predicting step, a selection control step, a round control step) will only be described.

Now, the prerequisites of this exemplary embodiment will be described. As in the exemplary embodiment 3, it is assumed in this exemplary embodiment that the dynamic image receiving apparatus 1 of FIG. 1 receives m-numbers of dynamic image streams (m is a natural number of 4 or more) shown in FIG. 4 and FIG. 6, and the representative image collection target channels are designated as the channel 1, the channel 2, the channel 3, and the channel m.

Further, it is assumed that the receiving time of the codes of the intra-frame coded pictures received in the past and the PTS stored in the accumulative processing device 12 of the dynamic image receiving apparatus are obtained as in FIG. 11, as a result of applying steps S101-S107 of FIG. 7 to the dynamic image stream. Furthermore, it is supposed here that the time at the point of the input of the instruction for collecting the representative images is "3:00" and this time is taken as the current time.

Further, regarding the channel 1, the channel 2, and the channel 3 among the representative image collection target channels, the intra-frame coded pictures with the receiving time and the PTS written with white letters in FIG. 11 are collected in the past as the representative images, and it is assumed that there is no representative image collected in the past regarding the channel 3.

(Code Receiving Time Predicting Step)

Details of the intra-frame coded picture receiving time predicting/channel selection processing executed in step S104 shown in FIG. 7 will be described by referring to FIG. 15.

First, for each of the representative image collection target channels, the time predicting/channel selecting device 220 predicts the PTS of the intra-frame coded pictures to be received from the current time and thereafter based on the PTS of the intra-frame coded pictures received in the past, and predicts the receiving time of the intra-frame coded pictures to be received from the current time and thereafter based on the PTS.

More specifically, as a specific method for predicting the PTS of the intra-frame coded pictures to be received from the current time and thereafter regarding each of the representative image collection target channels, there is a method which: adopts candidates for the predicted interval value of the PTS of the intra-frame coded pictures of the channel, e.g., increases in the PTS of the intra-frame coded pictures received in the past, the common divisors of the increases, etc; takes the value within a prescribed range obtained from known information as the PTS interval value; and adds a natural-number multiple of the PTS interval value to the PTS of the intra-frame coded picture received most recently.

That is, in the code receiving time predicting step, executed is the first predicting step (step including step S410 and S411 shown in FIG. 15) which selects, from the increases in each value of the presentation time information, the increase falling within a range that specifies a prescribed range presentation time information interval value obtained from known information so as to predict the interval value of the presentation time information, and predicts the presentation time information of the intra-frame coded pictures of the current time and thereafter based on the predicted presentation information interval value and the presentation time information of the intra-frame coded picture received lastly.

First, in this exemplary embodiment, the increase within the range is selected from the increases of the PTS of the intra-frame coded pictures received in the past to be the predicted PTS interval value, under a prerequisite that the specific range of the PTS interval value is defined to be from 0:04, inclusive, to 0:08, exclusive (step S410) <PTS interval value prediction processing step or PTS interval value predicting function>.

More specifically, in the case of FIG. 11, the increases in the PTS of the intra-frame coded pictures for the channel 1 are calculated as follows, respectively (step S410*a*) <PTS increase calculating processing step or PTS increase calculating function>.

0:23−0:11=0:12

0:47−0:23=0:24

0:53−0:47=0:06

0:59−0:53=0:06

1:29−0:59=0:30

1:53−1:29=0:24

2:17−1:53=0:24

2:35−2:17=0:18

2:47−2:35=0:12

Therefore, "0:06" is selected from the increases of the PTS of the intra-frame coded pictures received in the past to be the predicted PTS interval value, which fits such prerequisite that the specific range of the PTS interval value is defined to be from 0:04, inclusive, to 0:08, exclusive (step S410b) <in-range PTS interval value selection processing step or in-range PTS interval value selecting function>. Here, the "0:06" that satisfies the condition is predicted as the interval value of the PTS of the intra-frame coded pictures, and "0:06" is taken as the predicted PTS interval value.

Similarly, in the case of FIG. 11, the increases in the PTS of the intra-frame coded pictures for the channel 2 can be calculated as follows, respectively, by executing the PTS increase calculation processing step of step S410a.

0:34−0:13=0:21

0:48−0:34=0:14

1:44−0:48=0:58

2:05−1:44=0:21

2:12−2:05=0:07

2:19−2:12=0:07

2:33−2:19=0:14

2:47−2:33=0:14

3:01−2:47=0:14

Thus, the increase that fits the condition can be calculated as "0:07" by executing the in-range PTS interval value selection processing step of step S410b for the channel 2. Therefore, "0:07" is the predicted PTS interval value of the intra-frame coded pictures for the channel 2.

Similarly, in the case of FIG. 11, the increases in the PTS of the intra-frame coded pictures for the channel 3 can be calculated as follows, respectively, by executing the PTS increase calculation processing step of step S410a.

0:28−0:13=0:15

0:48−0:28=0:20

1:03−0:48=0:15

1:28−1:03=0:25

1:48−1:28=0:20

2:08−1:48=0:20

2:28−2:08=0:20

2:33−2:28=0:05

2:48−2:33=0:15

Thus, the increase that fits the condition can be calculated as "0:05" by executing the in-range PTS interval value selection processing step of step S410b for the channel 3. Therefore, "0:05" is the predicted PTS interval value of the intra-frame coded pictures for the channel 3.

Similarly, in the case of FIG. 11, the increases in the PTS of the intra-frame coded pictures for the channel m can be calculated as follows, respectively, by executing the PTS increase calculation processing step of step S410a.

0:17−0:13=0:04

0:37−0:17=0:20

0:53−0:37=0:16

1:13−0:53=0:20

1:33−1:13=0:20

1:53−1:33=0:20

2:17−1:53=0:24

2:37−2:17=0:20

3:01−2:37=0:24

Thus, the increase that fits the condition can be calculated as "0:04" by executing the in-range PTS interval value selection processing step of step S410b for the channel m. Therefore, "0:04" is the predicted PTS interval value of the intra-frame coded pictures for the channel m.

As described, the predicted PTS interval values of the intra-frame coded pictures of the channel 1, the channel 2, the channel 3, and the channel m in the case of FIG. 11 are "0:06", "0:07", "0:05", and "0:04".

Then, the natural-number multiple of the predicted PTS interval value obtained by the PTS interval value predicting part 222a is added to the PTS of the intra-frame coded picture stored most recently in the past to calculate the predicted value of the PTS (predicted PTS) of the intra-frame coded pictures to be received from the current time and thereafter (step S411) <PTS value prediction processing step or PTS value predicting function>.

More specifically, regarding the channel 1 in the case of FIG. 11, the PTS of the inter-frame coded picture stored most recently in the past (most-recent PTS) is "2:47" provided that the current time is "3:00". Thus, the following is obtained by adding the natural-number multiple (n=3) of the PTS interval predicted value "0:06" to the most-recent PTS "2:47" <past PTS adding processing step or past PTS adding function>.

2:47+0:06×3=3:05

This added value, "3:05", is taken as the predicted PTS.

Further, the past PTS adding processing step is also executed with the natural-number multiple (n=4) as follows.

2:47+0:06×4=3:11

Thus, the added value, "3:11", is taken as the predicted PTS.

Furthermore, the past PTS adding processing step is also executed with the natural-number multiple (n=5) as follows.

2:47+0:06×5=3:17

Thus, the added value, "3:17", is taken as the predicted PTS.

The past PTS adding processing step is executed thereafter in the same manner until reaching the natural-number multiple (n=k). For example, with the natural-number multiple (n=k), it is judged whether or not the predicted PTS is calculated until a preset natural-number multiple <set natural-number multiple judgment processing step or set natural-number multiple judging function>.

When it is judged in the judgment processing that the predicted PTS is not calculated with the natural-number multiple (n=k), the past PTS adding processing of step S211a is executed. Then, when judged in the judgment processing that the predicted PTS is calculated with the natural-number multiple (n=k), the processing is advanced to a next step.

Similarly, in the case of FIG. 11, the PTS of the inter-frame picture stored most recently in the past (most-recent past PTS) for the channel 2 is "2:47" provided that the current time is "3:00". Thus, the predicted PTS can be calculated as follows by adding the natural-number multiple (n=2) of the PTS interval predicted value "0:07" to the most-recent past PTS "2:47".

$$2:47+0:07\times2=3:01$$

This added value, "3:01", is taken as the predicted PTS.

Further, the past PTS adding processing step is also executed with a natural-number multiple (n=3) as follows.

$$2:47+0:07\times3=3:08$$

This added value, "3:08", is taken as the predicted PTS.

Furthermore, the past PTS adding processing step is also executed with a natural-number multiple (n=4) as follows.

$$2:47+0:07\times4=3:15$$

This added value, "3:15", is taken as the predicted PTS. The same step is executed to calculate the values thereafter in the same manner.

Similarly, in the case of FIG. 11, the PTS of the inter-frame picture stored most recently in the past (most-recent past PTS) for the channel 3 is "2:48" provided that the current time is "3:00". Thus, the predicted PTS can be calculated as follows by adding the natural-number multiple (n=3) of the PTS interval predicted value "0:05" to the most-recent past PTS "2:48".

$$2:48+0:05\times3=3:03$$

This added value, "3:03", is taken as the predicted PTS.

Further, the past PTS adding processing step is also executed with a natural-number multiple (n=4) as follows.

$$2:48+0:05\times4=3:08$$

This added value, "3:08", is taken as the predicted PTS.

Furthermore, the past PTS adding processing step is also executed with a natural-number multiple (n=5) as follows.

$$2:48+0:05\times5=3:13$$

This added value, "3:13", is taken as the predicted PTS. The same step is executed to calculate the values thereafter in the same manner.

Similarly, in the case of FIG. 11, the PTS of the inter-frame picture stored most recently in the past (most-recent past PTS) for the channel m is "2:37" provided that the current time is "3:00". Thus, the predicted PTS can be calculated as follows by adding the natural-number multiple (n=6) of the PTS interval predicted value "0:04" to the most-recent past PTS "2:37".

$$2:37+0:04\times6=3:01$$

This added value, "3:01", is taken as the predicted PTS.

Further, the past PTS adding processing step is also executed with a natural-number multiple (n=7) as follows.

$$2:37+0:04\times7=3:05$$

This added value, "3:05", is taken as the predicted PTS.

Furthermore, the past PTS adding processing step is also executed with a natural-number multiple (n=8) as follows.

$$2:37+0:04\times8=3:09$$

This added value, "3:09", is taken as the predicted PTS. The same step is executed to calculate the values thereafter in the same manner.

In summary, the predicted PTS for the channel 1 becomes "3:05", "3:11", "3:17", - - -, provided that the current time is "3:00". The predicted PTS for the channel 2 becomes "3:01", "3:08", "3:15", - - -, the predicted PTS for the channel 3 becomes "3:03", "3:08", "3:13", - - -, and the predicted PTS for the channel m becomes "3:01", "3:05", "3:09", - - -.

Then, in the code receiving time predicting step, executed is the second predicting step (step including step S412 and step S413 shown in FIG. 15) which respectively calculates an expected value and dispersion of differences between the code receiving time of the past and the presentation time information, calculates the value of the percent point where the accumulated probability in a probability distribution model the differences follow becomes a specific probability, takes the percent point as a coefficient, and calculates the sum of the expected value and the value obtained by multiplying the coefficient by the square root of the dispersion so as to predict the difference between the code receiving time of the inter-frame coded picture of the current time and thereafter and the presentation time information.

In the second predicting step, the difference is predicted by using the probability distribution model as the standard normal distribution.

First, the differences between the receiving time of the codes of the intra-frame coded pictures to be received from the current time and thereafter and the PTS are predicted based on the receiving time of the codes of the in-frame pictures received in the past and the PTS (step S412) <receiving time-PTS difference prediction processing step or receiving time-PTS difference predicting function>.

As an example of a method for predicting the difference, there is a method which: finds an expected value and dispersion of differences between the receiving time of the codes of the intra-frame coded pictures received in the past and the PTS stored in the accumulative processing device 12; takes the percent point where the lower-side accumulated probability in the standard normal distribution that the differences between the receiving time of the codes of the intra-frame coded pictures and the PTS follow as a coefficient; and takes estimate value of the difference between the receiving time of the code of the intra-frame coded picture to be received from the current time and thereafter and the PTS as the sum of the expected value and the value obtained by multiplying the coefficient by a square root of the expected value and dispersion.

More specifically, in the case of FIG. 11, the differences between the code receiving time of the intra-frame coded pictures and the PTS for the channel 1 can be calculated as follows, respectively <difference calculating step or difference calculating function>.

$$0:11-0:04=0:07$$

$$0:23-0:18=0:05$$

$$0:47-0:43=0:04$$

$$0:53-0:50=0:03$$

$$0:59-0:54=0:05$$

1:29−1:23=0:06

1:53−1:48=0:05

2:17−2:12=0:05

2:35−2:29=0:06

2:47−2:43=0:04

With this, the expected value of the difference between the code receiving time of the code of the intra-frame coded picture received in the past and the PTS is calculated (step S412a) <difference expected value calculation processing step or difference expected value calculation processing function>. That is, the expected value of the difference can be calculated as follows based on this difference information.

Expected value=(0:07+0:05+0:04+0:03+0:05+0:06+
0:05+0:05+0:06+0:04)/10=0:05

Further, the square root of the difference dispersion (standard deviation) is calculated (step S412b) <difference dispersion calculation processing step or difference dispersion calculation processing function>. That is, the square root of the difference dispersion can be calculated as follows, based on the difference information.

First, the arithmetic mean is "0:05", so that the dispersion $\sigma^2$ can be calculated as follows.

$\sigma^2=\{(0:05-0:07)^2+(0:05-0:05)^2+(0:05-0:04)^2+(0:05-0:03)^2+(0:05-0:05)^2+(0:05-0:06)^2+(0:05-0:05)^2+(0:05-0:05)^2+(0:05-0:06)^2+(0:05-0:04)^2\}/10=0:00012$ Thus, the dispersion square root a becomes about 0:01.1.

Then, the information regarding the probability distribution model that the differences follow is obtained, and the value of the percent point where the accumulated probability in the obtained probability distribution model becomes the specific probability is calculated (step S412c). That is, provided that the specific probability is 80 percent, the percent point of the probability in the normal distribution that is an example of the probability distribution model is about 0.87.

Then, the percent point is taken as a coefficient, and the sum of the expected value and the value obtained by multiplying the coefficient by the square root of the dispersion is calculated so as to predict the difference between the code receiving time of the inter-frame coded picture to be received from the current time and thereafter and the presentation time information (step S412d) <predicted difference value calculation processing step or predicted difference value calculation processing function>.

That is, since the percent point of the specific probability in this step is about 0.87, the difference (predicted difference value) between the code receiving time of the intra-frame coded picture and the PTS for the channel 1 can be predicted as follows.

0:05+0:87×0:01.1=(approximately)0:06

Similarly, the following values can be obtained for the channel 2 of the case shown in FIG. 11 by executing step S412 mentioned above.

First, the differences between the code receiving time of the intra-frame coded pictures and the PTS can be calculated as follows.

0:13−0:07=0:06

0:34−0:30=0:04

0:48−0:43=0:05

1:44−1:39=0:05

2:05−1:58=0:07

2:12−2:06=0:06

2:19−2:13=0:06

2:33−2:25=0:08

2:47−2:40=0:07

3:01−2:54=0:07

The expected value of the difference can be calculated as follows based on this difference information.

Expected value=(0:04+0:04+0:05+0:05+0:07+0:06+
0:06+0:08+0:07+0:07)/10=(approximately)0:06

Further, the square root of the difference dispersion can be calculated as follows, based on the difference information.

First, the arithmetic mean is "0:06", so that the dispersion $\sigma^2$ can be calculated as follows.

$\sigma^2=\{(0:06-0:04)^2+(0:06-0:04)^2+(0:06-0:05)^2+(0:06-0:05)^2+(0:06-0:07)^2+(0:06-0:06)^2+(0:06-0:06)^2+(0:06-0:08)^2+(0:06-0:07)^2+(0:06-0:07)^2\}/10=0:00017$ Thus, the dispersion square root a becomes about "0:013".

Then, provided that the percent point of the specific probability in this step is about 0.87, the difference (predicted difference value) between the code receiving time of the intra-frame coded picture and the PTS for the channel 2 can be predicted as follows.

0:06+0:87×0:013=(approximately)0:07

Similarly, the following values can be obtained for the channel 3 of the case shown in FIG. 11 by executing step S412 mentioned above.

First, the differences between the code receiving time of the intra-frame coded pictures and the PTS can be calculated as follows.

0:13−0:09=0:04

0:28−0:21=0:07

0:48−0:42=0:06

1:03−0:58=0:05

1:28−1:23=0:05

1:48−1:42=0:06

2:08−2:03=0:05

2:28−2:23=0:05

2:33−2:29=0:04

2:48−2:45=0:03

The expected value of the difference can be calculated as follows based on this difference information.

Expected value=(0:04+0:07+0:06+0:05+0:05+0:06+
0:05+0:05+0:04+0:03)/10=0:05

Further, the square root of the difference dispersion can be calculated as follows, based on the difference information.

First, the arithmetic mean is "0:05", so that the dispersion $\sigma^2$ can be calculated as follows.

$$\sigma^2=\{(0:05-0:04)^2+(0:05-0:07)^2+(0:05-0:06)^2+(0:05-0:05)^2+(0:05-0:05)^2+(0:05-0:06)^2+(0:05-0:05)^2+(0:05-0:05)^2+(0:05-0:04)^2+(0:05-0:03)^2\}/10=0:00012$$

Thus, the dispersion square root a becomes about "0:011".

Then, provided that the percent point of the specific probability in this step is about 0.87, the difference (predicted difference value) between the code receiving time of the intra-frame coded picture and the PTS for the channel 3 can be predicted as follows.

$$0:05+0:87\times0:011=(\text{approximately})0:06$$

Similarly, the following values can be obtained for the channel m of the case shown in FIG. 11 by executing step S412 mentioned above.

First, the differences between the code receiving time of the intra-frame coded pictures and the PTS can be calculated as follows.

$$0:13-0:07=0:06$$

$$0:17-0:11=0:06$$

$$0:37-0:30=0:07$$

$$0:53-0:44=0:09$$

$$1:13-1:05=0:08$$

$$1:33-1:26=0:07$$

$$1:53-1:45=0:08$$

$$2:17-2:10=0:07$$

$$2:37-2:30=0:07$$

$$3:01-2:55=0:06$$

The expected value of the difference can be calculated as follows based on this difference information.

$$\text{Expected value}=(0:06+0:06+0:07+0:09+0:08+0:07+0:08+0:07+0:07+0:06)/10=(\text{approximately})0:07$$

Further, the square root of the difference dispersion can be calculated as follows, based on the difference information.

First, the arithmetic mean is "0:07", so that the dispersion $\sigma^2$ can be calculated as follows.

$$\sigma^2=\{(0:07-0:06)^2+(0:07-0:06)^2+(0:07-0:07)^2+(0:07-0:09)^2+(0:07-0:08)^2+(0:07-0:07)^2+(0:07-0:08)^2+(0:07-0:08)^2+(0:07-0:07)^2+(0:07-0:06)^2\}/10=0:0001$$

Thus, the dispersion square root a becomes about "0:01".

Then, provided that the percent point of the specific probability in this step is about 0.87, the difference (predicted difference value) between the code receiving time of the intra-frame coded picture and the PTS for the channel m can be predicted as follows.

$$0:07+0:87\times0:01=(\text{approximately})0:08$$

As described, the predicted difference values between the code receiving times of the intra-frame coded pictures and the PTS for the channel 1, the channel 2, the channel 3, and the channel m in the case of FIG. 11 are "0:06", "0:07", "0:06", and "0:08", respectively.

In this exemplary embodiment, the predicted difference values are calculated based on the percent point where the lower-side accumulated probability becomes 80 percent or more. However, the predicted difference values may also be calculated based on the percent point where the lower-side accumulated probability becomes 90 percent or more, or the percent point where the lower-side accumulated probability becomes 70 percent or more.

Then, the predicted values of the code receiving time of the intra-frame coded pictures are calculated based on the predicted PTS and the predicted difference values (step S413) <receiving time predicted value calculation processing step or receiving time predicted value calculation processing function>.

Specifically, the predicted value of the code receiving time of the intra-frame coded picture to be received from the current time and thereafter for the channel 1 can be calculated as follows based on the predicted PTS and the predicted difference.

$$3:05+0:06\times(n-1) \text{ (n is a natural number)}$$

Similarly, the predicted value of the code receiving time of the intra-frame coded picture to be received from the current time and thereafter for the channel 2 can be calculated as follows.

$$3:01+0:07\times(n-1) \text{ (n is a natural number)}$$

Similarly, the predicted value of the code receiving time of the intra-frame coded picture to be received from the current time and thereafter for the channel 3 can be calculated as follows.

$$3:03+0:06\times(n-1) \text{ (n is a natural number)}$$

Similarly, the predicted value of the code receiving time of the intra-frame coded picture to be received from the current time and thereafter for the channel m can be calculated as follows.

$$3:01+0:08\times(n-1) \text{ (n is a natural number)}$$

The predicted code receiving time is calculated for each channel in this manner. Then, it is judged whether or not there is any other channel whose predicted values are not calculated, for example (step S414) <predicted code receiving time calculation state judgment processing step or predicted code receiving time calculation state judging function>.

When it is found in this judgment processing that there is another channel whose predicted code receiving time are not calculated, the procedure is returned to step S410 to execute each step. In the meantime, when it is found in this judgment processing that predicted code receiving time are calculated for all the channels, the procedure is advanced to a next step.

Note here that it is merely an example to execute such judgment processing (judges whether or not the processing has been done for other channels) in a latter stage of step S413, and that there are various other methods as well. For example, such judgment processing may be executed, respectively, in a latter stage of step S410, a latter stage of step S411, a latter stage of step S412, and a latter stage of step S413. Further, such judgment processing may be executed, respectively, in a latter stage of step S410a, a latter stage of step S410b, a latter stage of step S412a, a latter stage of step S412b, a latter stage of step S412c, and a latter stage of step S412d.

(Selection Control Step)

Next, there are described details of the processing of the selection control step for selecting and determining the channel cyclic orders based on the predicted code receiving time of each channel.

First, the time predicting/channel selecting device 220 determines the channel cyclic orders in such a manner that round time of the representative image collection target channels becomes the shortest based on the predicted code receiving time of the intra-frame coded pictures, and conducts channel selection based on the cyclic orders (step S415) <channel cyclic order determining processing step or channel cyclic order determining processing function>.

Specifically, in the channel cyclic order determining processing step, the channels are selected in order from those with higher priority that is set as follows.

That is, there is executed the processing for obtaining the information regarding the threshold value T_TH (specific threshold value) that is set arbitrarily in advance for the time interval from the receiving time of the representative images collected in the past to the current time (step S415a) <threshold-value information acquirement processing step or threshold-value information acquirement processing function>.

Further, there is executed the processing for calculating the differences (time differences) between the receiving time of the representative images collected in the past and the current time for each of the representative image collection target channels (step S415b) <receiving time-current time difference calculation processing step or receiving time-current time difference calculation processing function>.

Then, there is executed the processing for dividing the representative image collection target channels into the set S_H (the first channel set) that is a set of the channels whose time difference is equal to the threshold value T_TH or more and to the set S_L (the second channel set) that is a set of the channels whose time difference is less than the threshold value T_TH (step S415c) <channel set dividing processing step or channel set dividing processing function>.

For example, assuming that the threshold value T_TH is designated as "T_TH=2:15", the representative image collection target channels are divided into the channel set S_H (the first channel set) and the channel set S_L (the second channel set) as follows.

Channel Set S_H={2, 3, m}
Channel Set S_L={1}

Then, there is executed the processing for giving the priority order to each of the channels included in the channels set S_H (the first channels set) and the channel set S_L (the second channel set) in the same manner as that of the exemplary embodiment 3 (step S415d) <channel priority giving processing step or channel priority giving function>.

For example, the priority is given to the channels included in the channel set S_H (the first channels set) in such a manner that the relation "P(3)>P(2)>P(m)" applies.

Further, the priority is determined in such a manner that the priority of the channel included in the channel set S_H (the first channel set) becomes higher than the priority of the channel included in the channel set S_L (the second channel set) (step S415e) <channel set priority giving processing step or channel set priority giving function>.

That is, the priority orders are so set that the relation regarding the priority P, "P(CH_H)>P(CH_L)", applies to any combinations of the channels CH_H included in the channel set S_H and the channels CH_L included in the channel set S_L.

The priority orders are determined in this manner, and the final priority orders for all the representative image collection target channels are determined to be in a relation of "P(3)>P(2)>P(m)>P(1)", by considering the set priority and the channel priority (step S415f) <final channel priority determining processing step or final channel priority determining processing function>. In this manner described above, the final priority regarding the channel cyclic orders are allotted (the cyclic orders are determined).

In summary, the channel selection control step: calculates the difference between the current time and the code receiving time of the each of the representative image collection target channels whose representative images are collected in the past; divides each of the representative image collection target channels to the plurality of channel sets based on the time differences; sets the set priority for each channel set that is given a higher priority than the channel priority that is set for each channel; and determines the final priority for selecting the channel.

Further, the channel selection control step: calculates the differences between the current time and the code receiving time of the each of the representative image collection target channels whose representative images are collected; takes the representative image collection target channel having the time difference that is equal to or more than the specific threshold value and the channel whose representative image is uncollected as the first channel set; takes the representative image collection target channel having the time difference that is less than the specific threshold value as the second channel set; and sets the channel priority of each channel in each of the channel sets under such a set-priority setting condition that the priority for the first channel set is higher than that of the second channel set.

(Round Control Step)

When such channel priority is determined, the coded stream receiving device 10 performs the processing to control selection of the channels based upon the priority (step S416) <channel selection processing step or channel selecting processing function>.

More specifically, the coded stream receiving device 10 is aligned to the channel 3, the channel 2, the channel 1, and the channel m according to the determined priority by selecting the channels in order.

In this step, when a given channel is selected for that round, steps S104, S105, S106, S107 shown in FIG. 7 are repeatedly executed and, for another channel to be selected next, steps S104, S105, S106, S107 shown in FIG. 7 are repeatedly executed. Thereafter, the same processing is repeated for each channel in the same manner.

First, the time predicting/channel selecting device 220 selects the channel 3 from the representative image collection target channels (step S104 of FIG. 7).

The dynamic image receiving apparatus 1 as the representative image receiving device obtains the system time by referring to the system clock 14 (step S105 of FIG. 7).

When the system time is the predicted receiving time of the code of the intra-frame coded picture of the channel 3 (step S106 of FIG. 7), the time predicting/channel selecting device 220 receives and outputs the dynamic image stream of the channel 3 by aligning the coded stream receiving device 10 to the channel 3 (step S107 of FIG. 7). The procedure is then returned to step S104.

Since the codes of the outputted dynamic image stream include the code of the intra-frame coded picture, it is possible to create the representative image by an external device that has received the outputted dynamic image stream.

Then, the channel 2 is selected from the representative image collection target channels (step S104 of FIG. 7).

The dynamic image receiving apparatus 1 as the representative image receiving device obtains the system time by referring to the system clock 14 (step S105 of FIG. 7).

When the system time is the predicted receiving time of the code of the intra-frame coded picture of the channel 2 (step S106 of FIG. 7), the time predicting/channel selecting device 220 receives and outputs the dynamic image stream of the channel 2 by aligning the coded stream receiving device 10 to the channel 2(step S107 of FIG. 7). The procedure is then returned to step S104.

Then, the channel m is selected from the representative image collection target channels (step S104 of FIG. 7).

The dynamic image receiving apparatus 1 as the representative image receiving device obtains the system time by referring to the system clock 14 (step S105 of FIG. 7).

When the system time is the predicted receiving time of the code of the intra-frame coded picture of the channel m (step S106 of FIG. 7), the time predicting/channel selecting device 220 receives and outputs the dynamic image stream of the channel m by aligning the coded stream receiving device 10 to the channel m (step S107 of FIG. 7). The procedure is then returned to step S104.

Then, the channel 1 is selected from the representative image collection target channels whose representative image is uncollected (step S104 of FIG. 7). The dynamic image receiving apparatus 1 as the representative image receiving device obtains the system time by referring to the system clock 14 (step S105 of FIG. 7).

When the system time is the predicted receiving time of the code of the intra-frame coded picture of the channel 1 (step S106 of FIG. 7), the time predicting/channel selecting device 220 receives and outputs the dynamic image stream of the channel 1 by aligning the coded stream receiving device 10 to the channel 1 (step S107 of FIG. 7). The procedure is returned to step S104. Since the dynamic image coded streams including the codes of the intra-frame coded pictures for all the representative image collection target channels are completed, the processing is ended.

(Regarding Effects)

With this exemplary embodiment described above, known range of the PTS interval value of the intra-frame coded pictures is used when predicting the PTS of the intra-frame coded pictures to be received from the current time and thereafter. Thus, it is possible to obtain an effect of improving the accuracy for predicting the PTS of the intra-frame coded pictures to be received from the current time and thereafter, while enabling the same effects as those of the exemplary embodiment 1.

When predicting the differences between the receiving time of the codes of the intra-frame coded pictures to be received from the current time and thereafter and the PTS, the probability dispersion model of the differences between the receiving time of the codes of the intra-frame coded pictures and the PTS is taken as the normal distribution. With this, the coefficient at the percent point where the lower-side accumulated probability becomes the prescribed or higher is multiplied to the square root of the dispersion values of the differences between the receiving time of the codes of the intra-frame coded pictures received in the past and the PTS, and a result obtained by adding the expected value of the difference to the product is taken as the predicted value of the difference between the receiving time of the codes of the intra-frame coded pictures to be received from the current time and thereafter and the PTS. With this, when the differences are random within a specific range, it becomes possible to obtain the effects of enabling accurate prediction and suppressing the probability for the codes of the pictures to reach the dynamic image receiving apparatus before the predicted code receiving time of the intra-frame coded pictures of the current time and thereafter to be the prescribed probability or lower.

Further, through carrying out channel selections by applying the priority orders, it becomes possible to collect a new representative image preferentially by judging that the collected representative image is too old when the difference between the current time and the receiving time of the collected representative image of the channels whose representative images have been collected is equal to or more than the threshold value, and to omit or to postpone collection of a new representative image by reutilizing the collected representative image when the difference is less than the threshold value.

This makes it possible to shorten the time until it becomes possible to utilize the representative image with immediacy of more than a prescribed level, when omitting collection of a new representative image by the reutilization.

Further, when collection of a new representative image is to be postponed by the reutilization, it is possible to achieve more improvements while maintaining the immediacy of the representative image to be reutilized to be more than a prescribed level.

Other structures, other steps, and the operational effects thereof are the same as those of the case of the exemplary embodiment 1 described above. Further, the operation contents of each step and the structural elements of each part described above may be put into a program to be executed by a computer.

Various Modification Examples

While the apparatus and the method according to the invention have been described by referring to some specific exemplary embodiments, it is to be understood that various changes and modifications can be applied to those exemplary embodiments depicted in the text of the present invention without departing from the technical spirit and the scope of the present invention.

For example, the above-described exemplary embodiments are structured to calculate the predicted PTS (presentation time information) from the PTS interval value based on the past PTS that is an example of the periodicity time information and to calculate the predicted difference value from the differences between the code receiving time of the past and the PTS. However, the present invention is not limited only to such case. For example, it may also be structured to calculate predicted DTS (decoding time information) based on past DTS of the past as another example of the periodicity time information) and to calculate the predicted difference value from the differences between the code receiving time of the past and the DTS.

Specifically, an example of the DTS is the one shown in FIG. 18, for example. The DTS can also be predicted in the same manner as in the case of the PTS in the exemplary embodiment 2. As a way of example, FIG. 16 shows the structure thereof, and FIG. 17 shows the processing procedures.

The structures of each part of a time predicting/channel selecting device 320 shown in FIG. 16, the processing procedures of steps S510-S514, steps S215-S216, and the operational effects thereof are the same as those of the exemplary embodiment 2, except that "DTS" is employed instead of "PTS" in the structures and the processing procedures of the exemplary embodiment 2.

Further, FIG. 19 shows the structures, and FIG. 20 shows the processing procedures as another example. The structures of each part of a time predicting/channel selecting device 420 shown in FIG. 19, the processing procedures of steps S610-S614, steps S315-S316, and the operational effects thereof are the same as those of the exemplary embodiment 3, except that "DTS" is employed instead of "PTS" in the structures and the processing procedures of the exemplary embodiment 3.

Furthermore, FIG. 21 shows the structure thereof, and FIG. 22 shows the processing procedures as still another example. The structures of each part of a time predicting/channel selecting device 520 shown in FIG. 21, the processing procedures of steps S710-S714, steps S415-S416, and the operational effects thereof are the same as those of the exemplary embodiment 4, except that "DTS" is employed instead of "PTS" in the structures and the processing procedures of the exemplary embodiment 4.

Moreover, it is also possible to employ a structure which performs prediction by employing the PTS and the DTS in combination.

Further, in the exemplary embodiment 4 described above, one of the increases in the PTS of the intra-frame coded pictures within the history is within the known range. However, there are cases where all the increases in the PTS of the intra-frame coded pictures within the history are out of the range.

In such cases, it can be estimated that the increases in the PTS of the intra-frame coded pictures in the history are natural-number multiples of the actual PTS interval value. Thus, the PTS interval value of the intra-frame coded pictures can be predicted by calculating divisors for one of the increases, and selecting a divisor within the known range from the divisors.

Further, in the exemplary embodiment 4, it is also possible to predict the interval value of the intra-frame coded pictures by calculating the common divisors for a plurality of increases of the PTS of the intra-frame coded pictures in the history, and selecting the common divisor that falls within the known range.

Furthermore, in the exemplary embodiment 4, the normal distribution (Gaussian distribution) is used as the probability distribution model. However, if there is another preferable probability distribution model (probability density function), it is also possible to use that model.

For example, the second predicting unit may perform prediction by using: continuous distribution such as chi-squared distribution, beta distribution, gamma distribution, exponential distribution, log-normal distribution, Pareto distribution, mixed distribution, or uniform distribution; discrete distribution such as binomial distribution, Poisson distribution, geometric distribution, or negative binomial distribution; multivariate distribution such as multinomial distribution or multivariate normal distribution; other conditional distributions; composite Poisson distribution; etc.

Furthermore, any kinds of statistics may be used for the differences between the receiving time of the codes of the intra-frame coded pictures and the PTS in the history, depending on the probability distribution model to be used.

Further, the number of the structural members, positions, the shapes, and the like thereof are not limited to those described in the exemplary embodiments. It is possible to employ the preferable numbers, positions, shapes, and the like of the structural elements for embodying the present invention. That is, while the exemplary embodiments have been described above by referring to the case of using the channel 1, the channel 2, and the channel m as the target channels, and the case of using the channel 1, the channel 2, the channel 3, and the channel m as the target channels, the present invention is not limited to such numbers of channels.

Furthermore, the operations of the dynamic image receiving apparatus 1 described above in the exemplary embodiments are presented as a way of example for achieving the effects of the present invention, and it is possible to employ other structures on condition that the time predicting/channel selecting device 20 predicts the receiving time of the intra-frame coded pictures, the DTS, or the PTS, and aligns the channel for the coded stream receiving device 10 based upon the results of the prediction.

Specifically, an example thereof is a structure in which the time predicting/channel selecting device 20 operates to predict the receiving time of the intra-frame coded picture accurately by calculating it based on the known time/time information or accurately-predictable time/time information in a composite manner.

Further, another example thereof is a structure in which the time predicting/channel selecting device 20 determines the representative image collecting target channels based on preferential information of the viewer and broadcast programs of each channel to limit the range of channels to be selected.

Furthermore, it is also possible to employ a structure in which the time predicting/channel selecting device 20 operates to give the priority orders to the representative image collection target channels based on the representative image collection history for each channel and the time information of the representative images collected in the past, so that the representative images collected in the past can be reutilized effectively.

In addition to the specific structural examples described above, there is also a structure in which the coded stream receiving device 10 is capable of achieving simultaneous reception of pictures from a plurality of channels, for example.

Further, there is also a structure in which the coded stream receiving device 10 is capable of receiving dynamic image stream broadcast (IP broadcast) via the Internet.

Furthermore, there is also a structure in which the accumulative processing device 12 stores various kinds of information that can be used for predicting the receiving time of the intra-frame coded picture, such as the picture number of the intra-frame coded picture if possible, in addition to the receiving time of the intra-frame coded picture received in the past and the PTS or the DTS.

(Program)

Further, the software program of the present invention for enabling the functions of the exemplary embodiments described above includes: a program that corresponds to the processing parts (processing devices), functions, and the like shown in various block diagrams of each of the above-described exemplary embodiments; a program that corresponds to the processing procedures, the processing devices, the functions, and the like shown in the flowcharts and the like; various processing programs processed in each of the programs that utilize the data structures shown in the drawings; and the whole part or a part of the method (steps) depicted all through the current Specification, processing described therein, and the data (for example, DTS, PTS, predicted DTS, predicted PTS, code receiving time, predicted code receiving time, and the like of each channel).

Specifically, the program of the present invention is a program that can be executed by a computer, which allows a computer to execute functions including: a time information accumulative processing function (reference numeral 12 shown in FIG. 1, for example) which performs, for each of the dynamic image streams of a plurality of channels, accumulative processing of the code receiving time at which the intra-frame coded pictures of the dynamic image stream are received and the periodicity information containing one of or both of the presentation time information and the decoding time information contained in the dynamic image stream; a code receiving time predicting function (the structure configured with reference numerals 22, 24, and 25 shown in FIG. 2, for example) which predicts the code receiving time of the intra-frame coded pictures based on the periodicity time information of the time information accumulative processing function; and a channel section control function (reference numeral 26 shown in FIG. 2, for example) which controls selection of the channels of the dynamic image stream to be received, based on the predicted code receiving time information predicted by the code receiving time predicting device.

Further, regarding the data structure, the data structure of the time information used with the dynamic image reception processing executed by the computer may be taken as the target. This data structure can be in a first structure in which the code receiving time at which the intra-frame coded pictures of the dynamic image stream are received and the periodicity time information containing one of or both of the presentation time information and the decoding time information contained in the dynamic image stream are stored (accumulated) by being related to each of the dynamic image streams of the plurality of channels.

The first structure is utilized when the computer executes the code receiving time prediction processing (processing including steps S210-S214 shown in FIG. 8, for example) and the channel selection control processing (processing including steps S215-S216 shown in FIG. 8, for example).

This code receiving time prediction processing can predict the code receiving time of the intra-frame coded pictures based on the periodicity time information. Further, the channel selection control processing can control selection of the channels of the dynamic image stream to be received, based on the predicted code receiving time information predicted by the code receiving time predicting function.

Note here that the data structure may be any kinds of structure selected from: a structure having the code receiving time information and the presentation time information formed for each channel; a structure having the code receiving time information and the decoding time information for each channel; and a structure having the code receiving time information, the presentation time information, and the decoding time information formed for each channel.

Further, the program described above may be of any forms, and it may be a program executed by an object code, an interpreter, or script data, and the like to be supplied to OS. The program can be loaded with high-standard procedure-type or object-oriented programming language, or may be loaded with assembly or interpreter-type language as necessary. In any case, the language may be of a compiler type or an interpreter type. The program installed to application software that can be operated with an ordinal personal computer, a portable information terminal, or the like, is also employed.

As a method for supplying the program, it is possible to provide the program from external equipment through an electric communication circuit (wired or radio line) that connects the external equipment to a computer to be able to communicate. Further, the program codes configuring the program may be divided into a plurality of files.

With the program of the present invention, it is possible to achieve the above-described dynamic image receiving apparatus according to the present invention relatively easily by loading the program from a storage medium such as a ROM that stores the control program to a computer (CPU) and having it executed by the computer or by downloading the program to a computer via a communication device and having it executed by the computer. When the spirit of the present invention is embodied as software of the dynamic image receiving apparatus, there naturally exists a storage medium on which the software is stored.

There is no question that the programs are all the same regardless of the reproduction stages thereof (whether the program is of a primarily recoded program or a secondarily recorded program). In a case where the program is supplied by utilizing a communication circuit, the present invention is applied by using the communication circuit as a transmission medium.

(Information Recording Medium)

Further, the program may be recorded in an information recording medium. An application program containing the program is stored in the information recording medium, and it is possible for a computer to read out the application program from the information recording medium and install the application program to a hard disk. With this, the program can be provided by being recorded in an information recording medium such as a magnetic recording medium, an optical recording medium, or a ROM. It is possible to configure a convenient information processor by using such program-recorded information recording medium in a computer.

As the information recording media for supplying the program, it is possible to use a semiconductor memory such as a ROM, a RAM, a flash memory, or a SRAM and an integrated circuit or an USB memory, a memory card, an optical disk, a magneto-optical disk, a magnetic recording medium, or the like including such semiconductor memory and the like. Further, the program may be recorded on a movable medium such as a flexible disk, a CD-ROM, a CD-R, a CD-RW, an FD, a DVD ROM, an HD DVD (HD DVD-R-SL: single layer, an HD DVD-R-DL: double layer, an HD DVD-RW-SL, an HD DVD-RW-DL, an HD DVD-RAM-SL), a DVD±R-SL, a DVD±R-DL, a DVD±RW-SL, a DVD±RW-DL, a DVD-RAM, a Blu-Ray Disk (Registered Trademark): a BD-R-SL, a BD-R-DL, a BD-RE-SL, a BD-RE-DL), an MO, a ZIP, a magnetic card, a magnetic tape, an SD card, a memory stick, a nonvolatile memory card, an IC card, or may be recorded on a storage device such as a hard disk that is built-in on a computer system.

Further, the "information recording medium" is to include a medium (transmission medium or a carrier wave) such as a communication line that kinetically holds the program for a short time, which is used when transmitting the program via the communication circuit such as a network of the Internet or a telephone circuit, for example, and to include a medium that holds the program for a specific length of time, such as a volatile memory provided inside a computer system to be a server or a client of the above-described case.

Furthermore, in a case where an OS operated on a computer or an RTOS or the like on a terminal (for example, a portable telephone) executes a part of or the whole processing, it is also possible to achieve the same functions and obtain the same effects as those of the exemplary embodiments described above.

Further, it is also possible to: distribute a recording medium such as a CD-ROM in which the program is coded and stored to users; let the user who has cleared a prescribed condition download the key information for decoding the codes from a homepage via the Internet; and execute the coded program by using the key information to have the program installed to a computer. In this case, the structures of the present invention may include each structural element of the program (various devices, steps, and data) and a coding device for coding the program.

Furthermore, the apparatus according to the exemplary embodiments described above may be structured as a part of a system of a Peer-to-Peer communication that transmits/receives data between terminals that form a network without a client server system or a server. In that case, there is no problem to build the "system" as a system that is integrated with another "information processing system". This system is to include OS and hardware such as peripheral equipment.

Further, as the information processor on which the above-described program and the like are loaded, the server is not limited to a personal computer, but various servers, EWS (engineering work station), a medium-sized computer, a mainframe, or the like may be used. In addition, the program may be so structured that it can be utilized by a portable information terminal, various mobile terminals, a PDA, a portable telephone, a wearable information terminal, various kinds of (portable, for example) televisions, a DVD recorder, various kinds of audio equipment, a household appliance to which various information communication functions are loaded, a game machine having a network function, etc.

Further, the above-described program may be a program that achieves a part of the functions described above. Further, the program may be a so-called difference file (difference program) which can achieve the above-described functions in combination with a program that is already being recorded to the computer system.

Furthermore, the steps shown in the flowcharts of the present Specification include not only the processing executed in a time series manner according to the depicted order but also the processing that is not necessarily executed in a time series manner but executed in parallel or individually. Regarding the actual implementation, the order of the program procedures (steps) can be altered. Further, as necessary, a specific procedure (step) described in the current Specification can be implemented, eliminated, added, or rearranged as a combined procedure (step).

Further, the functions of the program such as each device and each function of the dynamic image receiving apparatus, and the functions of the procedures of each step may be achieved by dedicated hardware (a dedicated semiconductor circuit, for example). A part of the whole functions of the program may be processed by the hardware, and the other functions may be processed by software. In a case of using the dedicated hardware, each part may be formed by an integrated circuit such as an LSI. Those circuits may be formed on a single chip individually, or a part or the entire circuits may be formed on a single chip. Further, the LSI may be provided with another functional block such as a streaming engine. Furthermore, the circuits may not necessarily be formed into an integrated circuit to be an LSI. A dedicated circuit or a general-purpose processor may be employed. Moreover, if there is introduced a technique for achieving an integration circuit in place for the LSI due to improvements in the semiconductor technique or other techniques derived therefrom, that technique can naturally be used to integrate the functional blocks.

Further, "communication" may be radio communication or wired communication and communication achieved by employing both the radio communication and the wired communication (i.e., communication achieved by employing the radio communication in a certain section and employing the wired communication in another section). In addition, "communication" may be achieved by employing the wired communication from a certain device to another device and employing the radio communication from another device to still another device.

Further, this communication includes a communications net. As a network configuring the communications net, any of hardware structures can be employed, e.g., various circuit nets such as a portable telephone circuit net (including a base station and a switching system), a public telephone circuit net, an IP telephone net, an ISDN circuit net, or a net similar to those, the Internet (i.e., a communication mode using TCP/IP protocol), the Intranet, LAN (including Ethernet (Registered Trademark) and gigabit Ethernet), WAN, an optical fiber communications net, a power-line communications net, various dedicated circuit net capable of handling broadband, etc. Further, the network may employ any kinds of protocols, and it may be a network using any kinds of communication protocols other than the TCP/IP protocol, may be a virtual network built as software, or a network similar to those. Furthermore, the network is not limited only to a wired network but may also be a radio (including a satellite communication, various high-frequency communication device, or the like) network (for example, a network including a single carrier communication system such as a handy phone system or a portable telephone, a spread spectrum communication system such as W-CDMA or a radio LAN conforming to IEEE802.11b, a multicarrier communication system such as IEEE802.11a or Hiper LAN/2). Combinations of those may be used, and a system connected to another network may also be employed. Further, the network may be of any mode such as point-to-multipoints, multipoints-to-multipoints, etc.

Further, the interface formed in one of or both sides of the dynamic image receiving apparatus and the other communication device in a communication structure may be of any types such as a parallel interface, a USB interface, IEEE1394, a network such as LAN or WAN, a type similar to those, or any interface that may be developed in the future.

Furthermore, the way to predict the code receiving time information is not limited only to a substantial device. It is easily understood that the present invention regarding the device also may function as a method. Accordingly, the present invention regarding the method is not limited only to the substantial device but may also be effective as the method thereof. In that case, the dynamic image receiving apparatus and the communication device may be included as examples for achieving the method.

Such dynamic image receiving apparatus may be used alone or used while being mounted to an apparatus (for example, an electronic appliance). The technical spirit of the present invention is not limited only to such cases but may also include various forms. Therefore, the present invention may be applied to software or hardware, and the forms thereof may change as necessary. When the technical spirit of the present invention is embodied as software of a branch prediction device, there naturally needs a recording medium on which the software is stored to be utilized.

Further, a part of the present invention may be achieved by software, and a part thereof may be achieved by hardware. A part thereof may be stored on a recording medium to be loaded as necessary. When the present invention is to be achieved by software, it may be structured to use hardware and an operating system, or may be achieved separately from those.

Furthermore, dependent claims regarding the apparatus may be formed as dependent claims of the method and the program that correspond to those of the apparatus.

Furthermore, various stages are included in each of the above-described exemplary embodiments, and it is possible to extract various inventions therefrom by combining a plurality of structural elements disclosed therein. That is, the present invention includes various combinations of each of the exemplary embodiments as well as combinations of the exemplary embodiments and each of the modifications examples. In such cases, operational effects obvious from each structure disclosed in each of the exemplary embodiments and the modifications examples thereof are to be included in the operational effects of the exemplary embodiments, even if there are no specific depictions of those in the exemplary embodiments. Inversely, the structures that provide all the operational effects depicted in the exemplary embodiments are not necessarily the essential structural elements of the substantial feature part of the present invention. Moreover, an exemplary embodiment configured by omitting some structural elements from the entire structural elements disclosed in the exemplary embodiment as well as the technical range based upon the structure thereof may also be taken as the invention.

Each of the exemplary embodiments and the modification examples thereof are merely presented as examples out of variety of embodiments of the present invention for helping the present invention to be understood easily. Those are not intended to limit the scope of the present invention, and various modifications and/or changes can be applied as necessary. It is to be understood that the present invention can be embodied in various forms based upon the technical spirit and the main features thereof, and the scope of the technical spirit of the present invention is not to be limited by the exemplary embodiments and the modification examples thereof.

Accordingly, it is to be understood that each of the elements disclosed above is to include all the design changes and the equivalent thereof within the scope of the technical spirit of the present invention.

Another exemplary embodiment of the present invention may be structured to include:

a time information accumulative processing device which performs accumulative processing of code receiving time of an intra-frame coded picture of a dynamic image stream and periodicity time information containing one of or both of presentation time information and decoding time information contained in the dynamic image stream for each of the dynamic image streams of a plurality of channels;

a code receiving time predicting device which predicts the code receiving time of the intra-frame coded picture based on the periodicity time information stored in the time information accumulative processing device; and a channel selection control device which controls channel selection of the dynamic image stream to be received, based on the predicted code receiving time information predicted by the code receiving time predicting device.

In the dynamic image receiving apparatus, the code receiving time predicting device may include:

a first predicting device which predicts an interval value of each of the periodicity time information by considering each increase in the respective periodicity time information of the past, and predicts the periodicity time information of the intra-frame coded pictures to be received from the current time and thereafter based on the predicted interval value of the periodicity time information and the past periodicity time information received lastly; and a second predicting device which predicts the difference between the code receiving time information of the intra-frame coded pictures to be received from the current time and thereafter and the periodicity time information based on the code receiving time of the intra-frame coded pictures received in the past and the periodicity time information, and predicts the code receiving time of the intra-frame coded pictures to be received from the current time and thereafter based on the predicted difference and the predicted periodicity time information predicted by the first predicting device.

In the dynamic image receiving apparatus, the first predicting device may be a device which predicts the interval value of the periodicity time information based on a common divisor of each of the increases in the respective periodicity time information.

In the dynamic image receiving apparatus, the first predicting device may be a device which predicts the interval value of the periodicity time information based on the minimum value of each of the increases in the respective periodicity time information.

In the dynamic image receiving apparatus, the first predicting device may be a device which predicts the interval value of the periodicity time information by selecting the increase that fits within a range of periodicity time information interval values in a specific range that is obtained from known information from each of the increases in the respective periodicity time information.

In the dynamic image receiving apparatus, the second predicting device may be a device which predicts the value obtained by adding a prescribed margin to the mean value of the differences between the past code receiving time and the periodicity time information as the difference between the code receiving time of the intra-frame coded picture to be received from the current time and thereafter and the periodicity time information.

In the dynamic image receiving apparatus, the second predicting device may be a device which: generates a histogram of differences between the code receiving time of the past and the periodicity time information; selects a class with the percent point of the histogram where the accumulated probability becomes more than a prescribed percentage; and predicts the measure of central tendency of that class as the difference between the code receiving time of the inter-frame coded picture to be received from the current time and thereafter and the periodicity time information.

In the dynamic image receiving apparatus, the second predicting device may be a device which: calculates the expected value and dispersion of differences between the past code receiving time and the periodicity time information; calculates the percent point where the lower-side accumulated probability in a probability distribution model that the differences follow becomes a specific probability, and takes that value as a coefficient; calculates the sum obtained by adding the value that is obtained by multiplying the coefficient by a square root of the dispersion and the expected value to predict the difference between the code receiving time of the intra-frame coded picture to be received from the current time and thereafter and the periodicity time information.

In the dynamic image receiving apparatus, the second predicting device may be a device which predicts the difference by using the probability distribution model as a standard normal distribution.

In the dynamic image receiving apparatus, the channel selection control device may be a device which selects the channel by determining the channel cyclic orders in such a manner that the time for going around the representative image collection target channels becomes the shortest, based on the predicted code receiving time predicted by the code receiving time predicting device.

In the dynamic image receiving apparatus, the channel selection control device may be a device which finds an approximate solution of the channel cyclic orders through performing depth priority search by repeating selection of the representative image collection target channels.

In the dynamic image receiving apparatus, the channel selection control device may be a device which calculates evaluation values for the channel selection orders based on the predicted code receiving times, and selects the channels in order from the one with the highest evaluation value, and may be a device which determines the selecting orders of the channels through calculating the evaluation values based on the immediacy of the representative images to be collected or based on the collecting time.

In the dynamic image receiving apparatus, the channel selection control device may be a device which calculates the evaluation value as the time required for going around the channels.

In the dynamic image receiving apparatus, the channel selection control device may be a device which: calculates a first evaluation function that shows a relation between most-recent code receiving time of the intra-frame coded picture of the channel selected just before and the code receiving time of the intra-frame coded picture received after the most-recent code receiving time; and selects an unselected channel whose calculation result of the first evaluation function becomes the minimum as the channel to be aligned first.

In the dynamic image receiving apparatus, the channel selection control device may be a device which: when there are a plurality of unselected channels whose calculation results of the first evaluation function are the minimum, calculates a second evaluation function that shows code receiving time of the second intra-frame coded picture received after the most-recent code receiving time; and selects the unselected channel whose calculation result of the second evaluation function becomes the maximum as the channel to be aligned first.

In the dynamic image receiving apparatus, the channel selection control device may be a device which: calculates a third evaluation function that shows a relation between the predicted periodicity time information of the intra-frame coded picture and the current time while considering whether or not the representative image has been collected in the past; sets the channels with larger value of calculation results of the third evaluation function as having higher priority; and controls selection of the channels in order from the one with the highest priority.

In the dynamic image receiving apparatus, the channel selection control device may be a device which: when there are a plurality of channels whose calculation results of the third evaluation function are the same, sets the channels with the larger value of the first evaluation function to have the higher priority.

In the dynamic image receiving apparatus, the channel selection control device may be a device which: if there are a plurality of channels having the same calculation results of the first evaluation function when setting the priority orders by using the third evaluation function, sets the channels with the larger value of the second evaluation function to have the higher priority.

In the dynamic image receiving apparatus, the channel selection control device may be a device which: calculates the difference between the current time and the code receiving time of each of the representative image collection target channels whose representative images are collected in the past; divides each of the representative image collection target channels to a plurality of channel sets based on the time differences; sets the set priority for each channel set that is given a higher priority than the channel priority that is set for each channel; and determines the final priority for selecting the channel.

A dynamic image receiving method according to another exemplary embodiment of the present invention may be structured to include:

a time information accumulative processing step which performs accumulative processing of the code receiving time of the intra-frame coded picture of the dynamic image stream and the periodicity time information containing one of or both of the presentation time information and the decoding time information contained in the dynamic image stream for each of the dynamic image streams of a plurality of channels;

a code receiving time predicting step which predicts the code receiving time of the intra-frame coded picture based on the periodicity time information stored in the time information accumulative processing device; and a channel selection control step which controls channel selection of the dynamic image stream to be received, based on the predicted code receiving time information predicted in the code receiving time predicting step.

In the dynamic image receiving method, the code receiving time predicting step may include:

a first predicting first which predicts an interval value of each of the periodicity time information by considering each increase in the respective periodicity information of the past, and predicts the periodicity time information of the intra-frame coded pictures to be received from the current time and thereafter based on the predicted interval value of the periodicity time information and the past periodicity time information received lastly; and a second predicting step which predicts the code receiving time based on the predicted periodicity time information predicted in the first predicting step.

In the dynamic image receiving method, the second predicting step may be a step which: generates a histogram of differences between the code receiving time of the past and the periodicity time information; selects a class with the percent point of the histogram where the accumulated probability becomes more than a prescribed percentage; and predicts the measure of central tendency of that class as the difference between the code receiving time of the inter-frame coded picture to be received from the current time and thereafter and the periodicity time information.

In the dynamic image receiving method, the second predicting step may be a step which: calculates the expected value and dispersion of differences between the past code receiving time and the periodicity time information; calculates the percent point where the lower-side accumulated probability in a probability distribution model that the differences follow becomes a specific probability, and takes that value as a coefficient; calculates the sum obtained by adding the value that is obtained by multiplying the coefficient by a square root of the dispersion and the expected value to predict the difference between the code receiving time of the intra-frame coded picture to be received from the current time and thereafter and the periodicity time information.

In the dynamic image receiving method, the channel selection control step may be a step which calculates evaluation values for the channel selection orders based on the predicted code receiving time, and selects the channels in order from the one with the highest evaluation value, and may be a step which determines the selecting orders of the channels through calculating the evaluation values based on the immediacy of the representative images to be collected or based on the collecting time.

A program according to another exemplary embodiment of the present invention as a program that can be executed by a computer, which may be structured to enable the computer to execute:

a time information accumulative processing function which performs accumulative processing of the code receiving time of receiving the intra-frame coded picture of the dynamic image stream and periodicity time information containing one of or both of the presentation time information and the decoding time information contained in the dynamic image stream for each of the dynamic image streams of a plurality of channels;

a code receiving time predicting function which predicts the code receiving time of the intra-frame coded picture based on the periodicity time information of the time information accumulative processing function; and a channel selection control function which controls channel selection of the dynamic image stream to be received, based on the predicted code receiving time information predicted by the code receiving time predicting function.

While the present invention has been described by referring to the exemplary embodiments (and examples), it is not intended to be limited to those exemplary embodiments (and examples). Various changes and modifications that occur to those skilled in the art are possible within the scope of the present invention.

This Application claims the Priority right based on Japanese Patent Application No. 2007-255204 filed on Sep. 28, 2007, and the disclosure thereof is hereby incorporated by reference in its entirety.

INDUSTRIAL APPLICABILITY

The present invention can be applied to the computer industry, the communication business field, and the information processing industry similar to those. More specifically, the present invention can be applied to a receiving device, for example, which fragmentarily receives dynamic image streams transmitted via a plurality of channels by switching those channels.

BRIEF DESCRIPTION OF THE DRAWINGS

FIG. 6 is an explanatory illustration for describing examples of receiving time of a code of an intra-frame coded picture and PTS according to the exemplary embodiment 4-1 of the invention;

FIG. 11 is an explanatory illustration for describing examples of receiving time of codes of intra-frame coded pictures and PTS in the dynamic image receiving apparatus according to the exemplary embodiment 4-2 of the present invention;

FIG. 18 is an explanatory illustration for describing examples of receiving time of codes of intra-frame coded pictures and DTS of a dynamic image receiving apparatus according to an exemplary embodiment of the invention;

REFERENCE NUMERALS

Figure 1:
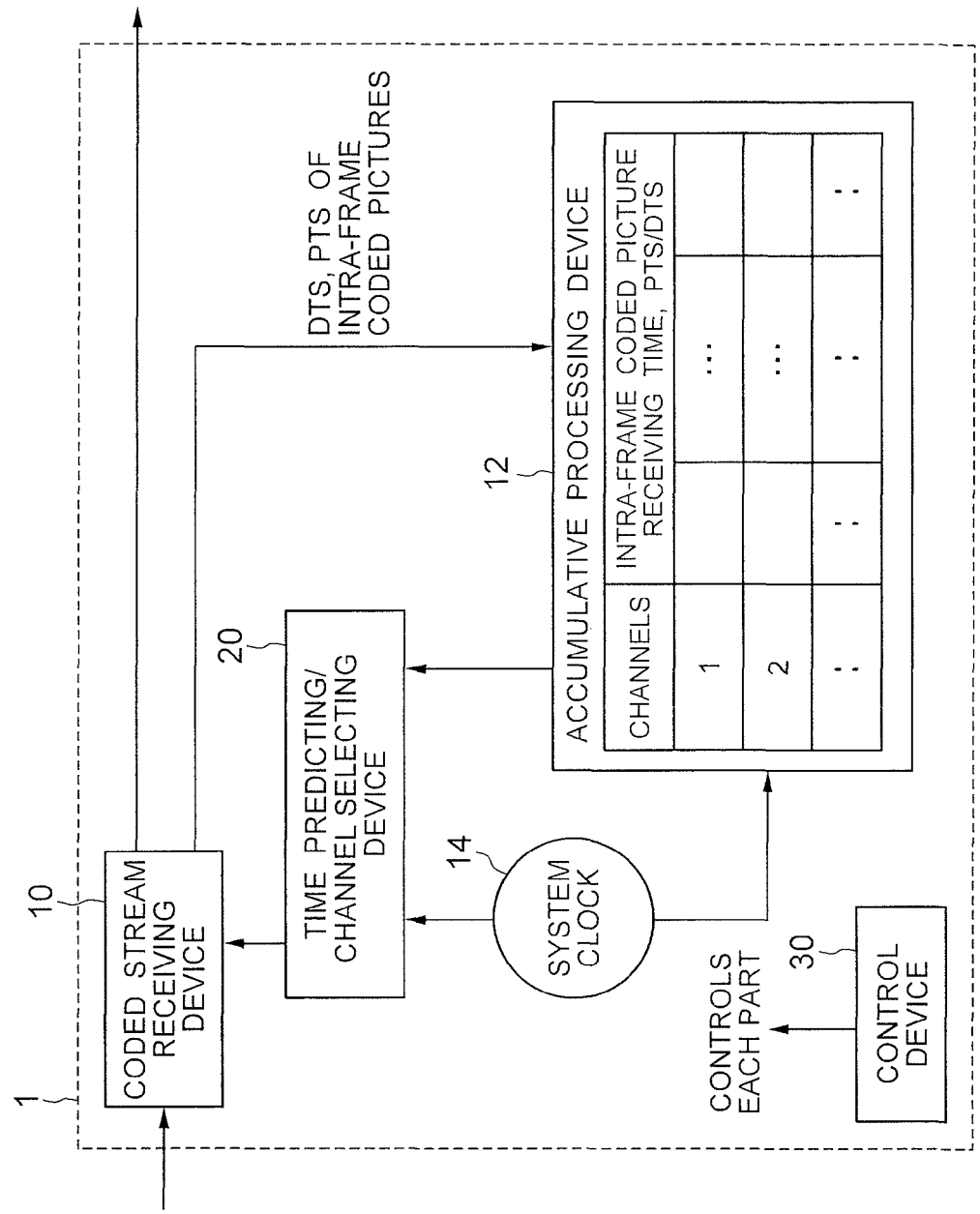
FIG. 1 is a block diagram showing an example of an overall structure of a dynamic image receiving apparatus according to an exemplary embodiment of the invention.
Figure 2:
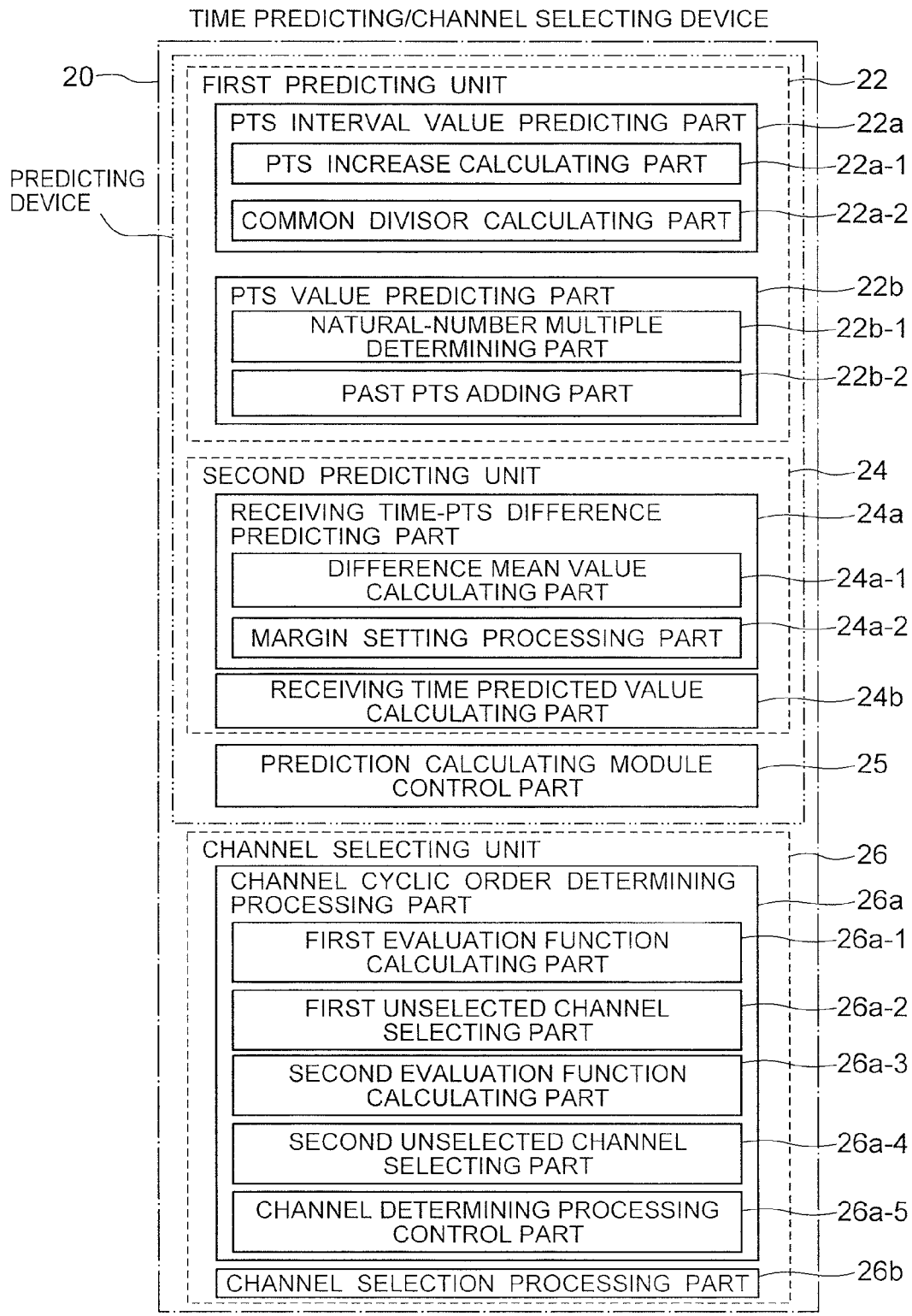
FIG. 2 is a block diagram showing an example of a detailed structure of an intra-frame coded picture receiving time predicting/channel selecting unit of a dynamic image receiving apparatus according to an exemplary embodiment 4-1 of the invention.
Figure 3:
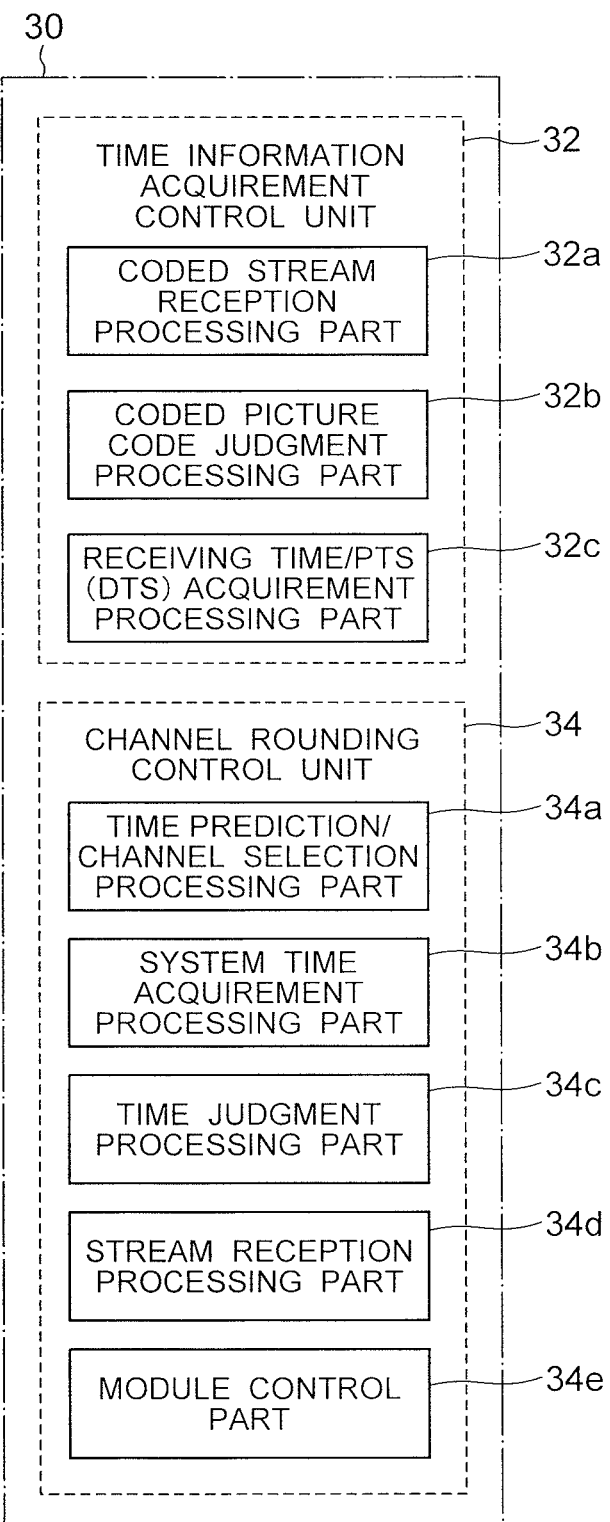
FIG. 3 is a block diagram showing an example of a detailed structure of a control device of the dynamic image receiving apparatus according to the exemplary embodiment 4-1 of the present invention.
Figure 4:
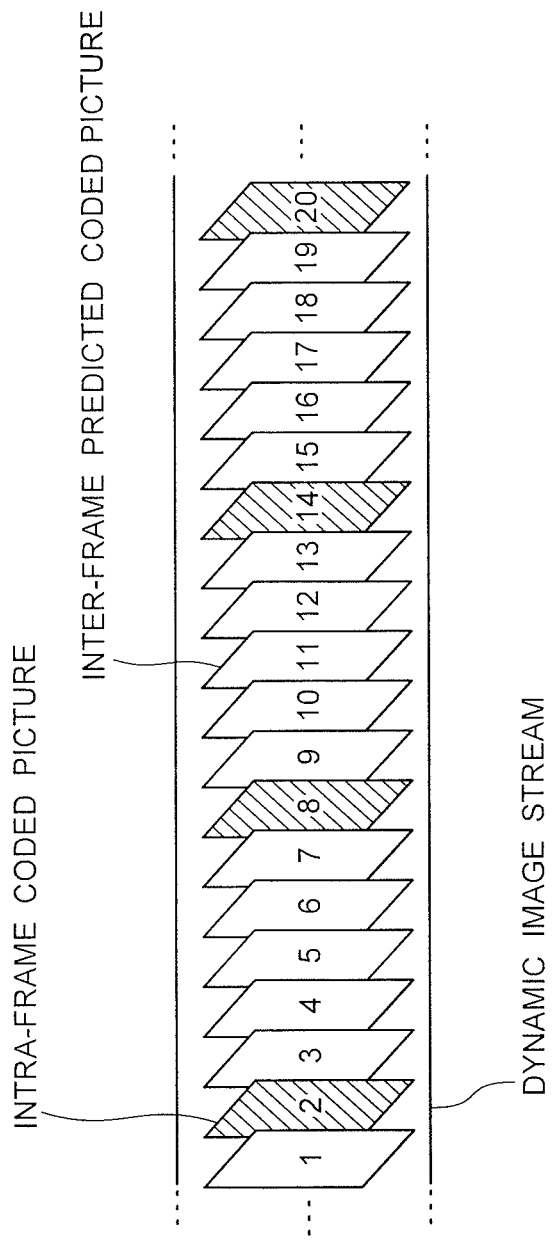
FIG. 4 is an explanatory illustration showing an example of a dynamic image coded stream that is coded by using inter-frame prediction.
Figure 5:
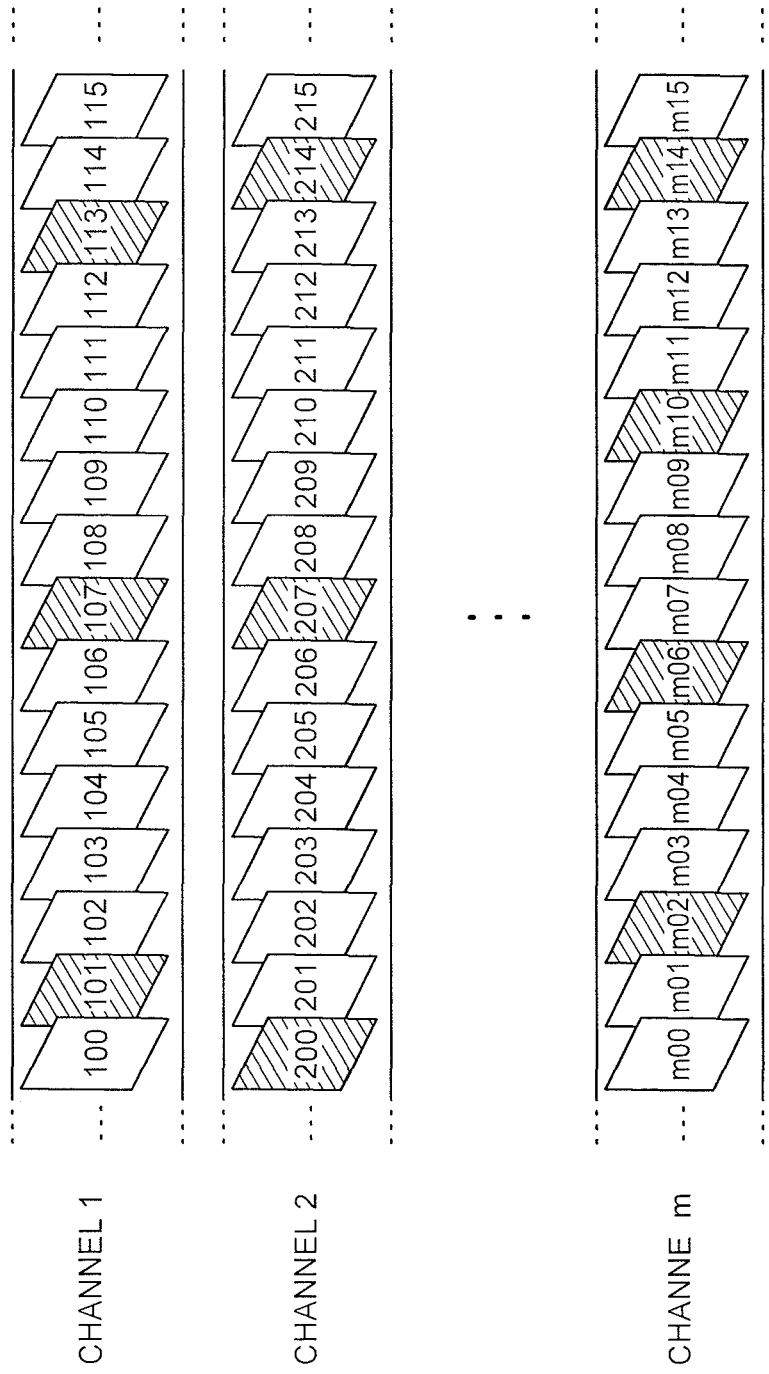
FIG. 5 is an explanatory illustration for describing an example of a dynamic image stream in the dynamic image receiving apparatus of the invention.
Figure 7:
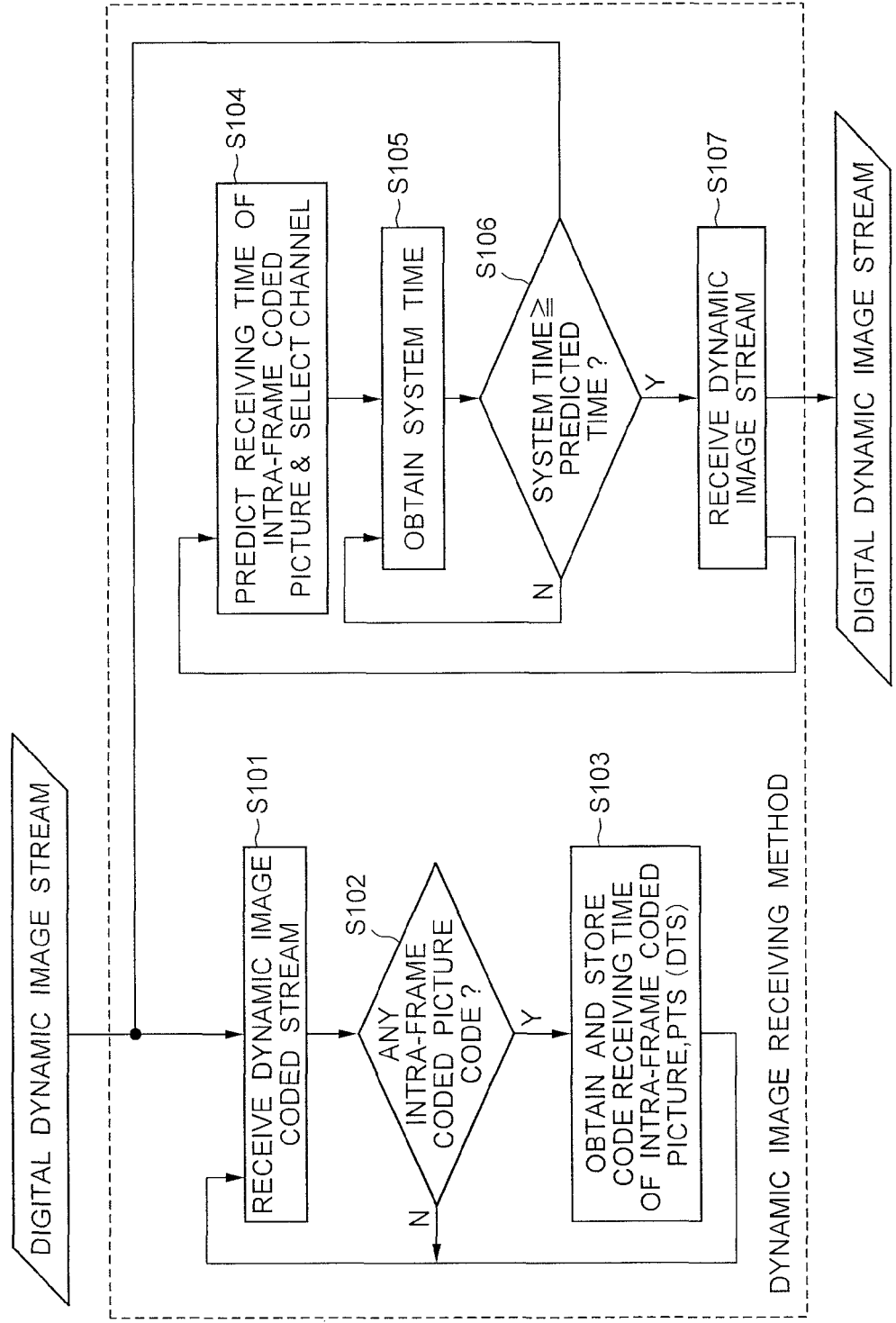
FIG. 7 is a flowchart showing an example of whole processing procedures executed in the dynamic image receiving apparatus according to the exemplary embodiment 4-1 of the invention.
Figure 8:
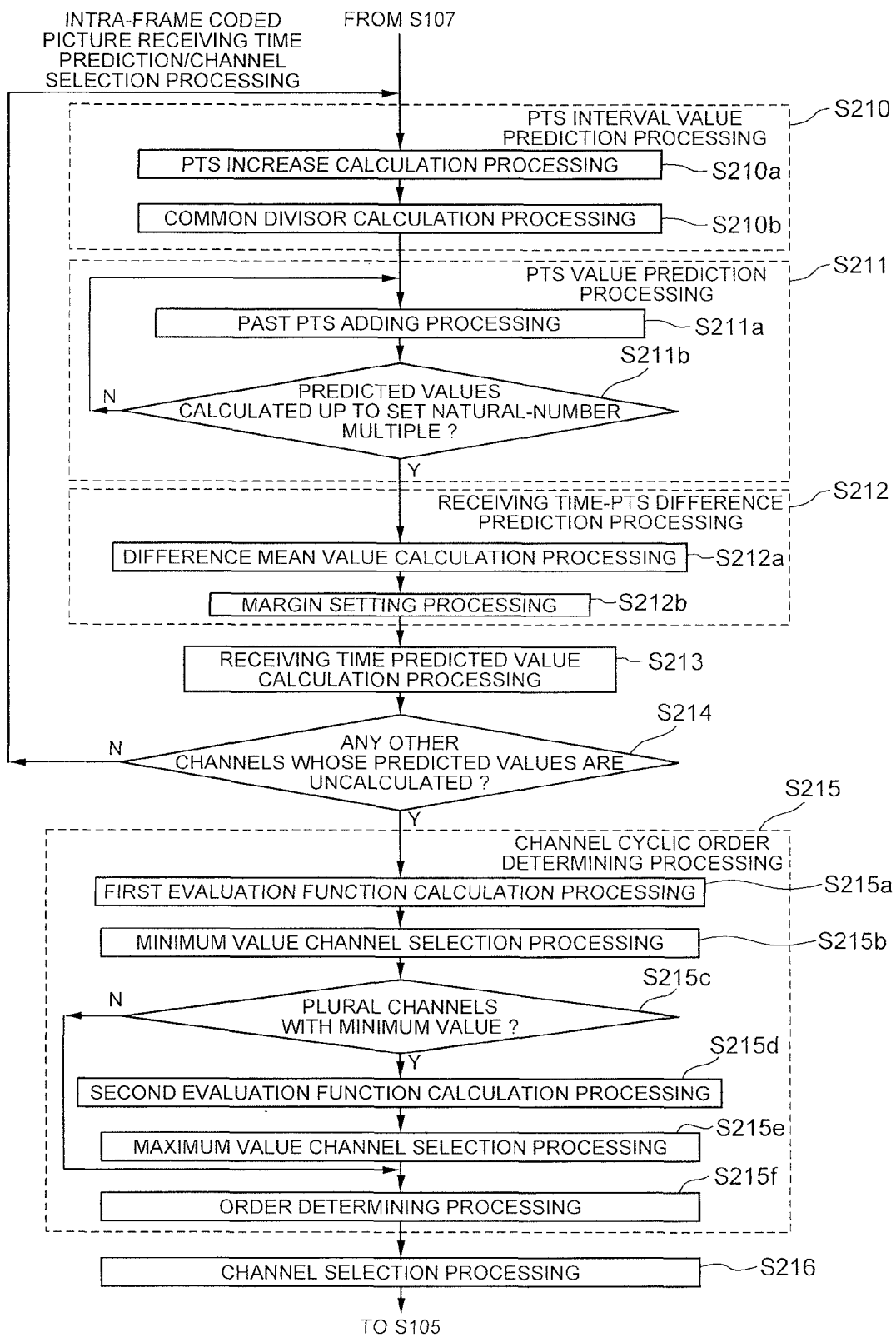
FIG. 8 is a flowchart showing an example of detailed processing procedures executed in the dynamic image receiving apparatus according to the exemplary embodiment 4-1 of the invention.
Figure 9:
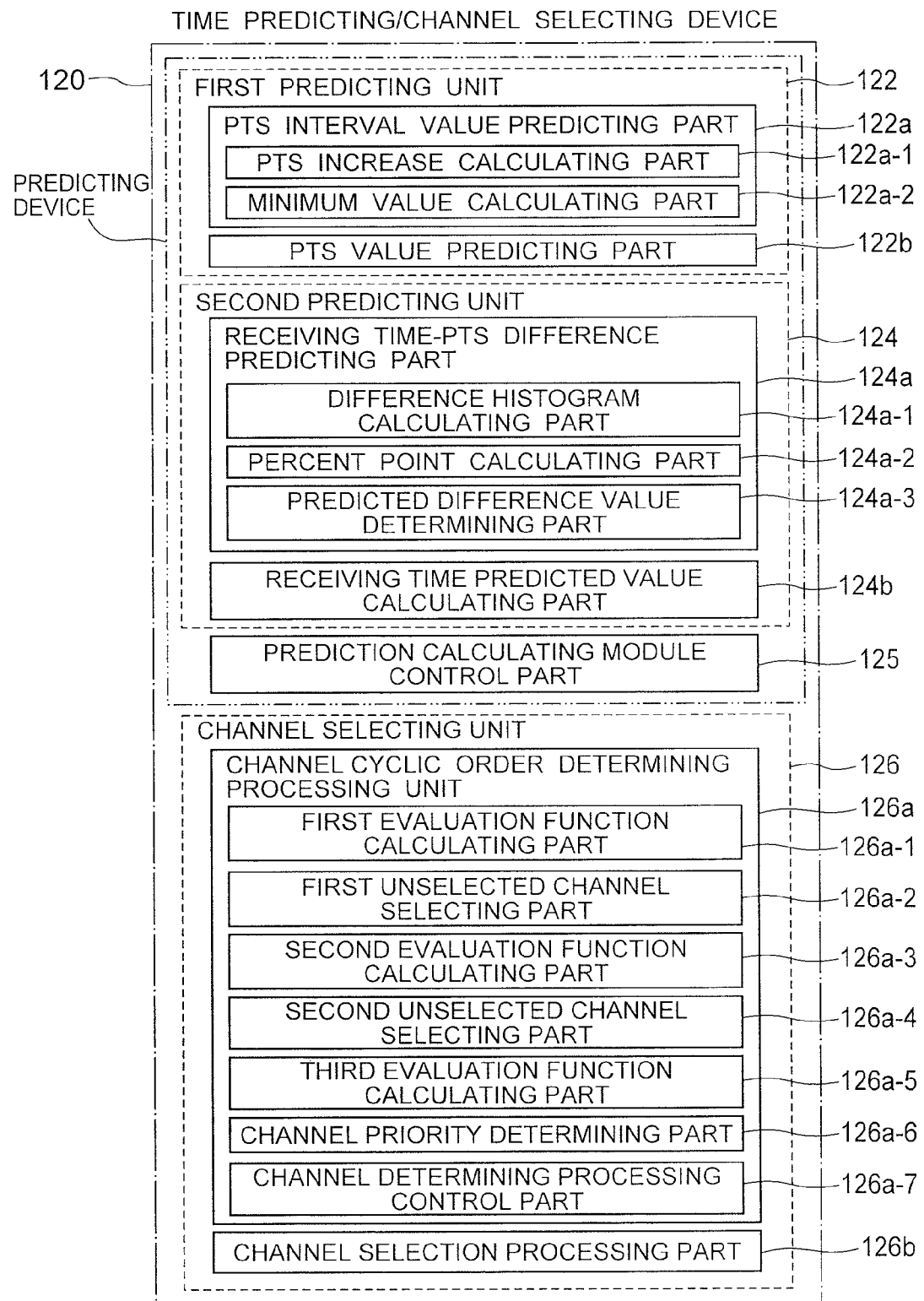
FIG. 9 is a block diagram showing an example of a detailed structure of an intra-frame coded picture receiving time predicting/channel selecting unit of a dynamic image receiving apparatus according to an exemplary embodiment 4-2 of the invention.
Figure 10:
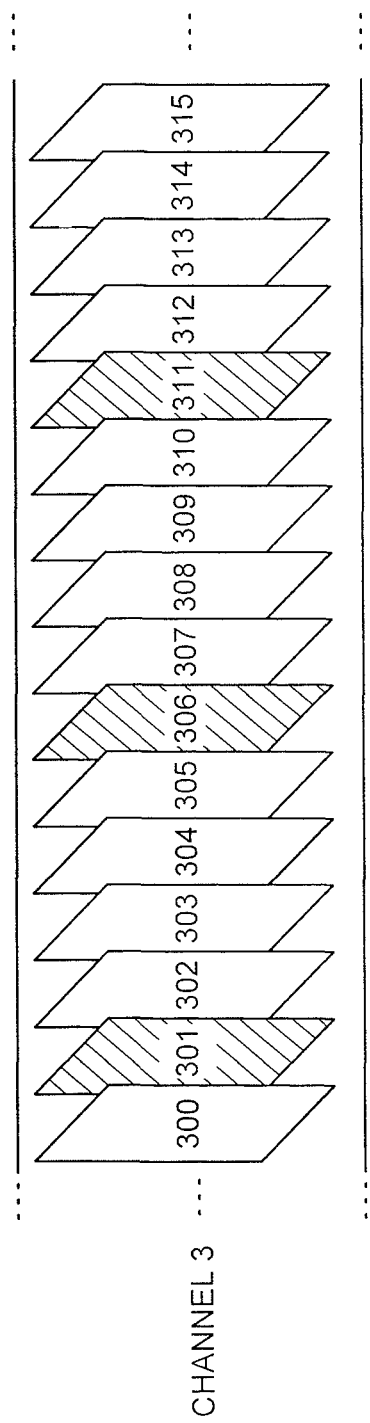
FIG. 10 is an explanatory illustration for describing an example of a dynamic image stream that is additionally used in the dynamic image receiving apparatus according to the exemplary embodiment 4-2 of the invention.
Figure 12:
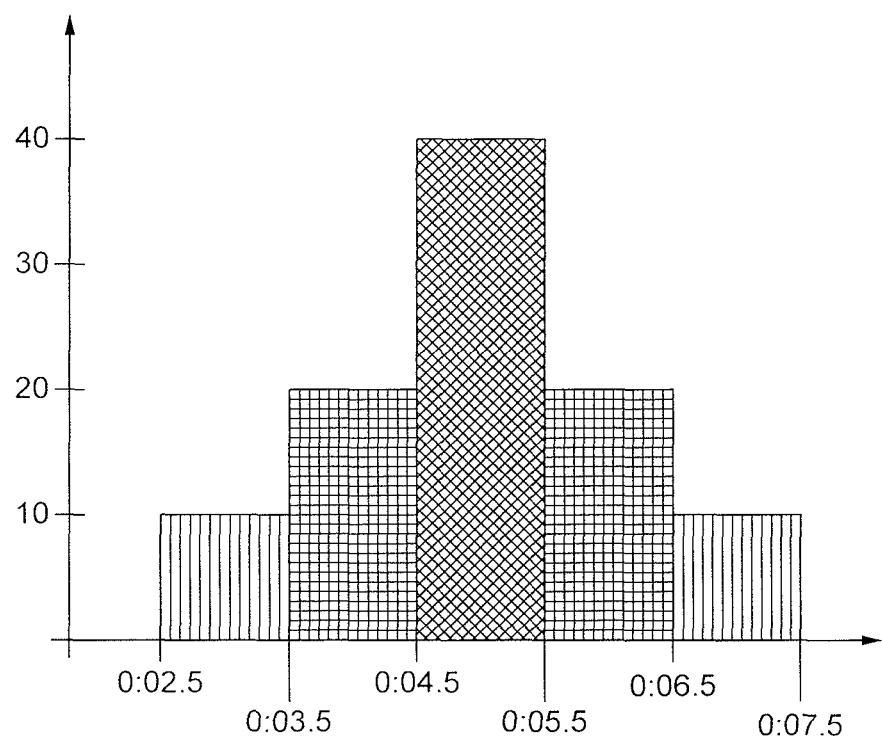
FIG. 12 is an explanatory illustration for describing examples of receiving time of codes of intra-frame coded pictures received in the past at a channel 1 and a PTS difference histogram of the dynamic image receiving apparatus according to the exemplary embodiment 4-2 of the invention.
Figure 13:
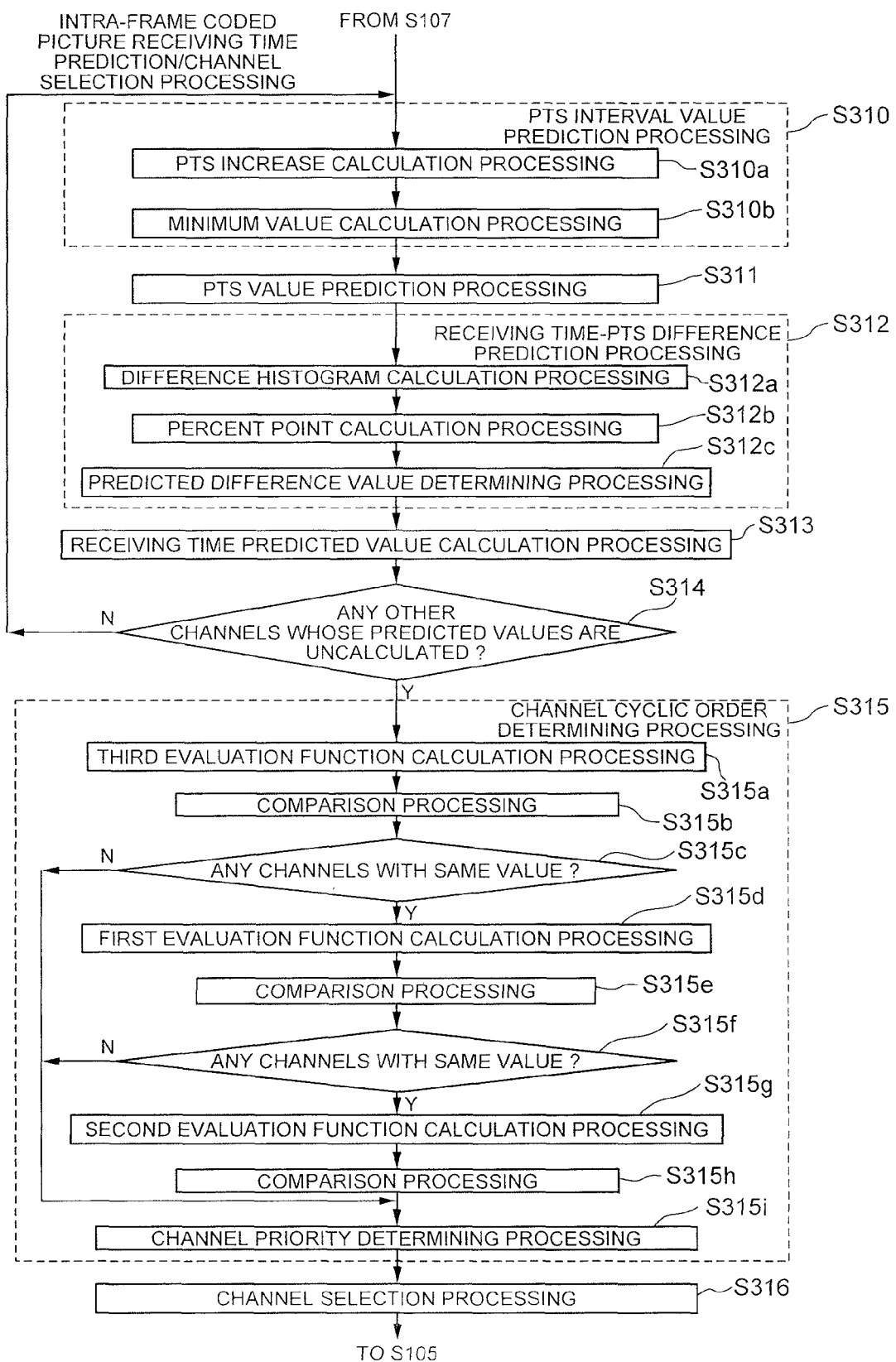
FIG. 13 is a flowchart showing an example of detailed processing procedures executed in a dynamic image receiving apparatus according to an exemplary embodiment 4-3 of the invention.
Figure 14:
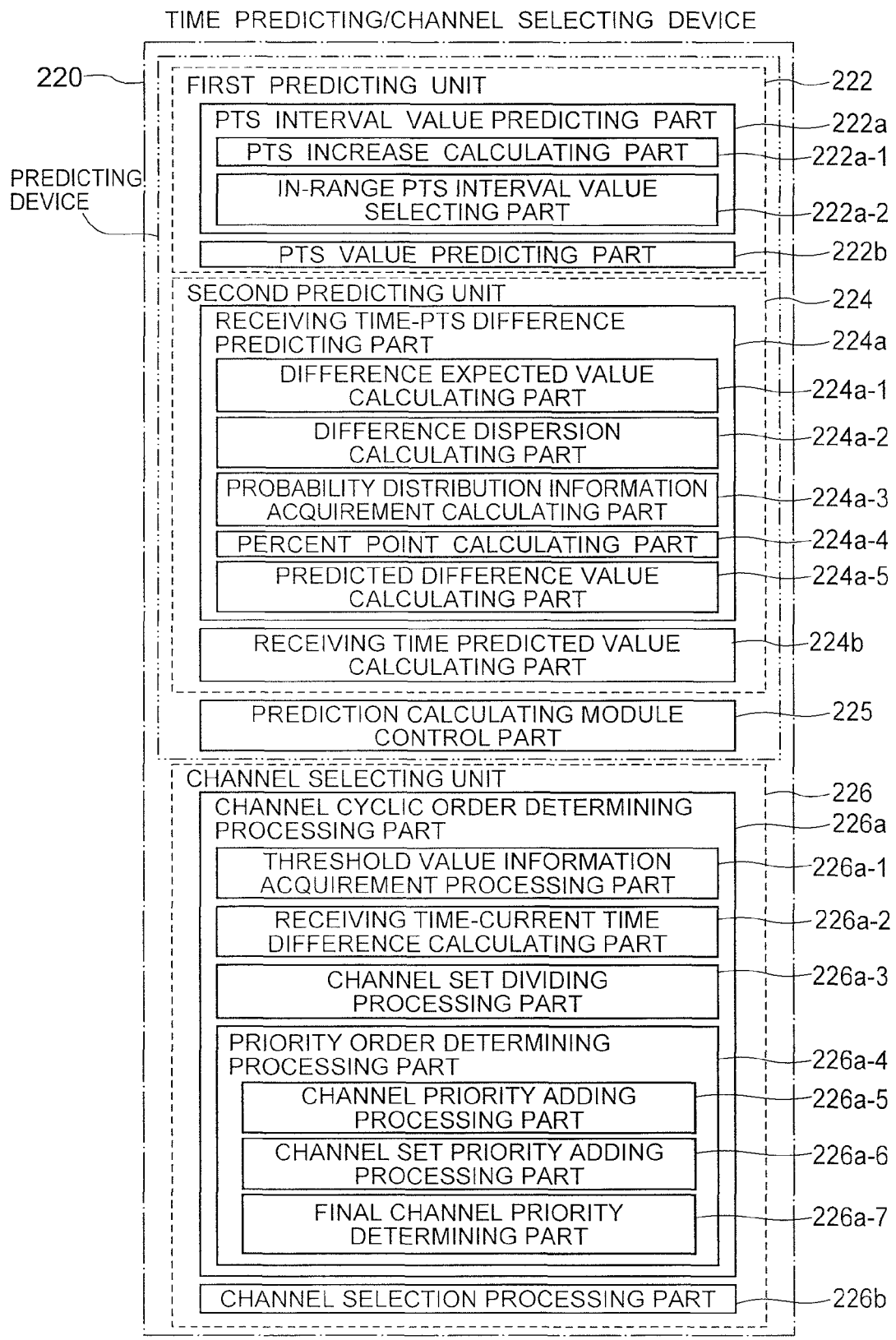
FIG. 14 is a block diagram showing an example of detailed structures of an intra-frame coded picture receiving time predicting/channel selecting unit of the dynamic image receiving apparatus according to the exemplary embodiment 4-3 of the invention.
Figure 15:
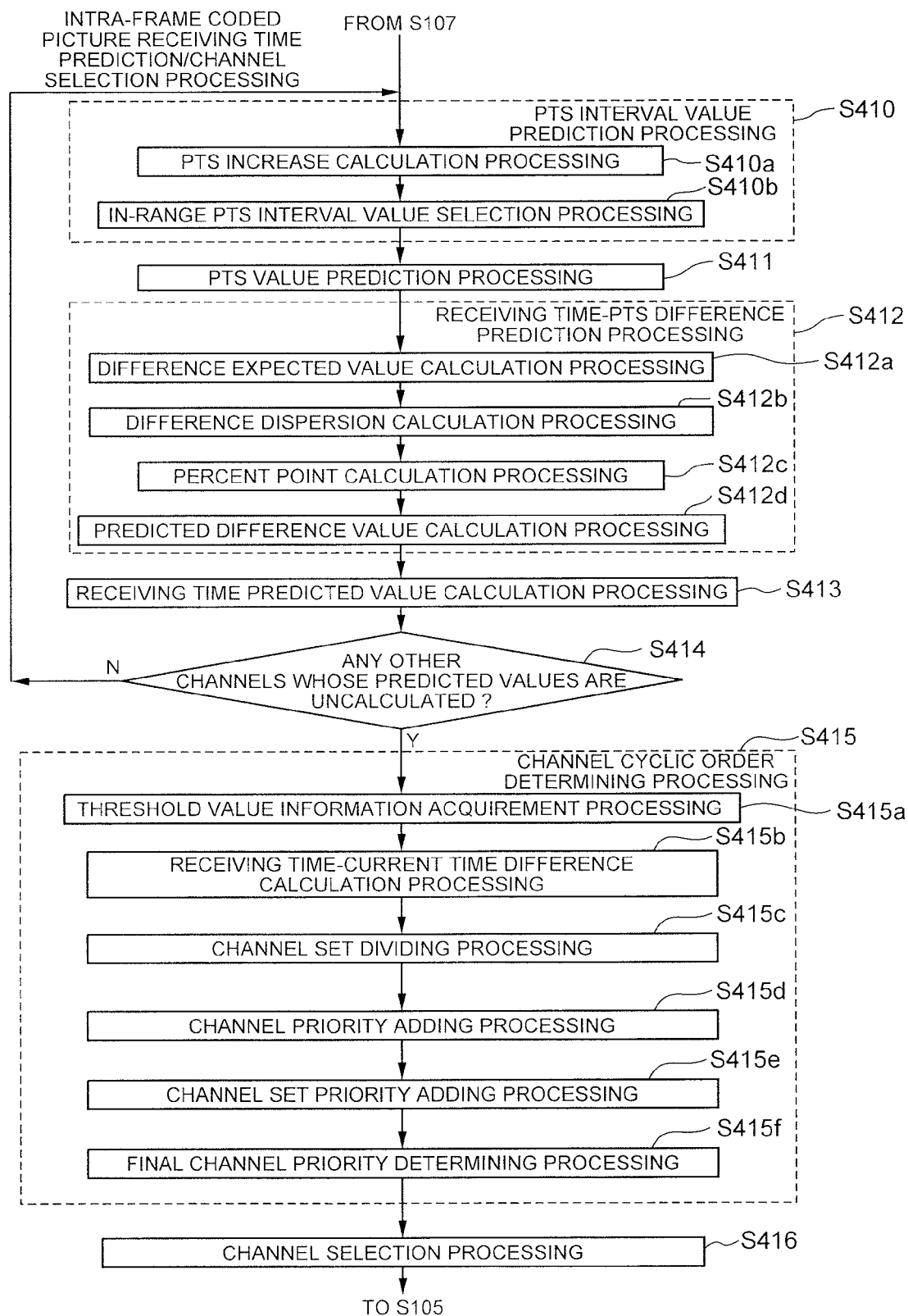
FIG. 15 is a flowchart showing an example of detailed processing procedures executed in the dynamic image receiving apparatus according to the exemplary embodiment 4-3 of the invention.
Figure 16:
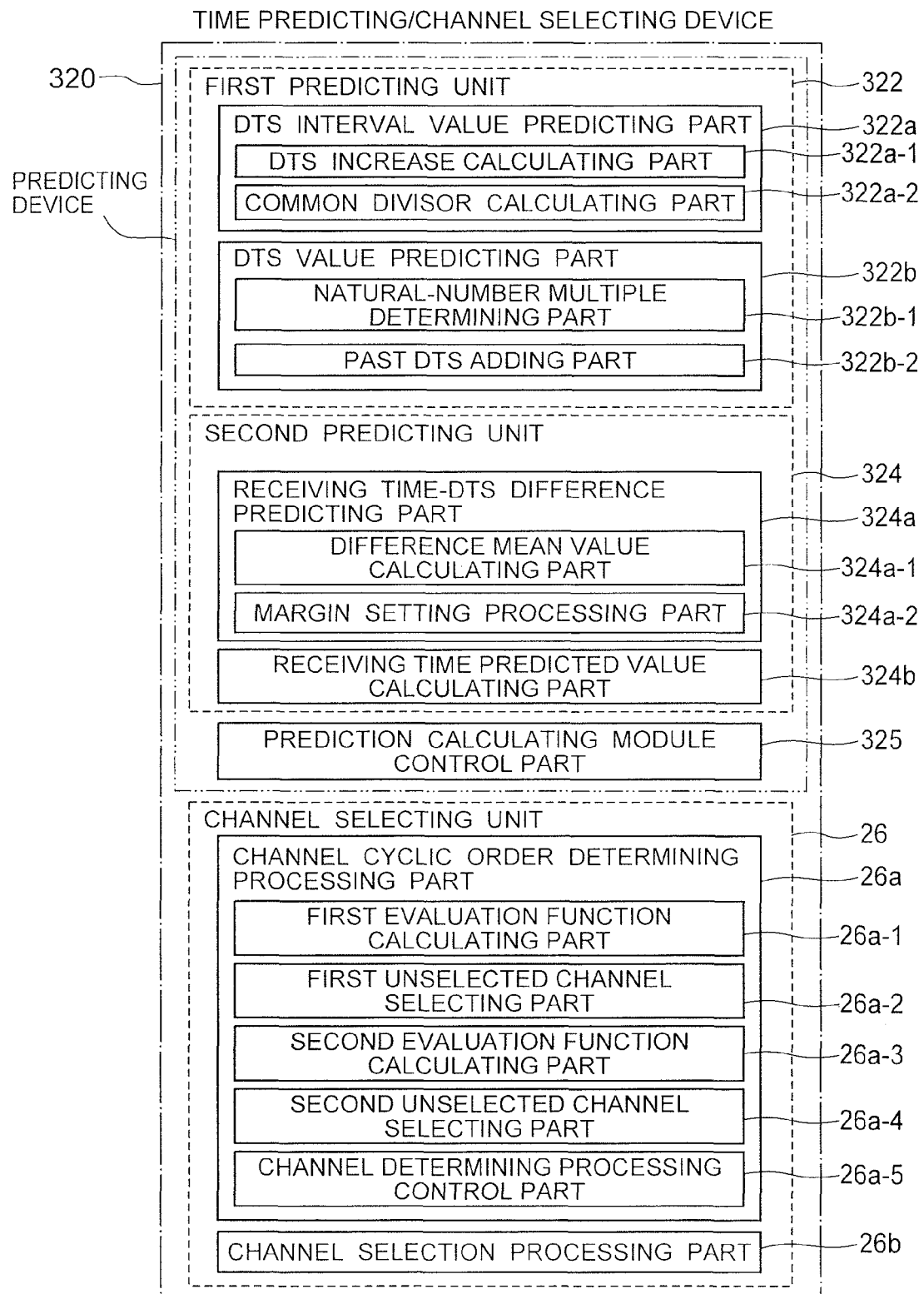
FIG. 16 is a block diagram showing an example of detailed structures of an intra-frame coded picture receiving time predicting/channel selecting unit of a dynamic image receiving apparatus according to an exemplary embodiment of the invention.
Figure 17:
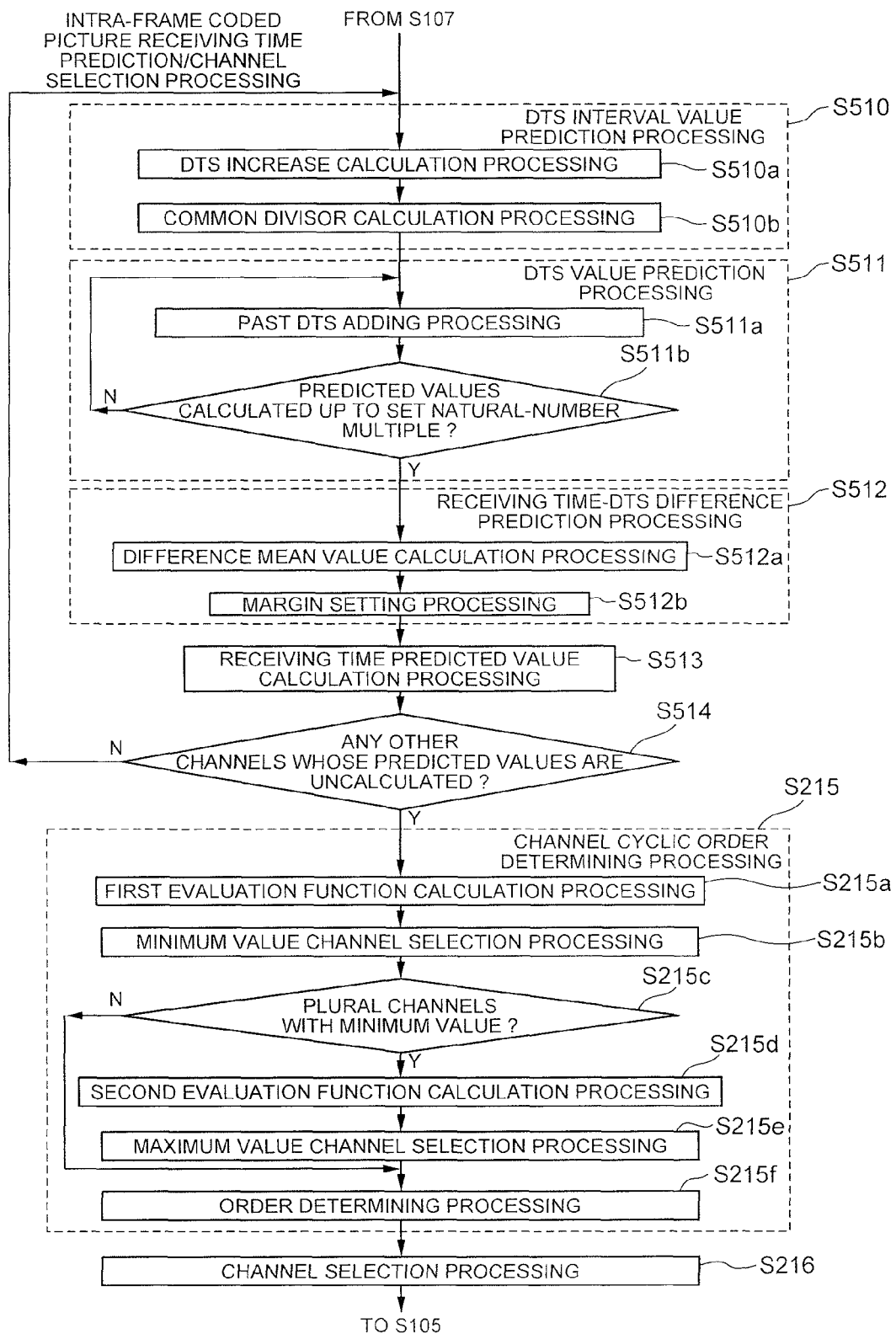
FIG. 17 is a flowchart showing an example of detailed processing procedures executed in the dynamic image receiving apparatus according to the exemplary embodiment of the invention.
Figure 19:
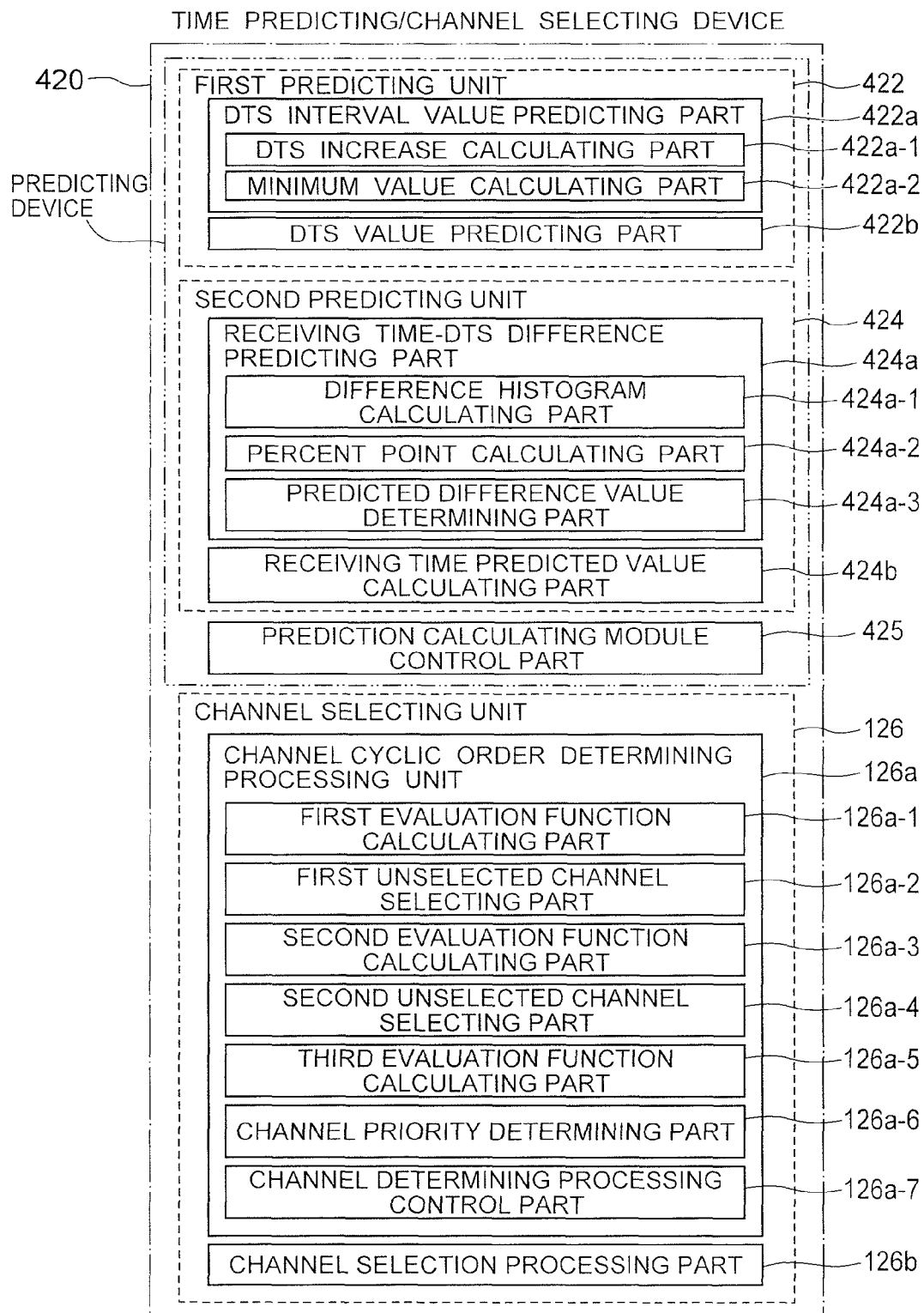
FIG. 19 is a block diagram showing an example of detailed structures of an intra-frame coded picture receiving time predicting/channel selecting unit of the dynamic image receiving apparatus according to the exemplary embodiment of the invention.
Figure 20:
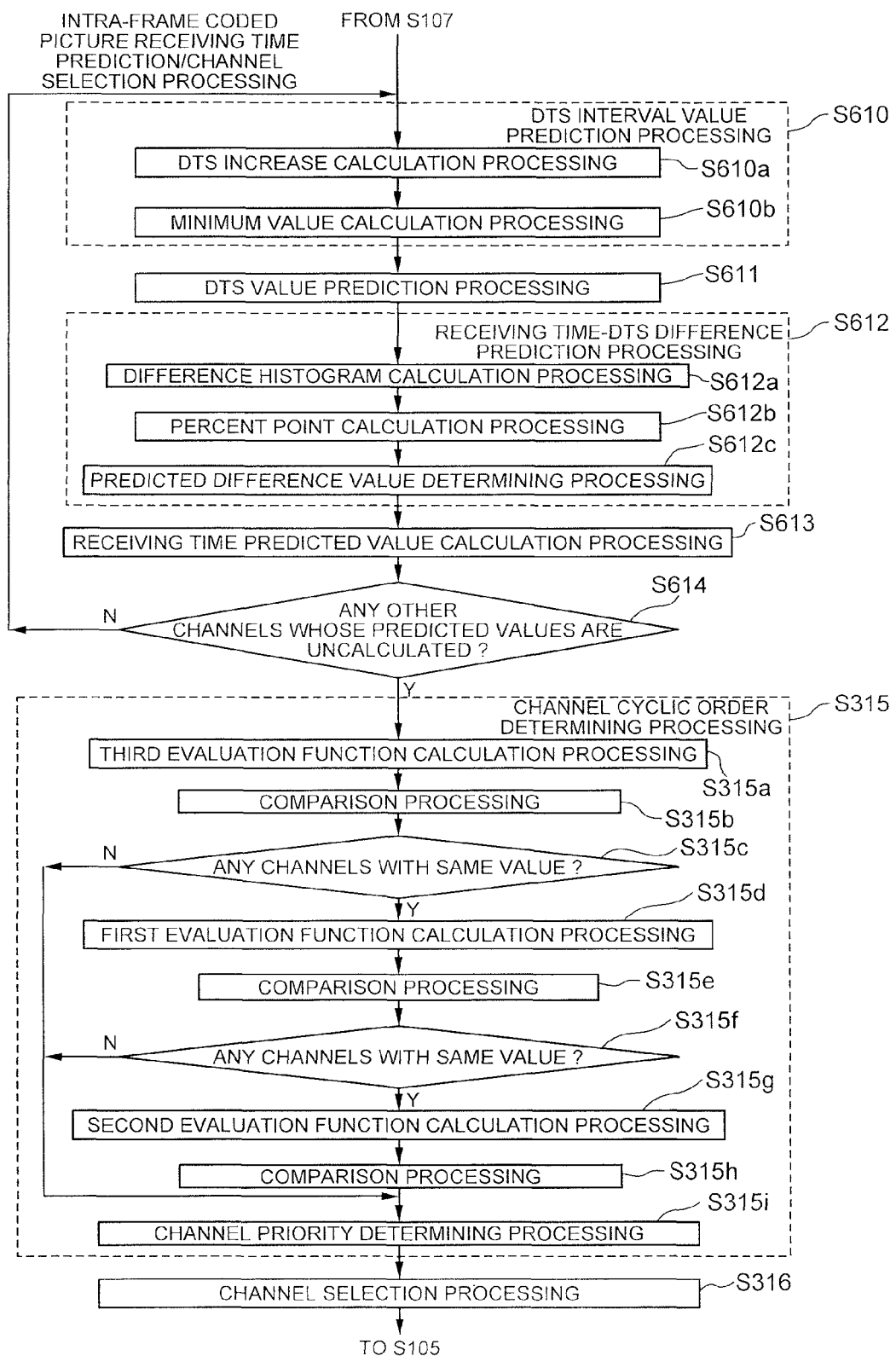
FIG. 20 is a flowchart showing an example of detailed processing procedures executed in the dynamic image receiving apparatus according to the exemplary embodiment of the invention.
Figure 21:
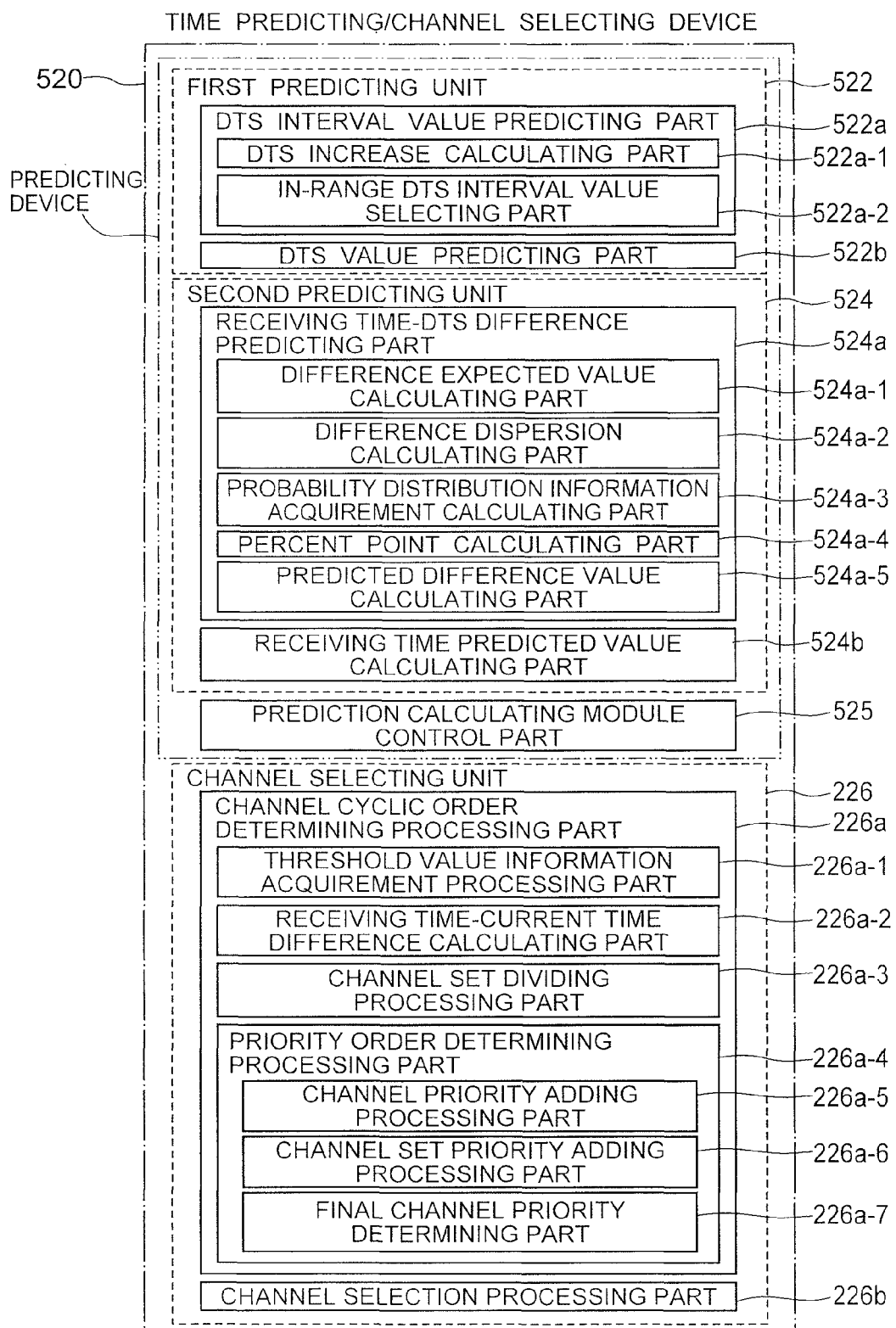
FIG. 21 is a block diagram showing an example of detailed structures of an intra-frame coded picture receiving time predicting/channel selecting unit of a dynamic image receiving apparatus according to an exemplary embodiment of the invention.
Figure 22:
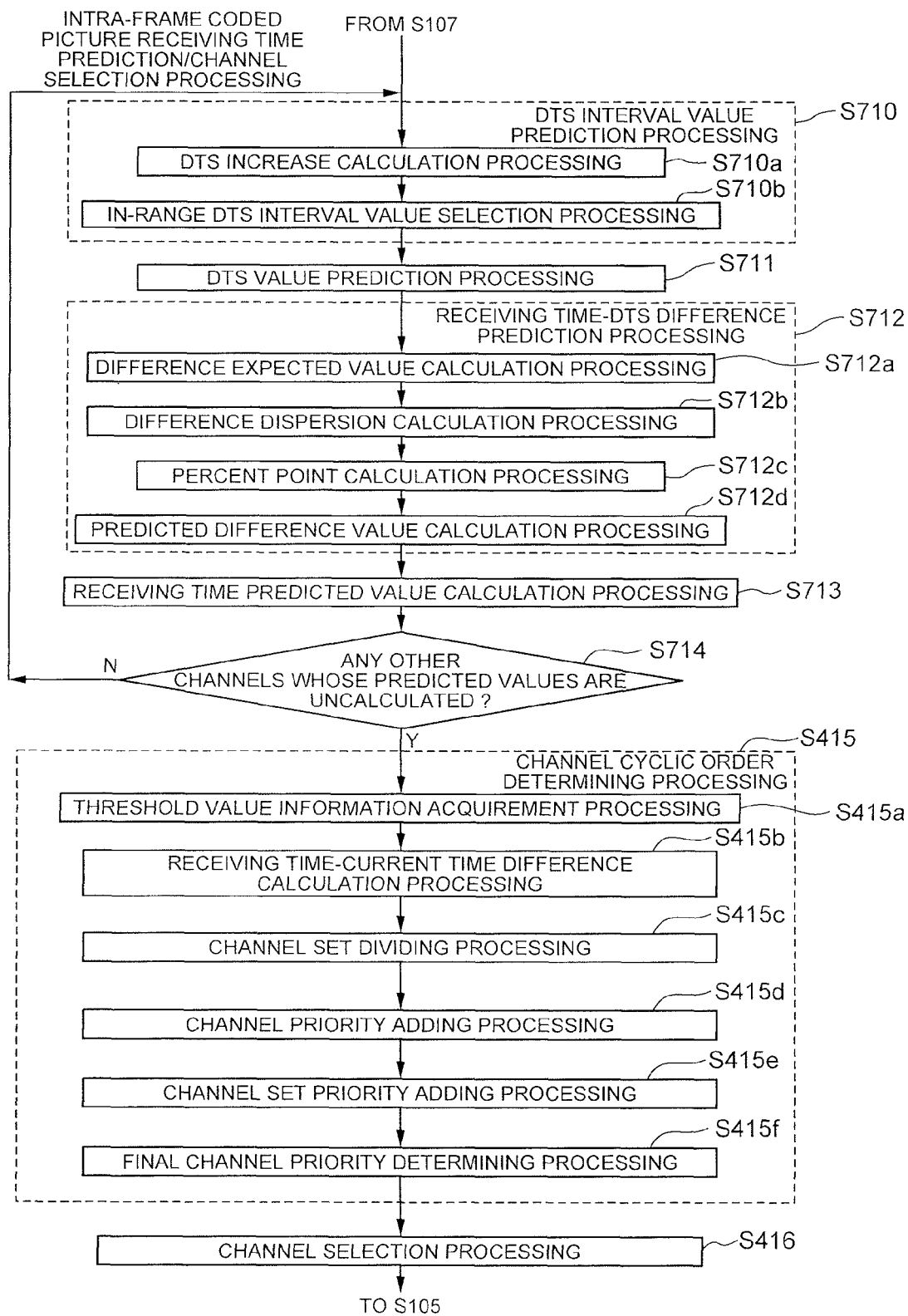
FIG. 22 is a flowchart showing an example of detailed processing procedures executed in the dynamic image receiving apparatus according to the exemplary embodiment of the invention.

1 Dynamic image receiving apparatus
10 Coded stream receiving device
12 Accumulative processing device
14 System clock (Timer)
20 Time predicting/channel selecting device
22 First predicting unit
24 Second predicting unit
26 Channel selecting unit

The invention claimed is:

1. A dynamic image receiving apparatus for selecting and receiving dynamic image streams coded by a picture unit based on intra-frame coding and inter-frame prediction from two or more channels, and collecting representative images of the plurality of channels by decoding the received streams, the apparatus including:
   a coded stream receiving device for receiving the dynamic image streams from the channels, and extracting time at which a code of an intra-frame coded picture within the streams is received, and decoding time stamp or presentation time stamp added to the intra-frame coded picture;
   an accumulative processing device for storing receiving time of the code, the decoding time stamp or the presentation time stamp as time information by being related to the respective channel; and
   a time predicting/channel selecting device for predicting receiving time of codes of intra-frame coded pictures to be received from current time and thereafter for each of the plurality of channels based on a history of the receiving time of the codes of the intra-frame coded pictures and the decoding time stamp or the presentation time stamp stored in the past, and determining the channel to be received based on an obtained predicted result,
   wherein the time predicting/channel selecting device:
      calculates priority orders for each collection target channel, and determines a channel with highest priority order as a next collection target; and
      sets a highest priority order for a channel whose representative image is uncollected, sets a higher priority order to a channel that has a large difference between the current time and receiving time of the representative image that is collected just before or the decoding time stamp or the presentation time stamp compared to other image-collected channel, and sets a higher priority order to a channel having shortest time to the predicted receiving time of a next intra-frame coded picture compared to the other channels, and
   wherein the time predicting/channel selecting device allots, to a channel whose difference between the current time and receiving time of the representative image that is collected just before is less than a threshold value, a lower priority order than a channel whose difference between the receiving time of the representative image collected just before and the current time is equal to or larger than the threshold value.

2. The dynamic image receiving apparatus as claimed in claim 1, wherein the time predicting/channel selecting device:
   predicts the decoding time stamp or the presentation time stamp of the intra-frame coded picture to be received from the current time and thereafter based on the history; and
   predicts a difference between the receiving time of the intra-frame coded picture and the decoding time stamp or the presentation time stamp from the history, and predicts receiving time of the stream of the intra-frame coded picture to be received from the current time and thereafter based on a predicted result of the decoding time stamp or the presentation time stamp and a predicted result of the difference.

3. The dynamic image receiving apparatus as claimed in claim 2, wherein the time predicting/channel selecting device calculates a predicted value of the decoding time stamp or the presentation time stamp of the intra-frame coded picture to be received from the current time and thereafter based on the decoding time stamp or the presentation time stamp of the intra-frame coded picture received just before from the channel, and an increase between the decoding time stamps or an increase between the presentation time stamps of the intra-frame coded pictures received in the past from the channel.

4. The dynamic image receiving apparatus as claimed in claim 2, wherein the time predicting/channel selecting device obtains the predicted value of the difference as a value that is obtained by adding a margin to a mean value of the differences obtained from the channel in the past.

5. The dynamic image receiving apparatus as claimed in claim 2, wherein the time predicting/channel selecting device obtains the predicted value of the difference as a percent point in a histogram that is generated from the history of the differences in the channel.

6. The dynamic image receiving apparatus as claimed in claim 2, wherein the time predicting/channel selecting device regresses the difference between the receiving time of the intra-frame coded pictures obtained from each channel and the decoding time stamp or the presentation time stamp to a probability distribution model, and sets an obtained percent point of the distribution as a predicted value of the difference.

7. The dynamic image receiving apparatus as claimed in claim 6, wherein the time predicting/channel selecting device: estimates a mean value and dispersion of the differences by having the probability distribution model as a normal distribution; obtains the percent point from a sum of the obtained mean value and a value obtained by multiplying a prescribed coefficient by a square root of the dispersion; and takes the percent point as the predicted value of the difference.

8. The dynamic image receiving apparatus as claimed in claim 1, wherein the time predicting/channel selecting device:
   among channel selection procedures when repeatedly obtaining representative images by selecting one channel at a time from collection target channels, calculates estimation values for the procedures based on the predicted result of the receiving time of the intra-frame coded picture, finds the procedure with a high evaluation value, and determines the channel based on the selected procedure; and
   calculates the evaluation value based on immediacy or collecting time of the representative image to be collected.

9. A dynamic image receiving method for receiving a dynamic image stream coded by a picture unit according to intra-frame coding and inter-frame prediction coding by selecting a channel from two or more dynamic image transmission channels as collection targets, including:
   storing time at which a code of the intra-frame coded picture within the stream is received and decoding time stamp or presentation time stamp added to the intra-frame coded picture as time information by being related to the channel; and
   predicting receiving time of the codes of the intra-frame coded pictures to be received from current time and thereafter for the two or more channels based on a history of the receiving time of the codes of the intra-frame coded pictures and the decoding time stamp or the presentation time stamp stored in the past, and selecting the channel to be received based on an obtained predicted result, the dynamic image receiving method:
   calculates, among channel selection procedures when repeatedly obtaining representative images by selecting one channel at a time from collection target channels, estimation values for the procedures based on the predicted result of the receiving time of the intra-frame coded picture, finds the procedure with a high evaluation value, and collects the representative images based on the selected procedure;

calculates the evaluation value based on immediacy or collecting time of the representative image to be collected; and allots, to a channel whose difference between the receiving time of the representative image collected just before and the current time is less than a thresholds value, a lower priority order than a channel whose difference between the receiving time of the representative image collected just before and the current time is equal to or larger than the threshold value.

10. The dynamic image receiving method as claimed in claim 9, which:

predicts the decoding time stamp or the presentation time stamp of the intra-frame coded picture to be received from current time and thereafter based on the history; and predicts a difference between the receiving time of the intra-frame coded picture and the decoding time stamp or the presentation time stamp from the history, and predicts receiving time of the stream of the intra-frame coded picture to be received from the current time and thereafter based on a predicted result of the decoding time stamp or the presentation time stamp and a predicted result of the difference.

11. The dynamic image receiving method as claimed in claim 10, which calculates a predicted value of the decoding time stamp or the presentation time stamp of the intra-frame coded picture to be received from the current time and thereafter based on the decoding time stamp or the presentation time stamp of the intra-frame coded picture received just before and an increase between the decoding time stamps or an increase between the presentation time stamps of the intra-frame coded pictures received in the past from the channel.

12. The dynamic image receiving method as claimed in claim 10, which obtains the predicted value of the difference as a value that is obtained by adding a margin to a mean value of the differences obtained from the channel in the past.

13. The dynamic image receiving method as claimed in claim 10, which obtains the predicted value of the difference as a percent point in a histogram that is generated from the history of the differences in the channel.

14. The dynamic image receiving method as claimed in claim 10, which regresses the difference between the receiving time of the intra-frame coded pictures obtained from each channel and the decoding time stamp or the presentation time stamp to a prescribed probability distribution model, and sets an obtained percent point of the distribution as a predicted value of the difference.

15. The dynamic image receiving method as claimed in claim 14, which estimates a mean value and dispersion of the differences by having the probability distribution model as a normal distribution; obtains the percent point from a sum of the obtained mean value and a value obtained by multiplying a prescribed coefficient by a square root of the dispersion; and takes the percent point as the predicted value of the difference.

16. The dynamic image receiving method as claimed in claim 9, which:

calculates priority orders for each collection target channel, and determines a channel with highest priority order as a next collection target; and sets a highest priority order for a channel whose representative image is uncollected, sets a higher priority order to a channel that has a large difference between the current time and receiving time of the representative image that is collected just before or the decoding time stamp or the presentation time stamp compared to other image-collected channel, and sets a higher priority order to a channel having shortest time to the predicted receiving time of a next intra-frame coded picture compared to the other channels.

* * * * *

UNITED STATES PATENT AND TRADEMARK OFFICE
CERTIFICATE OF CORRECTION

| | | |
|---|---|---|
| PATENT NO. | : 8,446,951 B2 | Page 1 of 1 |
| APPLICATION NO. | : 12/680491 | |
| DATED | : May 21, 2013 | |
| INVENTOR(S) | : Katsunori Tanaka et al. | |

It is certified that error appears in the above-identified patent and that said Letters Patent is hereby corrected as shown below:

In the Specification

Column 50, Line 14: Delete ""F3(CH)=∝"." and insert -- "F3(CH) = ∞". --

Column 77, Line 32 (Approx.): Delete "root a" and insert -- root σ --

Column 78, Line 26 (Approx.): Delete "root a" and insert -- root σ --

Column 79, Line 4 (Approx.): Delete "root a" and insert -- root σ --

Column 79, Line 50: Delete "root a" and insert -- root σ --

Signed and Sealed this
Second Day of December, 2014

Michelle K. Lee
*Deputy Director of the United States Patent and Trademark Office*